(12) United States Patent
Forbes, Jr.

(10) Patent No.: US 10,996,706 B2
(45) Date of Patent: *May 4, 2021

(54) SYSTEM, METHOD, AND DATA PACKETS FOR MESSAGING FOR ELECTRIC POWER GRID ELEMENTS OVER A SECURE INTERNET PROTOCOL NETWORK

(71) Applicant: Causam Enterprises, Inc., Raleigh, NC (US)

(72) Inventor: Joseph W. Forbes, Jr., Raleigh, NC (US)

(73) Assignee: CAUSAM ENTERPRISES, INC., Raleigh, NC (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/586,053

(22) Filed: Sep. 27, 2019

(65) Prior Publication Data

US 2020/0026319 A1    Jan. 23, 2020

Related U.S. Application Data

(63) Continuation of application No. 15/681,034, filed on Aug. 18, 2017, now Pat. No. 10,429,872, which is a
(Continued)

(51) Int. Cl.
*G05F 1/66* (2006.01)
*H02J 13/00* (2006.01)
(Continued)

(52) U.S. Cl.
CPC .............. *G05F 1/66* (2013.01); *G05B 13/02* (2013.01); *G05B 15/02* (2013.01); *G05B 19/02* (2013.01);
(Continued)

(58) Field of Classification Search
CPC .......... G05F 1/66; G06Q 50/06; G05B 15/02; G05B 13/02; G05B 19/02; H04L 67/10;
(Continued)

(56) References Cited

U.S. PATENT DOCUMENTS 3,906,242 A    9/1975 Stevenson
4,023,043 A    5/1977 Stevenson
(Continued)

FOREIGN PATENT DOCUMENTS

CA     2462212 A1    7/2005
EP      179223 A    12/2006
(Continued)

OTHER PUBLICATIONS

Automated power exchange. (2000). Energy Markets, 19. Retrieved from http://search.proquest.com/docview/228731930?accountid=14753.
(Continued)

*Primary Examiner* — Ziaul Karim
(74) *Attorney, Agent, or Firm* — Neo IP

(57) ABSTRACT

Systems, methods and apparatus for electric power grid management and communications are disclosed. At least one active grid element is constructed and configured in network-based communication with a server via at least one coordinator. The at least one active grid element communicates Internet Protocol (IP)-based messages with the server via the at least one coordinator in real time or less than 15 minutes interval. The at least one active grid element participates actively in an electric power grid. The at least one active grid element has an energy consumption pattern or an energy supply pattern. The IP-based messages comprise at least one IP packet including a content, a priority, a security, and a transport route. The content comprises an amount of power available for the electric power grid or an amount of
(Continued)

curtailment power available at an attachment point of the at least one grid element.

18 Claims, 32 Drawing Sheets

Related U.S. Application Data continuation of application No. 14/518,412, filed on Oct. 20, 2014, now Pat. No. 9,740,227, which is a continuation of application No. 14/290,598, filed on May 29, 2014, now Pat. No. 8,983,669, which is a continuation-in-part of application No. 13/563,535, filed on Jul. 31, 2012, now Pat. No. 9,513,648.

(51) Int. Cl.

| | | |
|---|---|---|
| *G06Q 50/06* | (2012.01) | |
| *H02J 3/00* | (2006.01) | |
| *G05B 13/02* | (2006.01) | |
| *G05B 19/02* | (2006.01) | |
| *H02J 3/14* | (2006.01) | |
| *H04L 29/08* | (2006.01) | |
| *G05B 15/02* | (2006.01) | |
| *H02J 3/38* | (2006.01) | |

(52) U.S. Cl.
CPC ............ *G06Q 50/06* (2013.01); *H02J 3/0012* (2020.01); *H02J 3/14* (2013.01); *H02J 13/0006* (2013.01); *H04L 67/10* (2013.01); *H02J 3/38* (2013.01); *Y02E 40/70* (2013.01); *Y04S 10/12* (2013.01)

(58) Field of Classification Search
CPC ...... Y04S 10/12; Y04S 20/222; Y04S 40/128; Y04S 40/124; Y04S 10/50; H02J 3/38; H02J 13/00034; H02J 13/00028; H02J 13/00017; H02J 3/0012; H02J 13/0006; H02J 3/14; Y02E 60/7869; Y02E 60/7838; Y02E 60/00; Y02E 40/70; Y02B 70/3225
See application file for complete search history.

(56) References Cited

U.S. PATENT DOCUMENTS

| | | |
|---|---|---|
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,502,339 A | 3/1996 | Hartig |
| 5,544,036 A | 8/1996 | Brown et al. |
| 5,570,002 A | 10/1996 | Castleman |
| 5,592,491 A | 1/1997 | Dinkins |
| 5,640,153 A | 6/1997 | Hildebrand et al. |
| 5,644,173 A | 7/1997 | Elliason et al. |
| 5,675,503 A | 10/1997 | Moe et al. |
| 5,696,695 A | 12/1997 | Ehlers et al. |
| 5,721,936 A | 2/1998 | Kikinis et al. |
| 5,926,776 A | 7/1999 | Glorioso et al. |
| 5,973,481 A | 10/1999 | Thompson et al. |
| 6,018,690 A | 1/2000 | Saito et al. |
| 6,078,785 A | 6/2000 | Bush |
| 6,102,487 A | 8/2000 | Oevreboe |
| 6,107,693 A | 8/2000 | Mongia et al. |
| 6,112,136 A | 8/2000 | Paul et al. |
| 6,115,676 A | 9/2000 | Rector et al. |
| 6,154,859 A | 11/2000 | Norizuki et al. |
| 6,216,956 B1 | 4/2001 | Ehlers et al. |
| 6,233,327 B1 | 5/2001 | Petite |
| 6,254,009 B1 | 7/2001 | Proffitt et al. |
| 6,304,552 B1 | 10/2001 | Chapman et al. |
| 6,366,217 B1 | 4/2002 | Cunningham et al. |
| 6,374,101 B1 | 4/2002 | Gelbien |
| 6,437,692 B1 | 8/2002 | Petite et al. |
| 6,512,966 B2 | 1/2003 | Lof et al. |
| 6,519,509 B1 | 2/2003 | Nierlich et al. |
| 6,535,797 B1 | 3/2003 | Bowles et al. |
| 6,577,962 B1 | 6/2003 | Afshari |
| 6,583,521 B1 | 6/2003 | Lagod et al. |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,633,823 B2 | 10/2003 | Bartone et al. |
| 6,671,586 B2 | 12/2003 | Davis et al. |
| 6,681,154 B2 | 1/2004 | Nierlich et al. |
| 6,687,574 B2 | 2/2004 | Pietrowicz et al. |
| 6,732,055 B2 | 5/2004 | Bagepalli et al. |
| 6,747,368 B2 | 6/2004 | Jarrett |
| 6,778,882 B2 | 8/2004 | Spool et al. |
| 6,784,807 B2 | 8/2004 | Petite et al. |
| 6,826,267 B2 | 11/2004 | Daum et al. |
| 6,832,135 B2 | 12/2004 | Ying |
| 6,834,811 B1 | 12/2004 | Huberman et al. |
| 6,836,737 B2 | 12/2004 | Petite et al. |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,891,838 B1 | 5/2005 | Petite et al. |
| 6,900,556 B2 | 5/2005 | Provanzana et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,961,641 B1 | 11/2005 | Forth et al. |
| 6,978,931 B2 | 12/2005 | Brobeck |
| 6,990,593 B2 | 1/2006 | Nakagawa |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,053,756 B2 | 5/2006 | Mollenkopf et al. |
| 7,053,767 B2 | 5/2006 | Petite et al. |
| 7,085,739 B1 | 8/2006 | Winter et al. |
| 7,088,014 B2 | 8/2006 | Nierlich et al. |
| 7,103,511 B2 | 9/2006 | Petite |
| 7,111,018 B1 | 9/2006 | Goodrich et al. |
| 7,123,994 B2 | 10/2006 | Welk et al. |
| 7,133,750 B2 | 11/2006 | Raines et al. |
| 7,141,321 B2 | 11/2006 | McArthur et al. |
| 7,142,949 B2 | 11/2006 | Brewster et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,233,843 B2 | 6/2007 | Budhraja et al. |
| 7,263,073 B2 | 8/2007 | Petite et al. |
| 7,274,975 B2 | 9/2007 | Miller |
| 7,282,921 B2 | 10/2007 | Sela et al. |
| 7,289,887 B2 | 10/2007 | Rodgers |
| 7,295,128 B2 | 11/2007 | Petite |
| 7,305,282 B2 | 12/2007 | Chen |
| 7,313,465 B1 | 12/2007 | O'Donnell |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Rissanen et al. |
| 7,412,304 B2 | 8/2008 | Uenou |

(56) References Cited

U.S. PATENT DOCUMENTS

| | | |
|---|---|---|
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,528,503 B2 | 5/2009 | Rognli et al. |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,650,425 B2 | 1/2010 | Davis et al. |
| 7,697,492 B2 | 4/2010 | Petite |
| 7,711,796 B2 | 5/2010 | Gutt et al. |
| 7,715,951 B2 | 5/2010 | Forbes et al. |
| 7,738,999 B2 | 6/2010 | Petite |
| 7,739,378 B2 | 6/2010 | Petite |
| 7,844,370 B2 | 11/2010 | Pollack et al. |
| 7,949,435 B2 | 5/2011 | Pollack et al. |
| 8,010,812 B2 | 8/2011 | Forbes et al. |
| 8,032,233 B2 | 10/2011 | Forbes et al. |
| 8,145,361 B2 | 3/2012 | Forbes et al. |
| 8,260,470 B2 | 9/2012 | Forbes et al. |
| 8,307,225 B2 | 11/2012 | Forbes et al. |
| 8,315,717 B2 | 11/2012 | Forbes et al. |
| 8,359,124 B2 | 1/2013 | Zhou et al. |
| 8,364,609 B2 | 1/2013 | Ozog |
| 8,417,569 B2 | 4/2013 | Gross |
| 8,457,802 B1 | 6/2013 | Steven et al. |
| 8,473,111 B1 | 6/2013 | Shankar et al. |
| 8,521,337 B1 | 8/2013 | Johnson |
| 8,571,930 B1 | 10/2013 | Galperin |
| 8,583,520 B1 | 11/2013 | Forbes |
| 8,588,991 B1 | 11/2013 | Forbes |
| 8,639,392 B2 | 1/2014 | Chassin |
| 10,295,969 B2 | 5/2019 | Forbes, Jr. |
| 2001/0030468 A1 | 10/2001 | Anderson et al. |
| 2001/0038343 A1 | 11/2001 | Meyer et al. |
| 2002/0019758 A1 | 2/2002 | Scarpelli |
| 2002/0019802 A1 | 2/2002 | Malme et al. |
| 2002/0035496 A1 | 3/2002 | Fukushima et al. |
| 2002/0036430 A1 | 3/2002 | Welches et al. |
| 2002/0084655 A1 | 7/2002 | Lof et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2002/0161648 A1 | 10/2002 | Mason et al. |
| 2002/0198629 A1 | 12/2002 | Ellis |
| 2003/0006613 A1 | 1/2003 | Lof et al. |
| 2003/0009705 A1 | 1/2003 | Thelander et al. |
| 2003/0036820 A1 | 2/2003 | Yellepeddy et al. |
| 2003/0074244 A1 | 4/2003 | Braxton |
| 2003/0083980 A1 | 5/2003 | Satake |
| 2003/0144864 A1 | 7/2003 | Mazzarella |
| 2003/0149937 A1 | 8/2003 | McElfresh et al. |
| 2003/0160595 A1 | 8/2003 | Provanzana et al. |
| 2003/0171851 A1 | 9/2003 | Brickfield et al. |
| 2003/0176952 A1 | 9/2003 | Collins |
| 2003/0204756 A1 | 10/2003 | Ransom et al. |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0006439 A1 | 1/2004 | Hunter |
| 2004/0024483 A1 | 2/2004 | Holcombe |
| 2004/0044571 A1 | 3/2004 | Bronnimann et al. |
| 2004/0088083 A1 | 5/2004 | Davis et al. |
| 2004/0095237 A1 | 5/2004 | Chen et al. |
| 2004/0107025 A1 | 6/2004 | Ransom et al. |
| 2004/0117330 A1 | 6/2004 | Ehlers et al. |
| 2004/0128266 A1 | 7/2004 | Yellepeddy et al. |
| 2004/0153170 A1 | 8/2004 | Santacatterina et al. |
| 2004/0158417 A1 | 8/2004 | Bonet |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0206813 A1 | 10/2004 | Brobeck |
| 2004/0225514 A1 | 11/2004 | Greenshields et al. |
| 2004/0230533 A1 | 11/2004 | Benco |
| 2005/0021397 A1 | 1/2005 | Cui et al. |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0080772 A1 | 4/2005 | Bem |
| 2005/0096856 A1 | 5/2005 | Lubkeman et al. |
| 2005/0096857 A1 | 5/2005 | Hunter |
| 2005/0096979 A1 | 5/2005 | Koningstein |
| 2005/0097204 A1 | 5/2005 | Horowitz et al. |
| 2005/0125243 A1 | 6/2005 | Villalobos |
| 2005/0127680 A1 | 6/2005 | Lof et al. |
| 2005/0138432 A1 | 6/2005 | Ransom et al. |
| 2005/0192711 A1 | 9/2005 | Raines et al. |
| 2005/0192713 A1 | 9/2005 | Weik et al. |
| 2005/0216302 A1 | 9/2005 | Raji et al. |
| 2005/0216580 A1 | 9/2005 | Raji et al. |
| 2005/0234600 A1 | 10/2005 | Boucher et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2005/0288954 A1 | 12/2005 | McCarthy et al. |
| 2006/0020544 A1 | 1/2006 | Kaveski |
| 2006/0020596 A1 | 1/2006 | Liu et al. |
| 2006/0022841 A1 | 2/2006 | Hoiness et al. |
| 2006/0025891 A1 | 2/2006 | Budike |
| 2006/0031934 A1 | 2/2006 | Kriegel |
| 2006/0038672 A1 | 2/2006 | Schoettle |
| 2006/0064205 A1 | 3/2006 | Ying |
| 2006/0069616 A1 | 3/2006 | Bau |
| 2006/0106635 A1 | 5/2006 | Ulrich et al. |
| 2006/0119368 A1 | 6/2006 | Sela et al. |
| 2006/0142900 A1 | 6/2006 | Rothman et al. |
| 2006/0142961 A1 | 6/2006 | Johnson et al. |
| 2006/0161450 A1 | 7/2006 | Carey et al. |
| 2006/0168191 A1 | 7/2006 | Ives |
| 2006/0190354 A1 | 8/2006 | Meisel et al. |
| 2006/0195334 A1 | 8/2006 | Reeb et al. |
| 2006/0212350 A1 | 9/2006 | Ellis et al. |
| 2006/0224615 A1 | 10/2006 | Korn et al. |
| 2006/0271244 A1 | 11/2006 | Cumming et al. |
| 2006/0271314 A1 | 11/2006 | Hayes |
| 2006/0276938 A1 | 12/2006 | Miller |
| 2006/0282328 A1 | 12/2006 | Gerace et al. |
| 2007/0021874 A1 | 1/2007 | Rognli et al. |
| 2007/0026857 A1 | 2/2007 | Kotzin |
| 2007/0038563 A1 | 2/2007 | Ryzerski |
| 2007/0058453 A1 | 3/2007 | Shaffer et al. |
| 2007/0058629 A1 | 3/2007 | Luft |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0100961 A1 | 5/2007 | Moore |
| 2007/0124026 A1 | 5/2007 | Troxell et al. |
| 2007/0150353 A1 | 6/2007 | Krassner et al. |
| 2007/0156621 A1 | 7/2007 | Wright et al. |
| 2007/0156887 A1 | 7/2007 | Wright et al. |
| 2007/0174114 A1 | 7/2007 | Bigby et al. |
| 2007/0192333 A1 | 8/2007 | Ali |
| 2007/0203722 A1 | 8/2007 | Richards et al. |
| 2007/0204176 A1 | 8/2007 | Shaffer et al. |
| 2007/0213878 A1 | 9/2007 | Chen |
| 2007/0214118 A1 | 9/2007 | Schoen et al. |
| 2007/0214132 A1 | 9/2007 | Grubb et al. |
| 2007/0255457 A1 | 11/2007 | Whitcomb et al. |
| 2007/0260540 A1 | 11/2007 | Chau et al. |
| 2007/0286210 A1 | 12/2007 | Gutt et al. |
| 2007/0291644 A1 | 12/2007 | Roberts et al. |
| 2007/0299562 A1 | 12/2007 | Kates |
| 2008/0010212 A1 | 1/2008 | Moore et al. |
| 2008/0015976 A1 | 1/2008 | Sandor et al. |
| 2008/0039979 A1 | 2/2008 | Bridges et al. |
| 2008/0039980 A1 | 2/2008 | Pollack et al. |
| 2008/0039989 A1 | 2/2008 | Pollack et al. |
| 2008/0040223 A1 | 2/2008 | Bridges et al. |

(56) References Cited

U.S. PATENT DOCUMENTS

| | | |
|---|---|---|
| 2008/0040295 A1 | 2/2008 | Kaplan et al. |
| 2008/0040296 A1 | 2/2008 | Bridges et al. |
| 2008/0040479 A1 | 2/2008 | Bridge et al. |
| 2008/0052145 A1 | 2/2008 | Kaplan et al. |
| 2008/0091625 A1 | 4/2008 | Kremen |
| 2008/0104026 A1 | 5/2008 | Koran |
| 2008/0109387 A1 | 5/2008 | Deaver et al. |
| 2008/0130673 A1 | 6/2008 | Cregg et al. |
| 2008/0133604 A1 | 6/2008 | Kim |
| 2008/0147465 A1 | 6/2008 | Raines et al. |
| 2008/0154801 A1 | 6/2008 | Fein et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini et al. |
| 2008/0195462 A1 | 8/2008 | Magdon-Ismail et al. |
| 2008/0224892 A1 | 9/2008 | Bogolea et al. |
| 2008/0231114 A1 | 9/2008 | Tolnar et al. |
| 2008/0238710 A1 | 10/2008 | Tolnar et al. |
| 2008/0249832 A1 | 10/2008 | Richardson et al. |
| 2008/0255899 A1 | 10/2008 | McConnell et al. |
| 2008/0263025 A1 | 10/2008 | Koran |
| 2008/0270223 A1 | 10/2008 | Collins et al. |
| 2008/0281473 A1 | 11/2008 | Pitt |
| 2008/0306824 A1 | 12/2008 | Parkinson |
| 2008/0306830 A1 | 12/2008 | Lasa et al. |
| 2008/0319893 A1 | 12/2008 | Mashinsky et al. |
| 2009/0012996 A1 | 1/2009 | Gupta et al. |
| 2009/0018884 A1 | 1/2009 | McConnell et al. |
| 2009/0024718 A1 | 1/2009 | Anagnostopoulos et al. |
| 2009/0040029 A1 | 2/2009 | Bridges et al. |
| 2009/0043519 A1 | 2/2009 | Bridges et al. |
| 2009/0043520 A1 | 2/2009 | Pollack et al. |
| 2009/0045804 A1 | 2/2009 | Durling et al. |
| 2009/0055031 A1 | 2/2009 | Slota et al. |
| 2009/0062970 A1 | 3/2009 | Forbes et al. |
| 2009/0063228 A1 | 3/2009 | Forbes |
| 2009/0063680 A1 | 3/2009 | Bridges et al. |
| 2009/0066287 A1 | 3/2009 | Pollack et al. |
| 2009/0088907 A1 | 4/2009 | Lewis et al. |
| 2009/0112701 A1 | 4/2009 | Turpin |
| 2009/0112758 A1 | 4/2009 | Herzig |
| 2009/0124241 A1 | 5/2009 | Krishnaswamy et al. |
| 2009/0125462 A1 | 5/2009 | Krishnaswamy et al. |
| 2009/0135836 A1 | 5/2009 | Veillette |
| 2009/0138362 A1 | 5/2009 | Schroedl et al. |
| 2009/0187284 A1 | 7/2009 | Kreiss et al. |
| 2009/0187344 A1 | 7/2009 | Brancaccio et al. |
| 2009/0187499 A1 | 7/2009 | Mulder et al. |
| 2009/0195349 A1 | 8/2009 | Frader-Thompson et al. |
| 2009/0198384 A1 | 8/2009 | Ahn |
| 2009/0200988 A1 | 8/2009 | Bridges et al. |
| 2009/0228335 A1 | 9/2009 | Niyogi et al. |
| 2009/0240381 A1 | 9/2009 | Lane |
| 2009/0240677 A1 | 9/2009 | Parekh et al. |
| 2009/0265042 A1 | 10/2009 | Mollenkopf et al. |
| 2009/0281673 A1 | 11/2009 | Taft |
| 2009/0281674 A1 | 11/2009 | Taft |
| 2009/0319415 A1 | 12/2009 | Stoilov et al. |
| 2009/0326726 A1 | 12/2009 | Ippolito et al. |
| 2010/0076835 A1 | 3/2010 | Silverman |
| 2010/0106575 A1 | 4/2010 | Bixby |
| 2010/0106641 A1 | 4/2010 | Chassin et al. |
| 2010/0138452 A1 | 6/2010 | Henkin et al. |
| 2010/0146599 A1 | 6/2010 | Padmanabha et al. |
| 2010/0169175 A1 | 7/2010 | Koran |
| 2010/0179862 A1 | 7/2010 | Chassin et al. |
| 2010/0191862 A1 | 7/2010 | Forbes et al. |
| 2010/0198535 A1 | 8/2010 | Brown et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0218108 A1 | 8/2010 | Crabtree et al. |
| 2010/0228601 A1 | 9/2010 | Vaswani et al. |
| 2010/0235008 A1 | 9/2010 | Forbes et al. |
| 2010/0250590 A1 | 9/2010 | Galvin |
| 2010/0274407 A1 | 10/2010 | Creed |
| 2010/0293045 A1 | 11/2010 | Burns et al. |
| 2010/0306033 A1 | 12/2010 | Oved et al. |
| 2010/0325719 A1 | 12/2010 | Etchegoyen |
| 2010/0332373 A1 | 12/2010 | Crabtree et al. |
| 2011/0010016 A1 | 1/2011 | Giroti |
| 2011/0015799 A1 | 1/2011 | Pollack et al. |
| 2011/0022242 A1 | 1/2011 | Bukhin et al. |
| 2011/0025556 A1 | 2/2011 | Bridges et al. |
| 2011/0029655 A1 | 2/2011 | Forbes et al. |
| 2011/0040666 A1 | 2/2011 | Crabtree et al. |
| 2011/0055036 A1 | 3/2011 | Helfan |
| 2011/0060474 A1 | 3/2011 | Schmiegel et al. |
| 2011/0060476 A1 | 3/2011 | Iino et al. |
| 2011/0080044 A1 | 4/2011 | Schmiegel |
| 2011/0106321 A1 | 5/2011 | Cherian et al. |
| 2011/0106729 A1 | 5/2011 | Billingsley et al. |
| 2011/0115302 A1 | 5/2011 | Slota et al. |
| 2011/0133655 A1 | 6/2011 | Recker et al. |
| 2011/0145061 A1 | 6/2011 | Spurr et al. |
| 2011/0161250 A1 | 6/2011 | Koeppel et al. |
| 2011/0172837 A1 | 7/2011 | Forbes, Jr. |
| 2011/0172841 A1 | 7/2011 | Forbes, Jr. |
| 2011/0185303 A1 | 7/2011 | Katagi et al. |
| 2011/0196546 A1 | 8/2011 | Muller et al. |
| 2011/0202418 A1 | 8/2011 | Kempton et al. |
| 2011/0204717 A1* | 8/2011 | Shaffer ............... H02J 3/008 307/18 |
| 2011/0208366 A1 | 8/2011 | Taft |
| 2011/0235656 A1 | 9/2011 | Pigeon |
| 2011/0251730 A1 | 10/2011 | Pitt |
| 2011/0257809 A1 | 10/2011 | Forbes et al. |
| 2011/0258022 A1 | 10/2011 | Forbes et al. |
| 2011/0270454 A1 | 11/2011 | Kreiss et al. |
| 2011/0270457 A1 | 11/2011 | Kreiss et al. |
| 2011/0270550 A1 | 11/2011 | Kreiss et al. |
| 2011/0282511 A1 | 11/2011 | Unetich |
| 2011/0288905 A1 | 11/2011 | Mrakas |
| 2012/0029720 A1 | 2/2012 | Cherian et al. |
| 2012/0029897 A1 | 2/2012 | Cherian et al. |
| 2012/0196482 A1 | 8/2012 | Stokoe |
| 2012/0205977 A1 | 8/2012 | Shin et al. |
| 2012/0221162 A1 | 8/2012 | Forbes |
| 2012/0223840 A1 | 9/2012 | Guymon et al. |
| 2012/0232816 A1 | 9/2012 | Oh et al. |
| 2012/0253540 A1 | 10/2012 | Coyne et al. |
| 2012/0259760 A1 | 10/2012 | Sgouridis et al. |
| 2012/0296482 A1 | 11/2012 | Steven et al. |
| 2012/0296799 A1 | 11/2012 | Playfair et al. |
| 2012/0303553 A1 | 11/2012 | LaFrance |
| 2012/0310760 A1 | 12/2012 | Phillips et al. |
| 2012/0316697 A1 | 12/2012 | Boardman et al. |
| 2013/0020992 A1 | 1/2013 | Wu et al. |
| 2013/0035802 A1 | 2/2013 | Khaitan et al. |
| 2013/0054036 A1 | 2/2013 | Cherian |
| 2013/0079939 A1* | 3/2013 | Darden, II ......... G05B 13/048 700/291 |
| 2013/0079943 A1 | 3/2013 | Darden |
| 2013/0144768 A1 | 6/2013 | Rohrbaugh |
| 2013/0178990 A1 | 7/2013 | Kayton et al. |
| 2014/0025486 A1 | 1/2014 | Bigby et al. |
| 2014/0039699 A1 | 2/2014 | Forbes, Jr. |
| 2014/0039703 A1 | 2/2014 | Forbes |
| 2014/0114829 A1 | 4/2014 | Forbes, Jr. |
| 2014/0114844 A1 | 4/2014 | Forbes, Jr. |
| 2014/0222698 A1 | 8/2014 | Potdar et al. |
| 2014/0277788 A1 | 9/2014 | Forbes, Jr. |
| 2014/0278851 A1 | 9/2014 | Kopanati |
| 2014/0279711 A1 | 9/2014 | Angelis et al. |
| 2014/0304025 A1 | 10/2014 | Steven et al. |
| 2014/0351010 A1 | 11/2014 | Kong |
| 2015/0094968 A1 | 4/2015 | Jia et al. |
| 2015/0160672 A1 | 6/2015 | Hakim et al. |
| 2015/0278968 A1 | 10/2015 | Steven et al. |
| 2016/0055507 A1 | 2/2016 | Patil et al. |

(56) References Cited

U.S. PATENT DOCUMENTS

| | | |
|---|---|---|
| 2017/0025893 A1 | 1/2017 | Forbes, Jr. |
| 2017/0344045 A1 | 11/2017 | Forbes, Jr. |
| 2018/0343339 A1 | 11/2018 | Lotter et al. |

FOREIGN PATENT DOCUMENTS

| | | |
|---|---|---|
| EP | 2159749 A1 | 3/2010 |
| JP | 2000078748 A | 3/2000 |
| JP | 2001306839 A | 11/2001 |
| JP | 20040180412 A | 6/2004 |
| JP | 2004248174 A | 9/2004 |
| JP | 2006060911 A | 3/2006 |
| JP | 2007132553 A | 5/2007 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| KR | 20090033299 A | 4/2009 |
| WO | 2007136456 A2 | 11/2007 |
| WO | 2008073477 A2 | 6/2008 |
| WO | 2008125696 A2 | 10/2008 |
| WO | 2011079235 A1 | 6/2011 |
| WO | 2012008979 A2 | 1/2012 |
| WO | 2012015507 A1 | 2/2012 |
| WO | 2012015508 A1 | 2/2012 |
| WO | 2012058114 A2 | 5/2012 |

OTHER PUBLICATIONS

B.J. Kirby, Spinning Reserve from Responsive Loads, Oak Ridge National Laboratory, United States Dept. of Energy, Mar. 2003 (54 pages).

Byers J. Risk Management and Monetizing the Commodity Storage Option. Natural Gas & Electricity [serial online]. Jul. 2005; 21(12)1-8. Available from: Business Source Complete, Ipswich, MA.

C.W. Gellings and W.M. Smith, Integrating Demand-Side Management into Utility Planning, Proceedings of the IEEE, vol. 77, Issue: 6, Jun. 1989, pp. 908-918 (Abstract only).

Cazalet, E. G. & Samuelson, R. D. 2000, "The power market: E-commerce for all electricity products", Public Utilities Fortnightly, vol. 138, No. 3, pp. 42-47.

Eric Hirst and Brendan Kirby, Opportunities for Demand Participation in New England Contingency-Reserve Markets, New England Demand Response Initiative, Feb. 2003 (15 pages).

Eric Hirst and Richard Cowart, Demand Side Resources and Reliability, New England Demand Response Initiative, Mar. 20, 2002 (32 pages).

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http://www.gedigitalenergry.com/products/brochures/1210-Family.pdf.

Illinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Lobsenz G. Maryland Regulators Reject BG&E Smart Grid Proposal. Energy Daily [serial online]. Jun. 23, 2010; (118):3. Available from: Business Source Complete, Ipswich, MA.

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

Moeller, Mar. 15, 2011, NERC, 116 pages.

Olivier Rousse; "Environmental and economic benefits resulting from citizens' participation in CO.sub.2 emissions trading: An efficient alternative solution to the voluntary compensation of CO.sub.2 emissions", Energy Policy 36 (2008), pp. 388-397; Oct. 29, 2007 (online).

Paul Darbee, Insteon Compared, SmartLabs, Inc., Jan. 2, 2006, 69 pages.

Thomas, K. 2000, "Energy e-commerce takes off", Energy Markets, vol. 5, No. 4, pp. 26.

Woolf, Tim, Demand Response Compensation in Organized Wholesale Energy Markets, May 4, 2010, NARUC, 34 pages.

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Chicco, Gianfranco. Load Pattern-Based Classification of Electricity Customers, May 2004, IEEE Transactions on Power Systems, vol. 19, No. 2 (Year: 2004).

Valero Verdu, Sergio. Classification, Filtering, and Identification of Electrical Customer Load Patterns Through the Use of Self-Organizing Maps, Nov. 2006, IEEE Transactions on Power Systems, vol. 21, No. 4 (Year: 2006).

* cited by examiner

EXAMPLE ADJUSTABLE PARAMETERS:

Consumer-adjustable parameters:

- Pool pump
    - Time of day, day of week, month
- HVAC and water heater temperatures:
    - Seasonal temperature range
    - Away temperatures
    - Time of day temperature schedule
    - Day of week temperature schedule
    - Month of year temperature range
    - Location temperature set points (upstairs, downstairs)
- Windows (open/close)
- Fans
- Dryer – time of use
- Dishwasher – time of use

- Commercial building control
    - Chiller
    - Cooling tower
    - Discharge air
    - Boiler
    - Hydronic
    - Built-up air handling unit

Supplier-adjustable parameters:
- Pool pump – time of use
- Water heater – temperature range
- Thermostat – temperature range
- HVAC – temperature range
- Dryer – time of use
- Dishwasher – time of use

Rates
- Supplied by one of market participants per spec
- Example: pricing and time of use dependent upon grid stability and usage

FIG. 22

SYSTEM, METHOD, AND DATA PACKETS FOR MESSAGING FOR ELECTRIC POWER GRID ELEMENTS OVER A SECURE INTERNET PROTOCOL NETWORK

CROSS-REFERENCES TO RELATED APPLICATIONS

This application relates to and claims priority from the following U.S. Patent Applications. This application is a continuation of U.S. application Ser. No. 15/681,034 filed Aug. 18, 2017, which is a continuation of U.S. application Ser. No. 14/518,412 filed Oct. 20, 2014 and issued as U.S. Pat. No. 9,740,227, which is a continuation of U.S. application Ser. No. 14/290,598 filed May 29, 2014 and issued as U.S. Pat. No. 8,983,669, which is a continuation-in-part of U.S. application Ser. No. 13/563,535 filed Jul. 31, 2012 and issued as U.S. Pat. No. 9,513,648, each of which is incorporated herein by reference in its entirety.

BACKGROUND OF THE INVENTION

1. Field of the Invention

The present invention relates generally to the field of electrical power management systems, and more particularly, to systems, methods, apparatus, network topography, security and data packets for messaging for electric power grid elements via communications networks including but not limited to secure Internet Protocol, wired or wireless networks.

2. Description of Related Art

Generally, electric power management systems and network-based communications for an electric power grid are known. However, most prior art systems and methods apply to normal grid management, macro (large) generation subsystems, transmission subsystems, distributions systems, utility management of meters and meter data, where raw data is communicated by wired and wireless network communications infrastructure and stored in databases for later processing at predetermined time periods.

Furthermore, prior art exists regarding the construction of private networks for grid operators, market participants, utilities and combinations thereof whereby a combination of privately owned networks, the use of common carrier and traditional telephony networks are utilized for this command, control, telemetry, metrology, and settlement messages. Historically, this communications infrastructure and the transmission formats utilized by electric grid operators has relied upon technologies that have evolved as control systems have evolved. For example, analog circuits that carried low bit rate packets and information could be carried over "plain old telephone service" (POTS), microwave communications, and physical links of various types that are known in the art. Over time, both wireline and wireless infrastructure evolved to digital formats that have been the backbone for both privately owned, privately provisioned and public network infrastructure. These formats, primarily synchronous networks and also Time Division Multiplex (TDM) networks followed the analog modulation schemes by offering greater capacity over both copper and wireless infrastructure, but leading to great innovations in speed and reliability with the advent of synchronous optical networks (SONET), Digital Wireless Standards inclusive of Groupe Speciale Mobile (GSM) and Code Division Multiple Access (CDMA) and many proprietary methods for transporting information digitally necessary for the overall function, registration, operation, command, control and participation of grid elements and their logical control infrastructure for grid stability and reliability.

In the last 10 years, great innovation has been made and adopted in the telecommunications sectors regarding the known art of Internet Protocol transport and security. The Open Systems Interface (OSI) architecture, itself derived from X.25 among others in packet switching. Similarly, advances in digital switching has reduced the electronics and physical or virtual connections and multiplexing to more efficient asynchronous formats that incorporate various methods for increasing the speed and reliability of IP transport connections. Ethernet connections now are the new telecommunications standards that heretofore would have been more accepted for local area network connectivity are now the standard for most data traffic, particularly those IP packets that do not require priority, security, or are for non-critical infrastructure.

Recently, the Federal Communications Commission accepted the filings of AT&T, Spring, Verizon among other common carriers, local exchange carriers, and intra/interlata carriers who are authorized to transport voice or other "non-information" services traffic to convert the legacy "POTS", analog, and synchronous digital (TDM) connections to an all Internet Protocol infrastructure for ALL connections within the carriers' service territories or FCC granted licensed areas if the common carriers are also wireless service providers. The process of conversion has been in fact started in the carriers' core fiber interconnections as the fiber cores have been converted from SONET and Signaling System No. 7 (SS7) networks to advanced high speed transport methods such as Multiple Packet Lable Switching (MPLS). There are many efficiencies for the carriers and they also provide for a more distributed infrastructure for both traditional voice services and data transport services.

Further FCC Action in 2011 dealing with the interconnection of DOCIS (cable standard) for data transport in both synchronous but primarily synchronous formats of voice video and data within fiber or hybrid fiber coax delivery systems AND voice service common carriers over pure IP formats (Vonage as an example) combined with the rollout of all IP third generation wireless infrastructure and now fourth generation standards such as Long Term Evolution, also known as 4G and the soon to be released TIA/IEEE standards for firth generation wireless services, advances in antenna and software that have delivered advances in IEEE 802.11-X (a, b, d, g, n and its successors) have increased the bit rates that take advantage of IP's inherent routing, reliability, and efficiency.

Unfortunately for traditional wireline common carriers and local exchange carriers, this movement to both "cutting the cord" with wireless phones being landline replacements and the movement away from analog and lower bit rate digital (TDM) technologies, the Federal Government, which has previously classified IP traffic carrier between carriers and Internet Service Providers as an "Information Service" not subject to Federal or State Level Public Utility Commission oversight, has decided that new Federal rules regarding voice traffic carried by IP protocol must be revisited as whether or not the voice component is an "Information Service" or constitutes a service that is subject to new interconnection rules between the carriers, the ISPs, the Cable Industry, the Service Only providers and the Wireless Carriers.

There are many drivers for the FCC to take this action, independent of the background and history of how the electric power grid also utilizes these networks. In previous interconnection rules, carriers that interconnected their voice and or data traffic with each other did so through highly negotiated contracts. In these contracts, each carrier where the traffic originated, was compensated reciprocally from the terminating carrier (wireless or wireline) for traffic TERMINATED in the adjacent carrier's network. At the end of a pre-negotiated time frame, generally monthly, the totals for minutes of use, erlangs, or Megabits (MB) delivered were reconciled and inter-carrier compensation was awarded to the net provider of "traffic" to the terminating carrier. Furthermore, one of the charges that ALL carriers charged their customers on these legacy networks were taxes and fees to fund rural telecommunications infrastructure build-out that has been funded from traffic for decades. The "Universal Service Fund" (USF) was set up for rural communities and their service providers to have access to Federal Grant money to fund rural deployments and upgrades with the goal of keeping rural America at the same level of innovation as urban areas. As the transitions aforementioned have taken place, particularly with the introduction of IP transport for voice video and data, the dollars flowing in the USF fund and therefore the money available for grant to rural communities has been dropping drastically for many years, forcing the FCC to re-evaluate, with these combination of forces, its definition of IP based voice services as eligible for USF tariffs.

Under the FCC's Order the FCC in 2012 codified in the Federal Register that inter-carrier compensation for IP voice was to no longer be constrained by the definition of every packet that would or could be transported by the Internet or IP infrastructure, wireline or wireless as an "Information Service."

The FCC further so ordered that all carriers would track voice over Internet Protocol or VoIP separately from other data services for USF funding under a new "Bill and Keep) methodology wherein voice traffic, regardless of its origin and format, would be tracked now from the originating network and billed by the network provider regardless if it is delivered to an adjacent network. The order also when further in providing that each carrier, regardless of its type would provide a defined "Point of Interface" for the interconnection of IP packets, voice traffic or other data traffic" for common interface or boundaries for where carriers could pass IP traffic from one network boundary or carrier to the next. These FCC orders and the corresponding hearing, comments from carriers and requests for reconsideration are public information that can be found at the FCC's website www.fcc.gov.

The additional issue that has recently been resolved in the DC Court of Appeals deals with the concept of "Net Neutrality." The FCC in 2008 under former Chairman Genokowski, so ordered carriers that operated Internet Protocol networks, ISPs or any network provider that passed IP packets that offering "Priority Access" that would take advantage of IP Protocol's natural OSI protocols to order packets in the most important order as determined by the carrier and the application would not be permitted. This order was controversial as it allowed for pure applications companies to utilize carrier networks to transport bandwidth intensive services regardless of their impact to the overall speed, reliability and capacity of the transport links. Companies that offer bandwidth intensive applications, e.g. music, video, or live streaming, would have in effect under the "Net Neutral" protocols the same priority of transport as a critical infrastructure such as emergency services or critical infrastructure communications necessitated by the operations of an electric power grid or the market participant.

As a result, grid operators, utilities, market participants have generally constructed private networks for their operations to insure that their traffic, carried either through their owned transport (wireless, fiber, copper etc.) would have priority over being carried within the public or common carrier infrastructure. Where that infrastructure is used, the additional cost was spent for dark fiber, dedicated network capacity, private radio networks as examples amongst those already discussed.

In 2013, the DC Court of Appeals struck down the FCC's Net Neutrality order after the FCC was sued by a combination of carriers. In the Order (get some quotes), the Courts affirmed the Carriers ability in combination with the new requirements under the USF requirement for differentiating and accounting for VoIP as a service subject to the USF and the Bill and Keep orders, the Courts affirmed that the networks could define the use of their networks and charge, provision and allocate resources, including priority access, as the network carriers and providers saw fit.

The impacts of this transformation of the carrier infrastructure may not be obvious to one not ordinarily skilled in the art, but the net effect is that in essence the accepted filings from the network carriers of the decommissioning of the legacy "POTS", TDM, Frame Relay, ATM, SONET, or legacy networks is that in essence all networks that are used in grid operations of any kind and from any generator, market participant, grid operator, market manager, and/or utility will have to be redesigned under a secure Internet protocol secure network infrastructure before 2020; therefore, a need exists for definitions, specifications, systems, and apparatus to be developed for the migration from traditional grid operations to an all Internet Protocol, managed, secure, network and associated messaging.

The changes that have been described infrastructure and with new distributed data and software applications, the net effect for the electric power grid is that it now will abandon older technologies and embrace applications and network elements that can be provisioned by wireline and wireless carriers. Furthermore, these new IP devices and the ability for the carriers to define new points of interface provide for a need to invent new methods and apparatus on how the electric power grid, water, gas, or any commodity or service that can be distributed and stored in databases for later processing at predetermined time periods to be implemented on these newly soon to be designed networks.

Prior art also provides for controls managing the electric power grid and systems for collecting many different messages for telemetry, which are used to deactivate or reduce power supplied to predetermined service points from the grid, and for advanced meter infrastructure (AMI) data that is communicated in raw data form from meters to data aggregators and to servers associated with the utilities providing the electric power measured by the meters.

Collecting, transmitting, storing, and analyzing information associated with a variety of devices associated with the electric power grid is also known in the art. Settlement for macro energy supply, energy storage, energy demand, and/or curtailment as supply is known in the prior art; however, most settlement includes manual and/or non-real-time settlement including significant estimation or modeled data where actual data is missing or not collected, and/or utilization of validation energy equivalence (VEE), and/or collected and settled over a period of time whereby actual contributions by sources/suppliers of generation are not fully known and are estimated and applied to all Market Participants in some cases a full year after a generation day. So communication of raw data from AMI and other meters does not provide effective data for immediate settlement without substantial analysis and modification or "washing" of the data after its communication to remote servers, usually operated by utilities associated with the power supplied over the grid. In any case, the meters typically transmit raw data to an aggregator without any analysis, sorting, modifying, or action on the data; and typically, the meters do not provide security or prioritization on the messaging of the raw data they transmit.

Also, it is known in the prior art to provide messaging associated with customer billing for utilities. Generally, utilities messages associated with customer billing include analog data such as pulses from a meter sent in a raw data form from the meter to a billing system associated with the utility providing the electricity to the customer associated with the meter. By way of example, consider US Patent Application Publication No. 20110161250 published Jun. 30, 2011 and filed May 4, 2010 for Distributed Energy Generator Monitor and method of use by inventors Koeppel, et al., which describes methods and systems for monitoring at least one distributed energy generator including the steps of receiving utility bill information relating to an existing utility of a customer, and measured energy information from the distributed energy generator of the customer, and generating a bill for measured energy from the distributed energy generator, the bill taking into account the utility bill information related to the existing utility. The system includes customer and public user interfaces to view data from the customer billing system on distributed energy generator production, carbon emissions reduced, and energy cost savings delivered to customers. The customer billing system includes messaging, but it is limited to pulse counting and emailing the pulse data. In paragraph [0026] of the publication, it is disclosed that the energy production, sale, and weather data can be sent to the customer billing system, wherein the pulses counted by the pulse energy meter, a temperature sensor reading, and an insolation sensor output can be combined into one data packet and transmitted to the customer billing system. The customer billing system in [0027] can enter the data into databases and converts the data from analog data into metric data. So the messaging of this reference provide only for the messaging of raw data, and more particularly, analog data such as pulse data.

Also, US Patent Application Publication No. 20090281674 published Nov. 12, 2009 and filed Feb. 11, 2009 for Distributed Energy Generator Monitor and method of use by inventor Taft, which describes a smart grid for improving the management of a power utility grid including sensors and communications and computing technology such as bus structures dedicated to different types of data, such as operational/non-operational data, event processing data, grid connectivity data, and network location data; the buses may be used to transport the various types of data to other smart grid processes such as a centrally located controller. Also, this reference discloses the use of INDE Reference Architecture to enable integration of intelligent or smart grids into the electric power industry. It further teaches that the buses may comprise a local area network (LAN), such as Ethernet® over unshielded twisted pair cabling and Wi-Fi, and that hardware and/or software, such as a router, may be used to route data on data onto one bus among the different physical buses. And an IT environment may be SOA-compatible. Events may include messages and/or alarms originating from the various devices and sensors that are part of the smart grid. It further teaches routing devices that may determine how to route the data based on one or more methods, including routing devices that may examine one or more headers in the transmitted data to determine whether to route the data to the segment for the operational/non-operational data bus or to the segment for the event bus. Specifically, one or more headers in the data may indicate whether the data is operation/non-operational data (so that the routing device routes the data to the operational/non-operational data bus) or whether the data is event data (so that the routing device routes the event bus). Alternatively, the routing device may examine the payload of the data to determine the type of data (e.g., the routing device may examine the format of the data to determine if the data is operational/non-operational data or event data). By contrast to the present invention, nowhere does this reference disclose the use of IP packets in all messaging; also, this reference teaches that the buses are separate for performance purposes. For CEP processing, low latency may be important for certain applications, which are subject to very large message bursts. Most of the grid data flows, on the other hand, are more or less constant, with the exception of digital fault recorder files, but these can usually be retrieved on a controlled basis, whereas event bursts are asynchronous and random. Also, this reference teaches that the existing grid devices may have been designed to acquire and store data for occasional offload to some other device such as a laptop computer, or to transfer batch files via PSTN line to a remote host on demand. These devices may not be designed for operation in a real time digital network environment. In these cases, the grid device data may be obtained at the substation level, or at the operations control center level, depending on how the existing communications network has been designed. In the case of meters networks, it will normally be the case that data is obtained from the meter data collection engine, since meter networks are usually closed and the meters may not be addressed directly. As these networks evolve, meters and other grid devices may be individually addressable, so that data may be transported directly to where it is needed, which may not necessarily be the operations control center, but may be anywhere on the grid. Devices such as faulted circuit indicators may be married with wireless network interface cards, for connection over modest speed (such as 100 kbps) wireless networks. These devices may report status by exception and carry out fixed pre-programmed functions. The intelligence of many grid devices may be increased by using local smart RTUs. Instead of having poletop RTUs that are designed as fixed function, closed architecture devices, RTUs may be used as open architecture devices that can be programmed by third parties and that may serve as an INDE DEVICE in the INDE Reference Architecture. Also, meters at customers' premises may be used as sensors. For example, meters may measure consumption (such as how much energy is consumed for purposes of billing) and may measure voltage (for use in volt/V Ar optimization). The data from the one or more sensors may be sent to the Smart Meter, which may package the data for transmission to the operations control center via utility communication network. The in-home display may provide the customer at the customer premises with an output device to view, in real-time, data collected from Smart Meter and the one or more sensors. In addition, an input device (such as a keyboard) may be associated with in-home display so that the customer may communicate with the operations control center. In one embodiment, the in-home display may comprise a computer resident at the customer premises, and may further include controls that may control one or more devices at the customer premises.

Various appliances at the customer premises may be controlled, such as the heater, air conditioner, etc., depending on commands from the operations control center. The customer premises may communicate in a variety of ways, such as via the Internet, the public-switched telephone network (PSTN), or via a dedicated line (such as via collector). Via any of the listed communication channels, the data from one or more customer premises may be sent. One or more customer premises may comprise a Smart Meter Network (comprising a plurality of smart meters), sending data to a collector for transmission to the operations control center via the utility management network. Further, various sources of distributed energy generation/storage (such as solar panels, etc.) may send data to a monitor control for communication with the operations control center via the utility management network. Also, the devices in the power grid outside of the operations control center may include processing and/or storage capability. In addition to the individual devices in the power grid including additional intelligence, the individual devices may communicate with other devices in the power grid, in order to exchange information (include sensor data and/or analytical data (such as event data)) in order to analyze the state of the power grid (such as determining faults) and in order to change the state of the power grid (such as correcting for the faults). Specifically, the individual devices may use the following: (1) intelligence (such as processing capability); (2) storage (such as the distributed storage discussed above); and (3) communication (such as the use of the one or more buses discussed above). In this way, the individual devices in the power grid may communicate and cooperate with one another without oversight from the operations control center. For example, the INDE architecture disclosed above may include a device that senses at least one parameter on the feeder circuit. The device may further include a processor that monitors the sensed parameter on the feeder circuit and that analyzes the sensed parameter to determine the state of the feeder circuit. For example, the analysis of the sense parameter may comprise a comparison of the sensed parameter with a predetermined threshold and/or may comprise a trend analysis. One such sensed parameter may include sensing the waveforms and one such analysis may comprise determining whether the sensed waveforms indicate a fault on the feeder circuit. The device may further communicate with one or more substations.

By way of example of existing prior art and commercial applications, in Texas, utility investment has occurred in high heat rate gas plants, and then natural gas became cheap, so these plants are having a difficult time competing with other market participants now, and so there is a capacity shortage in Texas. Without energy accounting that is accurate, then everyone is getting charged for whatever the utilities cannot account for.

Because it is easier to convert synchronous optical networking to asynchronous transport mode (ATM) to IP core (managed Ethernet) by changing electronics and converting after routers, the carriers who built fiber networks for delivery of content to end user consumers set up multiple VPNs for use cases. Voice has high priority; video has another priority; browsing has another priority. Prior art is known to provide different TCP/IP sessions and UDP sessions, which send a packet without security or confirmation of its arrival.

For power networks, TDM and analog telemetry inside DSO (channel) is provided, and T1 with channels that sample analog signals, convert them to digital, send down pipe, reconvert to analog at end are provided. In today's power networks, conversion takes place at the device, for example RTU is used to provide analog telemetry from energy management system, ACE equation from closed loop system, analog telemetry tells generator to increase or decrease output for frequency and voltage control, and for grid stability. Grid elements send raw analog telemetry, asynchronous or synchronous transport without encryption or security, connecting analog inputs and outputs, sending thru layers 1-3 in telecommunications networks, or private networks set up for market participants. In the clear, with PCM encoding, or equivalent, analog telemetry following controls of grid elements or market participants that are standardized power equations like ACE or in response to market events to control multiple units to put more or less power into the grid for operating reserves or base load into the grid.

By way of example, relevant prior art documents include the following: US Patent Application Publication No. 20120131100 GE published May 24, 2012 for Data collection from utility meters over advanced metering infrastructure by inventors Van Olst, et al., and assigned on the face of the document to General Electric, describes Data aggregators that provide an intermediate node in an AMI system between utility meters and head end system (as well as other back office systems). Data aggregators collect and transmit data with utility meters using data packets that can be native to individual meters. In other words, while meters are all spontaneously communicating, the data packaging formats, or protocols may differ from meter to meter. Illustrative meter data protocols include, e.g., C12.19, DLMS/COSEM, etc. Communication between the utility meters and data aggregators may be implemented in any fashion, e.g., power line carrier, GPRS/GSM/3G/4G modems, wireless technology, including mesh networks, IP networks, etc. A data aggregator generally includes: (1) a communications system for providing a communication channel with a set of meters; (2) a data collection system for collecting/interrogating data from the meters; (3) an aggregation system for aggregating data collected from different meters (in different data formats) into aggregated data in a unified address space; (4) a data presentation system for synchronizing the aggregated data over a back haul interface to one or more head end systems; and an asset management agent. Communications system includes all the messaging facilities necessary to support solicited, unsolicited, and broadcast functions to communicate with meters. A data aggregator addresses individual meters or broadcast to groups of meters, which is disclosed as able to be accomplished in any manner, e.g., communicating using TCP/IP or any other communication protocol. Within data aggregator, data collection system, asset management agents and data presentation system implement group management strategies such that meter grouping activity performed on the head end system is disseminated to meters, and messages (e.g., behavior modification) targeting groups defined in the head end system are expeditiously propagated to the constituent meters. Once groupings are implemented, data aggregator can implement data transmission directives (e.g., public pricing messages), data collection directives (e.g., daily use data), or other directives from the head end system as a broadcast or multicast signals that address a group of utility meters. Signals are generally transmitted to utility meters without regard to their group membership.

Aggregation system is responsible for managing spontaneous messages in an addressable memory space. Functions provided by aggregation system include the ability to: group the controllable data points such that commanding a change to a single controllable data point affects a set of meters in a defined group; disseminate grouping information to the communication modules in a plurality of utility meters; and broadcast a message addressed to groups of utility meters such that all meters receive the message. In addition, various time stamp and status indications such as link strength, self-test and other status indicators can be easily stored and managed by aggregation system. This reference also describes a meter provisioning process that depicts a meter having a communication card, a data aggregator, an asset management system, and a communication management system. In this example, a new meter is provisioned (i.e., placed into service). When this occurs, the meter's network node credentials are passed to, and verified by, an asset management agent residing on the data aggregator (A). Next, the data aggregator passes the credentials of the newly found meter to asset management system, which verifies the credentials and requests details (e.g., current settings, readings, locations, etc.) (B). Data aggregator relays the request back to meter and returns the details (C). The return details are then forwarded to asset management system, which then provisions meter (D), i.e., activates it within the infrastructure. Asset management system then forwards the meter details to the communication management system, which processes the information (E). Asset management system also forwards the meter details back to data aggregator, which processes and stores the details, configures the asset and obtains a return configuration complete notification (F). This configuration may include the group assignment of the meter. At any time thereafter, data aggregator can issue a data request to meter and obtain a response (G). Once the initial state of meter is known to data aggregator it will issue a spontaneous message back to the communication management system (e.g., a configuration change occurred) (H), service a data request, and return a data response (I) to complete synchronization of the internal data representation. Aspects of the AMI system described can be implemented in the form of an entirely hardware embodiment, an entirely software embodiment or an embodiment containing both hardware and software elements. In one embodiment, the processing functions performed by communication card; data aggregator; and head end may be implemented in software, which includes but is not limited to firmware, resident software, microcode, etc.

Additionally, relevant prior art documents associated with grid elements registration with systems and methods include the following:

U.S. Pat. No. 7,502,698 filed Jul. 5, 2005 by inventors Uenou et al., issued Mar. 10, 2009, and assigned on the face of the issued patent document to IP Power Systems Corp. for Power consumption measuring device and power control system, describes a single phase, 3-wire watt-hour meter that measures power consumption, alters a contract capacity, controls the stop/start of power supply/distribution, and updates programs from a higher level control apparatus, including a central processing unit, a storing means, a communicating means, and interfaces; the device measures the detailed behavior of a power consumption by totaling a power consumption every 30 minutes (and a clocking process for clocking a standard time and for collecting data within that time), interlocks with a gas leakage detector and a fire alarm, controls opening/closing of rain doors and the operation/stop of Internet home electric appliances, and enables low-cost communication by means of dynamic IP address based communication.

U.S. Pat. No. 5,560,022 for Power management coordinator system and interface, describes a power management system and interface providing a flexible and uniform protocol for controlling power management within a computer system including various software layers and add-in components; a programmable power policy manager, which allows user to define a performance/economy setting for the system that is communicated to all registered devices so that dwell and decay times are set by the device; and a programmable event sequencer, which maintains an event notification sequence and control sequence for power events; a programmable power budgeter that maintains and allocates power on a request basis for system elements; a programmable thermal budgeter that maintains and allocates energy based on thermal considerations; and a computer system including a bus for communicating address and data information, a central processor couple to the bus for executing instructions and processing data, and memory coupled to the bus for containing information, and a power management coordinator that includes a power management core for communication of power management information with system devices within the computer system under a uniform power management protocol, wherein particular devices are add-in devices requiring power management, and one of the devices provides programmable dwell time and decay time periods for power management of the add-in devices, wherein power events are generated by clients and broadcast by power management core to power management clients, including a power event sequencer for maintaining a particular sequence of communication about the power events.

U.S. Pat. No. 8,095,233 filed Oct. 10, 2006 by inventors Shankar et al., issued Jan. 10, 2012 and assigned on the face of the issued patent to American Grid, Inc., for Interconnected premises equipment for energy management, describing a system for facilitating direct monitoring and control of energy-consuming appliances, in real time, using automatic programmatic control and a plurality of human interfacing including local display and control, email, web browser, text messaging, and integrated voice response, and describing a monitoring and control coordinator that provides centralized coordination of functions and one or more communicating appliance interfaces that interact with energy consuming appliances that are interconnected via wired and wireless communication networks and protocols, wherein the system allows a user to regulate energy consumption of a premises for heating and air conditioning systems, including a premises control communication gateway in communication with the monitoring and control coordinator.

U.S. Pat. No. 6,301,528 field Aug. 15, 2000 by inventors Bertram et al., issued Oct. 9, 2001, assigned on the face of the patent document to Robert Bosch GmbH, describes a method and an arrangement for controlling electric consumers in a vehicle that are suggested with a control structure provided for consumers, the control structure including at least a high-ranking consumer management that receives requests from the consumers with respect to consumer power individually or as sums; the control structure including a coordinator for the vehicle electrical system and power generation therefor, and for receiving the sum of the requested consumer power from the consumer management; the vehicle electric system adjusting the requested electric power via orders to the vehicle electrical system components and the consumer management taking the generated electrical power via control of the consumers.

US Patent Application Publication No. 20070067132 for Method and apparatus for routing data streams among intelligent electronic devices, disclosing an intelligent electronic device (IED) for protection, monitoring, controlling, metering, or automation of lines in an electrical power system, wherein the IED is adapted to communicated with a variety of other IEDs, including a communication configuration setting that is configured to allow communication with one of the other IEDs; and further including an input element in communication with the communication configuration setting, whereupon a signal from the input element selects a particular communication configuration setting therein, allowing for the communication with other IEDs. Also, including a data stream management device for routing data streams among IEDs associated with the electrical power system, wherein the data streams are substantially unaltered from sent and received forms, and an IED associated with the data stream management device and adapted to communicate with the other IEDs, wherein assertion of an input element selects a particular communication configuration setting.

U.S. Pat. No. 7,609,158 filed Oct. 26, 2006 issued Oct. 27, 2009 for inventors Banting et al., and assigned on the face of the patent document to Cooper Technologies Co., describes a communications network for an electrical power distribution system, the network communicating monitoring signals and control signals for a network of electrical circuits, the network including a sensor node with a sensor device configured to detect an operating condition of the transmission or distribution systems, a sensor communication node corresponding to the sensor device, and configured to transmit a first wireless signal corresponding to the detected operating condition of transmission/distribution, a control communication node separately provided from the sensor communication node, configured to receive the first wireless signal and transmit a second wireless signal corresponding to the first wireless signal, a gateway device in communication with the control communication node and receiving the second wireless signal, and wherein the sensed electrical signals are broadcast.

U.S. Pat. No. 8,060,259 field Jun. 15, 2007 for inventors Budhraja et al., issued Nov. 15, 2011 and assigned on the face of the patent document to Electric Power Group, LLC, (also see US Patent Application Pub. No. 20100100250) for Wide area, real time monitoring and visualization system, describes a real-time performance monitoring system for monitoring an electrical power grid, including grid portions having control areas, and monitoring of reliability metrics, generations metrics, transmission metrics, suppliers metrics, grid infrastructure security metrics, and markets metrics for the electric power grid, wherein the metrics are stored in a database, and visualization of the metrics is displayed on a computer having a monitor.

US Patent Application Pub. No. 20090119039 filed Nov. 7, 2007 by inventors Banister et al., published May 7, 2009 and assigned on the face to SPROUTLETS, INC., describes an electrical power metering system including a plurality of gated power receptacles, each of them being configured to selectively provide electrical power in response to receiving a wireless signal, and further including a service application configured to receive a request to provide electrical power for one of the receptacles, the request including an identifier that designates the receptacle at which power is requested. A local host application executable on a computing device is configured to send wireless signals via a coordinator module to the receptacle to provide power in response to receiving a communication from the service application that includes the identifier.

Other prior art documents relating to electric power grid management and communications associated therewith are known. By way of example, consider the following US Patent and US Patent Applications Publication documents:

U.S. Pat. No. 5,560,022 issued Sep. 24, 1996, filed Jul. 19, 1994 by inventors Dunstand, et al., and assigned on the face of the document to Intel Corporation, for Power management coordinator system and interface.

U.S. Pat. No. 6,301,528 issued Oct. 9, 2001, filed Aug. 15, 2000 by inventors Bertram et al., and assigned on the face of the patent to Robert Bosch GmbH for Method and device for controlling electric consumers in a motor vehicle.

U.S. Pat. No. 7,502,698 issued Mar. 10, 2009, filed Jul. 5, 2005 by inventors Uenou et al., and assigned on the face of the patent to IP Power Systems Corp., for Power consumption measuring device and power control system.

U.S. Pat. No. 8,095,233 issued Jan. 10, 2012, filed Oct. 10, 2006 by inventors Shankar et al., and assigned on the face to American Grid, Inc., for Interconnected premises equipment for energy management.

US Patent Application Publication No. 20070067132 published Mar. 22, 2007 and filed Sep. 19, 2006 by inventors Tziouvaras et al., for Method and apparatus for routing data streams among intelligent electronic devices.

US Patent Application Publication No. 20080040479 filed Aug. 9, 2007 by inventors Bridge, et al. and assigned on the face of the publication to V2Green, Inc. for Connection locator in a power aggregation system for distributed electric resources, discloses a method to obtain the physical location of an electric device, such as an electric vehicle, and transforming the physical location into an electric network location, and further including receiving a unique identifier associated with a device in a physical location. See also related publications WO2008073477, US Pat. Application No.'s 20110025556, 20090043519, 20090200988, 20090063680, 20080040296, 20080040223, 20080039979, 20080040295, and 20080052145.

International Patent Application No. WO2011079235 filed Dec. 22, 2010 and published Jun. 30, 2011 by inventor Williams and assigned on the face of the document to Interactive Grid Solutions, LLC for Distributed energy sources system, describes an energy management system that includes distributed energy sources (for example a wind turbine) that communicate with consumer devices and electric utilities, wherein a CPU is in communication with the distributed energy source and is operable to control the flow of energy produced by the distributed energy source.

US Patent Application Pub. No. 20110282511 filed Mar. 26, 2011 and published Nov. 17, 2011 to inventor Unetich and assigned on the face of the document to Smart Power Devices Ltd for Prediction, communication and control system for distributed power generation and usage, describes an apparatus for obtaining, interpreting and communicating a user reliable and predictive information relevant to the price of electricity service at a prospective time.

U.S. Pat. No. 7,844,370 filed Aug. 9, 2007 and issued Nov. 30, 2010 by inventors Pollack et al. and assigned on the face of the document to GridPoint, Inc. for Scheduling and control in a power aggregation system for distributed electric resources, describes systems and methods for a power aggregation system in which a server establishes individual Internet connections to numerous electric resources intermittently connect to the power grid, such as electric vehicles, wherein the service optimizes power flows to suit the needs of each resource and each resource owner, while aggregating flows across numerous resources to suit the needs of the power grid, and further including inputting constraints of individual electric resources into the system, which signals them to provide power to take power from a grid.

US Patent Application Pub. No. 20090187284 filed Jan. 7, 2009 and published Jul. 23, 2009 by inventors Kreiss et al. for System and method for providing power distribution system information, describes a computer program product for processing utility data of a power grid, including a datamart comprised of physical databases storing utility data applications comprising an automated meter application configured to process power usage data from a plurality of automated meters, a power outage application configured to identify a location of a power outage, and a power restoration application configured to identify a location of a power restoration. See also US Pat. Application No.'s 20110270550, 20110270457, and 20110270454.

Prior art networks associated with electric power grid communications, including various communication methods are known. Today, a patchwork of systems exist to dispatch macro generation, implement demand response load management programs, dispatch of intermittent renewable resources, and energy management and control. These legacy systems are used for both supplying "Negawatts", supply and grid stability to the electric utility grid. In the case of demand management, also referred to in the industry as "Demand Response", various radio subsystems in various frequency bands utilize "one-way" transmit only methods of communication or most recently deployed a plurality of proprietary two-way methods of communications with electric customers or their load consuming device and measurement instruments including, by way of example, "smart meters." In addition, macro generation is controlled and dispatched from centralized control centers either from utilities, Independent Power Producers (IPPs) or other Market Participants that utilize point to point primarily "Plain old telephone service" POTS dedicated low bit rate modems or nailed time division multiplex (TDM) circuits such as T-1s that supply analog telemetry to Energy Management Systems or in some cases physical dispatch to a human operator to "turn on" generation assets in response to grid supply needs or grid stress and high load conditions. These legacy systems operate under a framework supported for decades to attempt to increase the efficiency of existing transmission infrastructure and simultaneously attempt to supply each grid operator, Market Participant or end customer the lowest cost of energy regardless of the type of resource. Unfortunately, these legacy systems, in the industry referred to as "Security Constrained Economic Dispatch" (SCED) utilize complex models with incomplete information to provide both ISOs and Traditional Utilities a means to provide a generation forecast for the next generation time period (for example, day ahead).

SCED has not been successful in the facilitation of new technologies such as Demand Management, Advanced Curtailment contemplated under FERC Order 745, Advanced Storage contemplated under FERC Order 750, or Advanced Distributed Energy Resources contemplated under FERC Order 755.

Existing uses for traditional Demand Response technologies, that are not generally capable of performing to the level contemplated under FERC Order 745, but are used for peak shaving, utilities or other market participants install radio frequency (RF)-controlled relay switches typically attached to a customer's air conditioner, water heater, or pool pumps, or other individual load consuming devices. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off. Furthermore integrating even these simple "load shifting" assets for purposes of settlements is problematic given that these traditional technologies cannot provide the necessary geodetic and other information necessary for these load sources to be integrated into an Energy Management System or settled under the traditional energy dispatch and settlement systems.

Most recent improvements that follow the same concepts for Demand Response are RF networks that utilize a plurality of mesh based, non-standard communications protocols that utilize IEEE 802.15.4 or its derivatives, or "Zig-Bee" protocol end devices to include load control switches, programmable thermostats that have pre-determined set points for accomplishing the "off" or "cut" or reduce command simultaneously or pre-loaded in the resident memory of the end device. These networks are sometimes referred to in the industry as "Home Area Networks" or (HANs). In these elementary and mostly proprietary solutions, a programmable control thermostat(s) (PCTs) or building management systems (BMS) move the set point of the HVAC (or affect another inductive or resistive device) or remove a resistive device from the electric grid thus accomplishing the same "load shifting" effect previously described. All of these methods require and rely on statistical estimations and modeling for measuring their effectiveness and use historical information that are transmitted via these same "smart meters", interval device recorders (IDRs), or revenue grade meters, to provide after-the-fact evidence that an individual device or consumer complied with the demand response or market driven event. Protocols that are employed for these methods include "Smart Energy Profiles Versions 1 & 2" and its derivatives to provide utilities and their consumers an attempt at standardization amongst various OEMs of PCTs, switching, and control systems through a plurality of protocols and interfaces. These methods remain crude and do not include real time, measurement, verification, settlement and other attributes necessary to have their Demand Response effects utilized for effective Operating Reserves with the exception of limited programs for "Emergency" Capacity Programs as evidenced by programs such as the Energy Reliability Council of Texas' (ERCOT's) Emergency Interruptible Load Service (EILS). Furthermore, for effective settlement and control of mobile storage devices such as Electric Vehicles, these early "Smart Grid" devices are not capable of meeting the requirements of Federal Energy Regulatory Commission (FERC), North American Electric Reliability Corp. (NERC) or other standards setting bodies such as the National Institute of Science & Technology (NIST) Smart Grid Roadmap.

While telemetering has been used for the express purpose of reporting energy usage in real time, no cost effective techniques exist for calculating power consumption, carbon gas emissions, sulfur dioxide ($SO_2$) gas emissions, and/or nitrogen dioxide ($NO_2$) emissions, and reporting the state of a particular device under the control of a two-way positive control load management device or other combinations of load control and generator controls as previously described. In particular, one way wireless communications devices have been utilized to deactivate electrical appliances, such as heating, ventilation, and air-conditioning (HVAC) units, water heaters, pool pumps, and lighting or any inductive or resistive device that is eligible as determined by a utility or market participant for deactivation, from an existing electrical supplier or distribution partner's network. These devices have typically been used in combination with wireless paging receivers or FM radio carrier data modulation, or a plurality of 2-way proprietary radio frequency (RF) technologies that receive "on" or "off" commands from a paging transmitter or transmitter device. Additionally, the one-way devices are typically connected to a serving electrical supplier's control center via landline trunks, or in some cases, microwave transmission to the paging transmitter.

While one-way devices are generally industry standard and relatively inexpensive to implement, the lack of a return path from the receiver, combined with the lack of information on the actual devices connected to the receiver, make the system highly inefficient and largely inaccurate for measuring the actual load shed to the serving utility or compliant with measurement and verification for presenting a balancing authority or independent system operator for operating reserves and settlements. The aforementioned "two-way" systems are simultaneously defective in addressing real time and near real time telemetry needs that produce generation equivalencies that are now recognized by FERC Orders such as FERC 745 where measurable, verifiable Demand Response "Negawatts", defined as real time or near real time load curtailment where measurement and verification can be provided within the tolerances required under such programs presented by FERC, NERC, or the governing body that regulate grid operations. The aforementioned "smart meters" in combination with their data collection systems commonly referred to as "Advanced Metering Infrastructure" (AMI) generally collect interval data from meters in historical fashion and report this information to the utility, market participant or grid operator after the utility or grid operator has sent notice for curtailment events or "control events" to initiate due to high grid stress that includes lack of adequate operating reserves to meet demand, frequency variations, voltage support and any other grid stabilizing needs as identified by the utility or grid operator and published and governed by FERC, NERC, or other applicable regulations. Standard AMI meters report historical information at least 15 minutes after the event occurred, but the time lag could be as long as 24 hours.

One exemplary telemetering system is disclosed in U.S. Pat. No. 6,891,838. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate the reduction of electricity. In contrast, this patent discloses techniques that could be utilized for reporting information that is being displayed by the serving utility's power meter (as do many other prior applications in the field of telemetering).

An additional exemplary telemetering system is disclosed in US Patent Application Publication No. 20050240315, which describes an improved interactive system for remotely monitoring and establishing the status of a customer utility load. A stated goal of this publication is to reduce the amount of time utility field personnel have to spend in the field servicing meters by utilizing wireless technology.

Another prior art system is disclosed in U.S. Pat. No. 6,633,823, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control or their ability to meet the measurement, telemetry, verification requirements of the grid operator or ISO. Furthermore, submetering technology within the smart breaker, load control device, command relay devices or building control systems have not existed in the prior art.

One such gap-bridging attempt is described in U.S. Patent Application Publication No. US 20050065742 A1. This publication discloses a system and method for remote power management using IEEE 802 based wireless communication links. The system described in this publication includes an on-premise processor (OPP), a host processor, and an end device. The host processor issues power management commands to the OPP, which in turn relays the commands to the end devices under its management. While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. Neither the host processor nor the OPP tracks or accumulates power saved and/or carbon credits earned on a per customer or per utility basis for future use by the utility and/or customer. Also, the system described in this publication does not provide for secure communications between the host processor and the OPP, and/or between the OPP and the end device.

Thus, none of the prior art systems, methods, or devices provides complete solutions for communications of data packets and messaging with grid elements and network management, including messaging over communication networks and energy management over the electric power grid network. Therefore, a need exists for systems and methods for messaging associated with grid element participation including secure data packet messaging to overcome the shortcomings of the prior art.

SUMMARY OF THE INVENTION

The present invention provides systems, methods, and IP-based messages associated with the grid elements, wherein each IP-based message includes an internet protocol (IP) packet that is generated autonomously and/or automatically by the grid elements, intelligent messaging hardware associated with the grid elements, at least one coordinator, and/or a server associated with the electric power grid and its operation, energy settlement, and/or financial settlement for electricity provided or consumed, transmitted, and/or curtailed or reduced. The IP packet preferably includes a content including raw data and/or transformed data, a priority associated with the IP-based message, a security associated with the IP packet, and/or a transport route for communicating the IP-based message via the network. A multiplicity of active grid elements have predetermined functions to participate in the electric power grid for supply, demand, curtailment, control, transmission, distribution, metering, etc., and are compensated with a financial settlement for their functional participation in the electric power grid. Also, communication of the IP-based message and its IP packet is managed through a network by a Coordinator using IP messaging for communication with the grid elements, with the energy management system (EMS), and with the utilities, market participants, and/or grid operators.

The content of the IP packet includes content elements selected from raw data, raw data plus additional information, transformed data, a status, a change of status, a function of the grid element associated with the content, and combinations of these content elements. Raw data includes information generated by, sensed by, measured by, or stored by a grid element; raw data includes metrology, location, grid element identifier, C.12.19 tables, meter data, software version, firmware version, LSE priority, and combinations thereof.

According to the present invention, the content may further include transformed data, wherein the transformation of raw data associated with at least one grid element occurs automatically when an application acts on the raw data to convert it from a first state, which is a raw data state (i.e., the raw data means data collected, sensed, measured, or generated by the grid element during its participation in its predetermined function or role within the electric power grid), to a second state, which is a transformed data state, which transformation is automatically performed by a processor operatively coupled with memory associated with, residing within, or connected to, the initiating grid element, a receiving grid element, a coordinator, or combinations thereof. In an alternate embodiment, additional transformation is performed at a server computer.

In embodiments of the present invention, grid elements communicate IP messages having IP packets, preferably through network-based communication between the grid elements, a Coordinator, a translator, legacy systems, and/or a settlement processor. Also preferably, messaging is managed through a network by a Coordinator using IP messaging for communication with the grid elements, with the energy management system (EMS), Distribution Management System (DMS), and with the utilities, market participants, and/or grid operators. The Coordinator is further operable for communicating data with a database, a persistence layer or cache, an ASIC or memory contained in a grid element or the processor, or combinations thereof, and to provide an overall assessment of electric grid operations (normal or emergency) including but not limited to energy flows within the system, grid stabilization information, operating reserves, capacity, transmission and distribution capacities, grid element capacities, settlement, and combinations thereof.

Accordingly, one aspect of the present invention is to provide a system for electric power grid network management including: at least one grid element constructed and configured for electrical connection and network-based communication with a server and/or a processor operatively coupled with memory; wherein the grid element collects, generates, senses, stores and/or measures raw data associated with a predetermined function within the electric power grid that is performed by the grid element; the raw data is transformed into transformed data associated with each of the at least one active grid elements and provided in an IP packet for communication as an IP message, which is transmitted via a network, preferably a communications network, and wherein the transformation of the raw data is preferably automatic and/or autonomous.

A grid element is any functional component within an electric power grid. By way of example and not limitation, at least one of the grid elements is a control device that operates, programs and updates select load consuming device(s) or generating devices associated with the electric power grid (including but not limited to control systems, thermostats, controllers, anything that controls the device, switch gear, large control systems operating from a control center or box with interface to a large control system, such as a distribution automation control system; transformation process includes whatever control systems are attached to the electric devices, their databases, tables, memory, ASICs, firmware, software, operating systems, and combinations thereof and/or other grid elements).

Also, in one aspect of the present invention a method for communicating an IP message including an IP packet relating to data associated with at least one grid element within an electric power grid, where the IP message communicated over a network associated with the electric power grid is provided, including the steps of: providing at least one grid element constructed and configured for electrical connection and network-based communication with a server, a coordinator, and/or at least one other grid element; the at least one grid element communicating an IP-based message over the network, wherein the message is preferably standards-based or proprietary; the IP message further including an IP packet having data associated with at least one grid element and its intended active functioning within the electric power grid. The methods may further include providing an IP packet that includes a content, a priority, a security, a transport route, and combinations thereof. Also, methods may further include the step of: automatically transforming raw data into transformed data associated with the at least one grid element. Messages are sent via the network and include Internet Protocol (IP)-based messaging, which provides for secure communication, for example using encryption, private networks, or IP encapsulation over proprietary networks. Thus, the present invention preferably provides secure communications of the IP messages and IP packets, which are improved over the prior art's use of analog telemetry such as in outage detection systems, and telemetry sub-systems.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 22 is a table of consumer-adjustable parameters as examples for systems and methods components according to the present invention.

DETAILED DESCRIPTION OF THE PRESENT INVENTION

Figure 1:
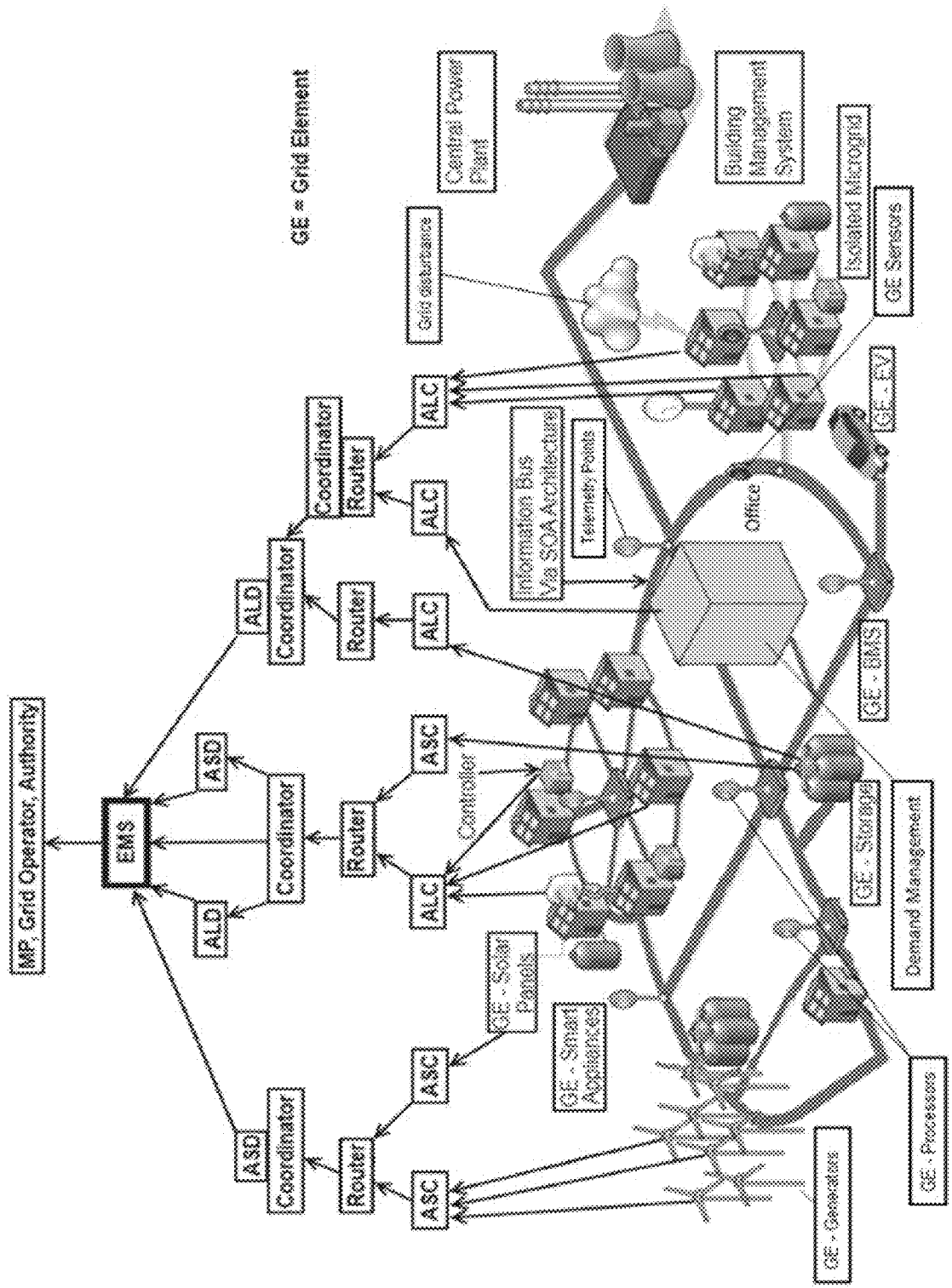
FIG. 1 is a schematic diagram illustrating a coordinator and grid elements within the systems and methods of the present invention.

The present invention provides systems, methods, and apparatus embodiments for generating, communicating, and/or receiving Internet Protocol (IP) packets for IP-based messaging associated with electric power grid elements via electronic communications networks for electric power grid and network registration, updating, and/or management of a multiplicity of grid elements distributed within the electric power grid. The IP packets further include messages and/or data associated with the function and/or participation in the electric power grid of the grid elements, providing network-based communications with secure IP packets for messaging and communications relating to the electric power grid (or microgrid), and/or for messaging for energy settlement and/or corresponding financial settlement, including but not limited to market-based financial settlement for grid element participation in the electric power grid. The systems, methods, and messages of the present invention include IP-based messages associated with the grid elements, wherein the IP-based message includes an internet protocol (IP) packet that is generated autonomously and/or automatically by the grid elements, intelligent messaging hardware associated with the grid elements, at least one coordinator, and/or a server associated with the electric power grid and its operation, energy settlement, and/or financial settlement for electricity provided or consumed, transmitted, and/or curtailed or reduced. The IP packet preferably includes a content including raw data and/or transformed data, a priority associated with the IP-based message, a security associated with the IP packet, and/or a transport route for communicating the IP-based message via the network.

Accordingly, the present invention provides for internet protocol (IP) messages and IP-based network communication of IP messages, wherein the IP message is constructed and configured to be communicated over an IP-based network connecting (wired, wireless, and combinations) at least one grid element participating in an electric power grid and at least one server computer that is associated with the energy management system(s) for the electric power grid(s). The IP message further includes an IP packet that includes a content (raw data, transformed data, status, change in state, revenue grade metrology, unique grid element identifier, and combinations), a priority, a security, and a transport route for communication over the IP network.

The content of the IP packet includes content elements selected from raw data, raw data plus other information relating to the raw data and/or the grid element, transformed data, revenue grade metrology, a status, a change of status, a function of the grid element associated with the content, and combinations of these content elements. Raw data includes information generated by, sensed by, measured by, or stored by a grid element; raw data includes metrology, location, grid element identifier, C.12.19 tables, meter data, software version, firmware version, LSE priority, and combinations thereof. The transformed data can be static or dynamic. For this application, dynamic means that the transformed data changes or may change or be affected when grid conditions change, thus, the dynamic transformed data is additionally or subsequently changed or transformed due to or reacting to grid reliability, grid stability, energy settlements, and/or financial settlements. According to the present invention, the transformation of raw data associated with at least one grid element is automatic and/or autonomous when an application acts on the raw data to convert it from a first state, which is a raw data state (i.e., the raw data means data collected, sensed, measured, and/or generated by the grid element during its participation in its predetermined function or role within the electric power grid), to a second state, which is a transformed data state, which transformation is automatically performed by a processor operatively coupled with memory associated with, residing within, or connected to, the initiating grid element, a receiving grid element, a coordinator, or combinations thereof. In an alternate embodiment, additional transformation is performed at a server computer.

The present invention provides systems, methods, and IP-based messages associated with the grid elements, wherein each IP-based message includes an internet protocol (IP) packet that is generated autonomously and/or automatically by the grid elements, intelligent messaging hardware associated with the grid elements, at least one coordinator, and/or a server associated with the electric power grid and its operation, energy settlement, and/or financial settlement for electricity provided or consumed, transmitted, and/or curtailed or reduced. The IP packet preferably includes a content including raw data and/or transformed data, a priority associated with the IP-based message, a security associated with the IP packet, and/or a transport route for communicating the IP-based message via the network. A multiplicity of active grid elements have predetermined functions to participate in the electric power grid for supply, demand, curtailment, control, transmission, distribution, metering, etc., and are compensated with a financial settlement for their functional participation in the electric power grid; the IP packets include information about the grid elements and their functions and participation in the electric power grid that is communicated to server(s) associated with EMS, market participants, power suppliers (including but not limited to utilities), and/or grid operators over network(s). Also, communication of each of the IP-based messages and corresponding IP packets is managed through a network by a Coordinator using IP messaging for communication with the grid elements, with the energy management system (EMS), and with the utilities, market participants, and/or grid operators.

The content of the IP packet includes content elements selected from raw data, raw data plus additional information, transformed data, a status, a change of status, a function of the grid element associated with the content, and combinations of these content elements. Raw data includes information generated by, sensed by, measured by, or stored by a grid element; raw data includes metrology, location, grid element identifier, C.12.19 tables, meter data, software version, firmware version, LSE priority, and combinations thereof.

According to the present invention, the content may further include transformed data, wherein the transformation of raw data associated with at least one grid element occurs automatically when an application acts on the raw data to convert it from a first state, which is a raw data state (i.e., the raw data means data collected, sensed, measured, or generated by the grid element during its participation in its predetermined function or role within the electric power grid), to a second state, which is a transformed data state, which transformation is automatically performed by a processor operatively coupled with memory associated with, residing within, or connected to, the initiating grid element, a receiving grid element, a coordinator, or combinations thereof. In an alternate embodiment, additional transformation is performed at a server computer.

In embodiments of the present invention, grid elements communicate IP messages having IP packets, preferably through network-based communication between the grid elements, a Coordinator, a translator, legacy systems, and/or a settlement processor. Also preferably, messaging is managed through a network by a Coordinator using IP messaging for communication with the grid elements, with the energy management system (EMS), Distribution Management System (DMS), and with the utilities, market participants, and/or grid operators. The Coordinator is further operable for communicating data with a database, a persistence layer or cache, an ASIC or memory contained in a grid element or the processor, or combinations thereof, and to provide an overall assessment of electric grid operations (normal or emergency) including but not limited to energy flows within the system, grid stabilization information, operating reserves, capacity, transmission and distribution capacities, grid element capacities, settlement, and combinations thereof.

The multiplicity of active grid elements function in the grid for various roles and participate in the electric power grid to provide, by way of example and not limitation, control, reporting, status, grid operations (normal or emergency), any source of macro supply capacity/energy, supply as distributed energy resources from a plurality of methods, supply/energy through storage devices, and/or load curtailment as supply or capacity, and communicate IP messages having IP packets that include transformed data associated with those corresponding grid element activities or raw data collected, generated, sensed, stored, cached, and/or measured by the grid element(s).

The transformation of messaging to IP format is not be trivial or obvious to one ordinarily skilled in the art for many reasons: i) existing grid elements generally transmit their information within a transport mechanism where the raw data is not transformed, but rather transmitted "in the clear" or under private networks whereby the plurality of systems utilized for grid operations, grid stability, grid reliability may or may not be separated from messages dealing with less critical functions such as metering information from data collectors known in the art as "AMI Head Ends" or data sorting systems also known in the art as "Meter Data Management" systems; ii) existing grid operators use a combination of privately owned infrastructure that could be single purpose fiber optic cables utilizing TDM transport methods such as Synchronous Optical Networking (SONET), Digital Multiplexers, Frame Relay, DS-1 (Time Division Multiplexed) circuits or analog modems utilizing "Plain Old Telephone Service" (POTS). These privately owned networks may include unbundled network elements purchased from common carriers, wireless mobile operators, or private radio operators inclusive of paging systems and radio subsystems of a plurality of standards and proprietary modulation methods; iii) critical infrastructure and command/control may share the same physical layer and network equipment making intrusion, security, and operations of the electric grid vulnerable. The inevitable transition from time division, ATM, frame relay, or POTs transport services necessitate and teach towards changes in how data is transformed, prioritized, coordinated, and then ultimately transported on managed Ethernet Networks whether they be secured from telecom carriers or re-built by grid operators, market participants, independent system operators, regional transmission organizations or pluralities of all.

Accordingly, the present invention provides a system for electric power grid network management including: at least one grid element constructed and configured for electrical connection and network-based communication with a server and/or a processor operatively coupled with memory; wherein the grid element collects, generates, senses, stores and/or measures raw data associated with a predetermined function within the electric power grid that is performed by the grid element; the raw data is transformed into transformed data associated with each of the at least one active grid elements and provided in an IP packet for communication as an IP message, which is transmitted via a network, preferably a communications network, and wherein the transformation of the raw data is preferably automatic and/or autonomous.

The present invention methods, systems, and IP-based messages provide transformation of raw data associated with grid elements, following their registration with IP-based messaging that communicated via the network and preferably through a coordinator. Following registration, the active grid elements operate according to their respective intended functions, and also preferably continue to have automatic communications and messaging via the network through at least one coordinator. Because of the automatic and preferably autonomous registration and ongoing messaging with the grid elements, the grid elements operate collectively for managing flow of power for an electric grid, micro grid, or other system, or combinations thereof, more particularly the supply of electric power for the grid, whether by generation, storage for discharge, electric vehicles (EV), which function as transportable storage and load consuming devices, either standalone or in aggregate, (and must be tracked to ensure proper settlement and grid stability management), and/or load curtailment, and function to ensure grid stability and to supply electric power from any source of power generation, storage, and/or curtailment that equates to supply.

According to the present invention, grid stabilizing metrics including voltage, current, frequency, power factor, reactive and inductive power, capacitance, phase control, and/or any other grid metric that is required by a grid operator, market participant, utility, and the like, to operate and maintain electric power grid stability as determined by the grid operator or the governing entity therefor. Preferably, these metrics are monitored and/or measured at a multiplicity of points, and more preferably using active grid elements and their attributes and status information throughout the electric power grid, including but not limited to locations within or at the distribution system, transmission system, electrical bus (substation), generation source, supply control devices, load control devices, load consuming devices (particularly those involved in curtailment activities), at least one Coordinator, and combinations thereof. The metrics apply to any size and type of active grid element, regardless whether the generation source is macro in nature, e.g., large scale generation such as large coal, nuclear, gas or other traditional or non-traditional sources of generation, micro-grid generation, emergency back-up power generation, alternative energy generation, e.g., wind, solar, etc., or a power storage device or fuel cell that is potentially available for discharge.

Also, at least one of the active grid elements may include client devices or the associated power consuming or generation control devices have the ability to independently execute commands from an Active Load Director (ALD), Active Load Client (ALC), a $3^{rd}$ party Energy Management System (EMS), Active Supply Director (ASD), Coordinator, Generation Source Supply (GSS), Storage Source Supply (SSS), transmission/distribution capacity, messaging, settlements, security, and combinations thereof, that provide for both load consuming and generation to engage with the electric power grid at attachment points with assured grid stability as indicated by the grid stability metrics for compliance with requirements of the grid operator, utility, market participant, grid governing authority, and/or any other regulations applicable to the electric power grid. All of these active grid elements preferably receive their commands and send communications and/or messaging via an IP message via a Coordinator or Layer 3 router capable of handling all current and future iterations of IP messaging contemplated during the life of this invention.

Also preferably, all messaging to and from active grid elements is controlled, managed, and transmitted through the Coordinator, which communicates between the many active grid elements, including and following their initial registration, and the EMS and/or grid operator, utility, governing authority, and combinations thereof. More preferably, all commands and communications are routed through and by the Coordinator, which is constructed and configured for direct and/or wireless communication with the multiplicity of grid elements, and further includes components of processor, memory, persistence layer, memory cache, messaging engine, security interface, status and/or change-in-status indicator, geodetic locator, telemetry, connections with the network, software operable for managing and changing the connections, database with software operable for storing and analyzing data associated with transmission and distribution attachments, service points, active grid elements, registration, authentication, PSV, PTB, identification, capacity and capability of load and supply, software version control for active grid elements, software improvement control, software for settlement, and combinations thereof. Other switch elements, which may be included as active grid elements, that may be applicable to the Coordinator, and are included with the present invention include customer identification and authentication, customer security, attachment information and capacities, reservations for utilizing the transmission and distribution system, signaling to the electric grid or its operator the plurality of all the above. The Coordinator functions as an "energy router" whereby the messaging required to route supply, demand and transmission/distribution capacity to and from the grid is differentiated from pure communications routing and relates to grid stability and improved grid performance. Thus, the Coordinator is not merely functional as a traditional telecommunications router, but further includes the aforementioned messaging, management, and control functionality required for supply or curtailment to the electric power grid. The Coordinator is consistent with compliance as contemplated in the aforementioned FERC orders where frequency deviations, security, and grid performance are all now needed in an era of aging grid infrastructure and a changing and dynamic load environment where the legacy macro grid and the interim "Smart Grid" elements are not capable of responding to the new needs that FERC and NERC have identified and charged the market participants to solve, which have not yet been solved by any prior art, but which are addressed by the present invention. The energy routing function of the coordinator serves as a traffic manager, and a messaging engine, to track all the active grid elements, secure reservations and settlement information on the electric power grid and the interface for one-to-many (i.e., one port for EMS to the many active grid elements under the control of an EMS and supplying grid stability from the many to the one) allowing for microelements and distributed generation and distributed load curtailment to perform with the macro grid without taxing and destroying the legacy infrastructure beyond its capabilities and limitations; the Coordinator is further operable for tracking and maintaining status of all devices within its defined boundaries, or as described hereinabove with respect to PSV, or determined by the governing authority for the grid, which includes a balancing area, an ISO, a utility, a market participant, and combinations thereof.

Preferably, the Coordinator manages all registered active grid elements according to their characteristics, profiles associated therewith, location, and capability for responsiveness to the various electric power grid resource requirements. The Coordinator further operates to match and prioritize these registered active grid elements and provides messaging of their information and/or matching and prioritization to communication elements, including wireless and/or wireline carriers, so that the messaging is then prioritized through any or all of the networks for communication of any messages to the utility, market participant, grid operator, EMS, and combinations thereof, based upon the grid resource requirements at any given time. Thus, the Coordinator provides priority "flags" on messaging that may be communicated over existing telecommunications infrastructure to provide grid stability and resources messaging with priority messaging over other information transmitted through those communications networks regardless if they have been configured to offer priority or "class" of service or not, VPNs or not. In particular, since electric power generation, distribution and transmission is part of critical infrastructure and provides an asset for national security in many countries, including the United States of America, the present invention provides for enhanced critical infrastructure security with the priority messaging associated with the Coordinator and allows the Coordinator to take advantage of new chip and ASIC technologies that will accommodate multiple routes, VPNs, APNs, and IP addresses per active grid element, ALC, ASD, GSS, SSS, Smart Meter, Service Point, transmission, distribution element or combinations thereof.

The Coordinator is operable for and includes Layer 1-4 for communication, but additionally, and significantly, the Coordinator further tracks and communicates and controls where elements are attached to the grid, makes or communicates decisions about how the resources are used either with or without communication to any active grid element, including but not limited to ALD or ASD, or EMS, communicates the status of any and all active grid elements to legacy distribution automation and transmission reporting subsystems and provides for new methods for direct contribution by active grid elements to the grid stability through load curtailment and/or supply from any source, and for settlement of same, and the security, authentication, initial registration of the devices with the grid, ALD, ASD, market participant, grid operators, their legacy subsystems and/or EMS for the electric power grid; and change of status for those active grid elements; and combinations of these, while simultaneously facilitating and routing those messages to the appropriate subsystem to achieve the supply, curtailment, and/or grid stability requested by the legacy subsystems, or through the present invention, all with IP-based messaging. Most preferably, using digitally encrypted secure IP messaging delivered through a network via Ethernet, wireless messaging, or proprietary methods, including carrier-grade wireless and/or wired networks for communication.

Priority messaging is also provided by systems and methods of the present invention. OSI equivalent for financial messaging, including price, consumption, location, trouble, loss of connectivity, increase or decrease consumption or supply (associated with price), etc. Prioritization for participation messaging is provided under the present invention; initial registration is followed by messaging associated with the grid element relating to participation, profiles, etc. Authentication is preferably included with registration, and any and all updating or changes to settings, profile, preferences, and particularly including location. Location defines resource node, attachment point, losses, electrical bus, PSV, PTB, and combinations thereof, and therefore, financial settlement factors and final value of settlement for the participation for each of the grid elements.

A grid element is defined to be any functional component within an electric power grid. By way of example and not limitation, at least one of the grid elements is a control device that operates, programs and updates select load consuming device(s) or generating devices associated with the electric power grid (including but not limited to control systems, thermostats, controllers, anything that controls the device, switch gear, large control systems operating from a control center or box with interface to a large control system, such as a distribution automation control system; transformation process includes whatever control systems are attached to the electric devices, their databases, tables, memory, ASICs, firmware, software, operating systems, and combinations thereof and/or other grid elements).

Also, in one aspect of the present invention a method for communicating an IP message including an IP packet relating to data associated with at least one grid element within an electric power grid, where the IP message communicated over a network associated with the electric power grid is provided, including the steps of: providing at least one grid element constructed and configured for electrical connection and network-based communication with a server, a coordinator, and/or at least one other grid element; the at least one grid element communicating an IP-based message over the network, wherein the message is preferably standards-based or proprietary; the IP message further including an IP packet having data associated with at least one grid element and its intended active functioning within the electric power grid. The methods may further include providing an IP packet that includes a content, a priority, a security, a transport route, and combinations thereof. Also, methods may further include the step of: automatically transforming raw data into a transformed data associated with the at least one grid element. Messages are sent via the network and include Internet Protocol (IP)-based messaging, which provides for secure communication, for example using encryption, private networks, or IP encapsulation over proprietary networks. Thus, the present invention preferably provides secure communications of the IP messages and IP packets, which are improved over the prior art's use of analog telemetry such as in outage detection systems, and telemetry sub-systems.

Furthermore, the present invention provides for the messages either transmitted to grid elements or from grid elements from various sub-systems utilized for the electric power grid to themselves determine their route, their priority, their function, their content, their security based upon the condition of the electric power grid or the conditions of the market. Such dynamic changes are completely new and taught as a mechanism to combine the ability of messages to take advantage of Open Systems Interconnection (OSI) Layers 1-4 and Layers 5-7 whereby the protocols ability to communicate on a globally accepted protocol, but whereby the present invention teaches to change the layers within the protocols to respond to the various types of grid element packets that will be required in the network transformation.

The present invention does not intend to exclude the accepted transports methods of User Datagram Protocols (UDP), or Transport Control Protocol/Internet Protocol, but rather utilize these accepted transport methods once the grid element or coordinator have determined the function of the packet, the identifier for the element of the packet, the participation of the packet, the priority of the packet or whether the packet contains grid stability information, grid reliability information, market information, metrology, revenue grade information, or packets of transformed data that contain information needed to facilitate market based energy financial settlements.

Each of these packets may or may not utilize a coordinator. The coordinator may be able to utilize the Layer 1-4 information to determine the packet's route, network, sub-network, based upon the aforementioned content whereby the content drives the packet rather than the current methods.

In embodiments of the present invention, grid elements are transformed into active grid elements following initial registration of each grid element with the system, preferably through network-based communication between the grid elements, a Coordinator, a translator, and a settlement processor. Also preferably, messaging is managed through a network by a Coordinator using IP messaging for communication with the grid elements, with the energy management system (EMS), Distribution Management System (DMS), and with the utilities, market participants, and/or grid operators. Furthermore, the Coordinator is operable for receiving information communicated from grid elements, authenticating, and registering grid elements, and for receiving and communicating data associated with the participation for supply, curtailment as supply, and/or consumption of electric power from the grid, and settlement associated with that participation for each of the grid elements, again as contemplated by the aforementioned and any follow on FERC or NERC Order that is meant to influence resources for capacity, energy, energy equivalents, micro/macro generation, storage technologies, transmission capacities, grid elements, ancillary services, settlement intersections know and defined or those defined through the implementation of this art, thereby transforming real-time or less than about 15 minute interval data into automated settlement. The Coordinator is further operable for communicating data with a database, a persistence layer or cache, an ASIC or memory contained in a grid element or the processor, or combinations thereof and to provide an overall assessment of electric grid operations (normal or emergency) including but not limited to energy flows within the system, grid stabilization information, operating reserves, capacity, transmission and distribution capacities, grid element capacities, settlement, and combinations thereof.

Following registration, the multiplicity of active grid elements function in the grid for control, reporting, status, grid operations (normal or emergency), any source of macro supply capacity/energy, supply as distributed energy resources from a plurality of methods, supply/energy through storage devices, and/or load curtailment as supply or capacity, wherein the registered, active grid elements and their corresponding activities and information associated with those activities deliver electric supply to the electric grid, curtail load sources, control active or passive grid elements used in the operation of the grid, or any other device that is attached to the electric grid for its normal or emergency functions and are tracked and managed in accordance with regulations and standards governing the electric power grid. Reporting and tracking status of those grid elements with and through the coordinator or the coordinator in communication with legacy grid operator subsystems is also important in determining settlements for the aforementioned use cases. When grid elements are inactive, unanticipated outages, growth or changes in the electric grid, replacement of defective or upgrades to grid elements or a portion of the transmission or distribution system becomes inactive for a plurality of reasons (grid element outage), the impact of these changes in normal grid operation will impact settlements for those Market Participants or individual sources of supply, curtailment and their associated settlements inclusive of grid elements.

In embodiments of the present invention, grid elements communicate IP messages having IP packets, preferably through network-based communication between the grid elements, a Coordinator, a translator, and a settlement processor. Also preferably, messaging is managed through a network by a Coordinator using IP messaging for communication with the grid elements, with the energy management system (EMS), Distribution Management System (DMS), and with the utilities, market participants, and/or grid operators. The Coordinator is further operable for communicating data with a database, a persistence layer or cache, an ASIC or memory contained in a grid element or the processor, or combinations thereof, and to provide an overall assessment of electric grid operations (normal or emergency) including but not limited to energy flows within the system, grid stabilization information, operating reserves, capacity, transmission and distribution capacities, grid element capacities, settlement, and combinations thereof.

A multiplicity of active grid elements function in the grid for control, reporting, status, grid operations (normal or emergency), any source of macro supply capacity/energy, supply as distributed energy resources from a plurality of methods, supply/energy through storage devices, and/or load curtailment as supply or capacity, and communicate IP messages having IP packets that include transformed data associated with those corresponding grid element activities or raw data collected, generated, sensed, stored, or measured by the grid element(s).

The present invention is provides a system for electric power grid IP-based message communication including: at least one grid element constructed and configured for electrical connection and network-based communication with a server and/or a processor operatively coupled with memory; wherein the grid element collects, generates, senses, stores and/or measures raw data associated with a predetermined function within the electric power grid that is performed by the grid element; the raw data is transformed into transformed data associated with each of the at least one active grid elements and provided in an IP packet for communication as an IP message, which is transmitted via a network, preferably a communications network, and wherein the transformation of the raw data is preferably automatic and/or autonomous.

In method steps according to the present invention, the method for IP-based message communications in an electric power grid includes the steps of:
providing at least one grid element having a processor operatively coupled with memory, the at least one grid element constructed and configured for electrical connection and network-based communication with a server, a coordinator, and/or at least one other grid element; the grid element collecting, generating, sensing, detecting, storing and/or measuring raw data associated with a predetermined function within the electric power grid that is performed by the corresponding grid element; automatically transforming the raw data into transformed data associated with the corresponding grid element;
generating an IP packet including the transformed data for communication as an IP message; and transmitting the IP message via a communications network to the server, the coordinator, and/or the at least one other grid element. Additional steps include: indicating a priority associated with the IP-based message, providing a security for the IP-based message and its communication over the network, and/or designating or identifying a transport route for communicating the IP-based message via the network.

Also, the present invention provides a method for communicating an IP message including an IP packet relating to data associated with at least one grid element within an electric power grid, where the IP message communicated over a network associated with the electric power grid is provided, including the steps of: providing at least one grid element constructed and configured for electrical connection and network-based communication with a server, a coordinator, and/or at least one other grid element; the at least one grid element communicating an IP-based message over the network, wherein the message is preferably standards-based or proprietary; the IP message further including an IP packet having data associated with at least one grid element and its intended functioning actively within the electric power grid. The methods may further include providing an IP packet that includes a content, a priority, a security, a transport route, and combinations thereof. The content includes raw data, transformed data, status, change in status, function of the grid element, grid element identifier, and combinations thereof. Also, methods may further include the step of: automatically transforming raw data into transformed data associated with the at least one grid element. Messages are sent via the network and include Internet Protocol (IP)-based messaging, which provides for secure communication, for example using encryption, private networks, or IP encapsulation over proprietary networks.

Regarding the factors of hierarchy for communications in present invention, the following layers are provided: build OSI model for application layer, or layers 4-7 that are specific to energy (2 use cases), because layers 1-3 will be defined by the standards; physical link layer 1; layer 2 is transport; first place converting is the core, before going to the edges, but now going to the edges. The present invention uses these networks, but significantly the IP packet-based messages, especially those associated with critical infrastructure, as with the electric power grid, water, natural gas, emergency communications, and combinations thereof, have priorities over other messages within the network, for example wherein routine messages for metrology, updates, etc., are given a lesser priority even though they are associated with the energy grid, while alert broadcast messaging as IP packets have a higher priority; this provides for priority of the IP packets and IP packet-based messages of the present invention over critical infrastructure networks.

Additionally, the IP packet-based messages of the present invention override net neutrality, which provides for all packets to be treated the same or similarly with respect to priority of transport. Also, using forms of encryption further enhance advanced grid stability programs, as the grid and grid communications require it. In one example, encrypted energy settlements data is provided within the IP packet as payload.

In another embodiment of the present invention, individual virtual private network virtual private network (VPN) networks for different use may be provided and still considered within the scope of the invention. This provides for use of existing communication systems for IP packet transport. By establishing hierarchy within existing networks, e.g., distributed generation with VPN, firewall with security, encryption, etc. In one example, grid elements decode messages and the IP packets they receive. At a software layer, thin client or messaging brokers are provided to ensure message integrity for delivery, response, and/or monitoring purposes within the present invention. In a managed network, if one ring or one route fails, the other route picks it up (backup) based upon hierarchy and/or priority, through at least one coordinator and/or communications router.

Network congestion and queuing theory may be used for IP packet and IP packet-based messaging traffic engineering over the networks is provided for the present invention, wherein monitoring of the traffic to observe what packets are passing through or not. Deep packet inspection, or flags with priority instructions based upon the needs of the grid are provided. If IP packets are queued then at the attachment point, the generator can do primary frequency control, etc. with this functionality. EMS may provide shadow settlements and/or actual energy and financial settlements to queue inside a messaging broker, so that when a connection is reestablished, then the messaging order continues, and messaging moves again under the hierarchy established by the rules engine(s) and/or priority messaging of the IP packets of the present invention.

New rules are provided for controls for microgeneration, including solar, storage, wind, etc., to isolate themselves from the primary electric power grid, wherein controls within the microgrid or control area are provided over an Ethernet architecture where IP packets and/or IP packet-based messaged are managed by the static and/or dynamic priorities of the electric power grid and the hierarchy in which they are needed for grid operations based upon factors including near-real-time requirements of the electric power grid, including factors for determining the priority and presentation based upon the dynamic priority of the electric power grid at any given time, which include grid reliability factors, grid stability factors, energy market-based factors, billing determinants, energy settlement factors, financial settlement factors, transmission factors, and revenue grade metrology.

Control, priority and security for IP packets and their communications are important. There is no implementation today of IP packet-based communication for prioritized, secure, controlled messaging for electric power grid intelligence within the energy sector or within other commodities, including electricity, oil, gas, water, natural gas, etc. as well as for renewable energy. The present invention provides complete IP packet communications over IP networks for control of the grid elements, their functionality and/or participation in the electric power grid or microgrid. By contrast, the prior art legacy patchwork system relies on TDM networks because of speed and lack of latency, even though data requirement is small. Digital POTS lines are connected to TDM frames. Time division multiplexing (TDM) networks use frame counters, such as DS1, DS3, DS152, etc. to aggregate and then send messages over synchronous optical networks, break them down, send to end recipient. Redundant TDM circuits are required to have a backup for electric grid critical infrastructure communications. Analog telemetry data requirement is not high. And sending messages in the clear allows for interception by unauthorized entities, so the state of the art within the electric power grid is not secure, prioritized, or controlled and does not use IP packet-based messaging for its management, communications, settlements, and/or operation to maintain grid stability and grid reliability, as with the present invention.

Interoperability is provided with the IP packet-based messaging systems and methods of the present invention. For example, providing for FCC public safety and homeland security bureau requirements for interoperability. Industry-accepted standards are provided, from which any IP packet can pass through an IP-based network wherein all network elements and grid elements associated with the electric power grid are constructed and configured to send, receive, process, and/or communicate any IP packet based on its priority, hierarchy of grid operations and/or functionality, and presentation, transport any IP packet, determine the any IP packet route, and combinations thereof. The IP packets and messages of the present invention do not affect the application from layers 5-7 (session, presentation, application), and the IP-based network is not concerned. When the IP packet is passed to its destination, the software and hardware of the destination grid element is prepared, programmed, and configured to process it automatically and respond, activate, modify, update, and combinations, based upon the IP packet content or payload. The layers that deal with the payload of the function and hierarchy will be interpreted by, acted on, and/or processed by an RTU, coordinator, server destination associated with the grid (by way of example and not limitation, a settlement processor), and/or any Grid Element. While IP packet transport generally is known by prior art, it is not used and applied for the communications described herein. Notably, the IP packet prioritization, security, and/or transport routing, and the transformation of the data within the IP packet is not described or disclosed in the prior art. Significantly, according to the systems and methods of the present invention, the IP packet content or payload, as well as the IP packet itself, is transformed based upon the needs (and hierarchy of needs or factors) of the electric power grid and what the grid element is capable of, i.e., constructed and configured to do for its functionality, participation, and/or performance within the electric power grid and the IP packet-based communication associated with that grid element functionality, participation, and/or performance. In the prior art, the advance meter infrastructure (AMI) function is after-the-fact table data. Changes are required to address problems with integrating demand response, micro grids, and distributed generation, which changes must be dealt with in the higher order layers. By way of example and not limitation, the IP packets used with service oriented architecture (SOA) for the IP-based communications network associated with the electric power grid of the present invention operates to allow the IP packets from the source grid element and/or controlling grid element, to the destination grid element, and/or reverse, based upon the hierarchy that is established or determined by electric power grid needs, which are dynamic. This overcomes a longstanding, unmet need of the grid that is not solved with the prior art.

By way of introduction of and background for packet switching and routing technology, the present invention improves upon existing internet protocol (IP) communications have advanced, and the evolution into IP core and end use telecommunication methods, with a key driver being the evolution of the wireless standards from analog to digital to IP3G and IP 4G, etc. and Wi-Fi variations. Although 802.15.4 Zigbee is not really IP, it is like a proprietary protocol, and is evolving that way because need for encryption, security, and control. Primary use case for these has been metrology collection, but notably the prior art solutions were not built for load or supply management; after the fact, historical view of the data, coupled with statistical analytics is used in the industry to attempt to provide future projections. See "Engineering and Operations in the Bell System, 2d edition, Reorganized and Rewritten, Telecommunications in the Bell System 1982-1983", which is incorporated herein by reference in its entirety, including Table of Contents that teaches analog telephony system was converted from that state into traffic & queuing theory, signaling and switching used to manage the traffic on the network.

The present invention provides communications and signaling systems for transmission reservations, which may eliminate established OATI processes. If transmission is available, the system automatically reserves it (preferably, in advance); every transaction is accounted for; tags verify power flows through transmission metering. This example provides for a transmission reservation packet; similarly a distribution reservation packet is provided for information about the flow of electric power or for the delivery of power from supply grid elements located at any attachment point in the grid.

By contrast, IP routing is different. For example in VOIP, in business or residence, a data pipe is connected to an edge router associated with the business or residence. Behind the edge router IP/IPV4 are private addresses. After edge router, with IPV6 every address is static, or defined. The edge router includes MAC (media access codes), equipment identifiers, etc. for mobile devices, and may include a firewall, which blocks packets from reaching destination or clients (PC, grid element, IP phone, etc.). IP phone may attach to a converter that provides analog voice, converts to IP packet with private address. IP-based communication is asynchronous, follows OSI stack layers 1-3; layer 1 is physical link (cable, modulation, etc.); layer 2 is network layer (Ethernet, or facilitated by cable or wireless); layer 3 is data layer transmission. Edge router is programmed to look for another grid element to communicate with, e.g., like class 5 office for telephony; mid-level router. The edge router will look for defined IP range and if it's not a defined route, then multiple routes, and another mid-level router. Dynamic host control processor (DHCP) monitors the Ethernet packets and waits for a chance to insert a request for access. A packet request for IP address is provided. Telephone number is a subscriber ID. The static IP is similar to phone number for home location databases and visitor location databases. Home location register knows where you are.

Mid-level router are typically owned by same company, but not necessarily. If yes, then within IP stack of ISP, e.g., TWC. ISP boundaries may or may not be defined; typically not as rigidly defined as in power networks or telephone networks. This makes IP networks more secure, and more reliable (e.g., DARPAnet). Mid-level routers go to core routers, typically owned by Tier 1 ISPs. Big IP transmission lines between ISPs are owned by large companies, e.g., UUnet, Sprint, AT&T, etc. ISPs were classed like stack ranges of IP addresses being classed. Then IP addresses could be re-used. And private networks. IP addresses changes (e.g., every 24 h) b/c tables within the routers that keep track of how to route the client device to its destination. The core router could also be Yahoo.com; to resolve to an IP address to deliver or receive content, then must have static IP, or update tables everywhere (routing tables). Power routing also has other rings for routing; smaller rings provide for improved reliability.

Core routers are similar to big transmission in the electric power grid, and are all asynchronous. The key thing is that in the upper layers, the priority information exists (as a presentation layer). There are security needs for priority access in IP networks and for wireless networks. Big fiber rings are provided between core routers, which are all interconnected. The Layers 1-3 define how things are being moved around.

The present invention systems and methods provide for IP packet tracking through at least one coordinator. For example, the energy management system (EMS) tracks for grid reliability, grid stability, energy flows, price, transmission and/or distribution wires status and need, customer need, etc., and combinations thereof. IP packets within the present invention have a priority, priority status, and/or prioritization based upon the grid hierarchy factors, including but not limited to emergency, outage, operating reserves (reliability and grid stability), market, and combinations thereof.

Generally, the grid elements do not change their identification for purposes of grid element function, performance, and/or participation in the grid. But they will have an IP address, selected from IP4 or IP6, or successor standards, wireless or wired, and may be static or dynamic. Grid elements can be moved from a first location to a second or subsequent location (or multiplicity) and when a grid element moves, it will generate an IP packet with the location change information and/or the grid attachment point change information, and transmit the IP packet within the IP network, and the received IP packet at a destination (by way of example and not limitation, a coordinator, a server for grid operations or grid management, and/or a settlement processor) will function to re-register and/or update the grid element registration so that the grid server computer has the accurate location, function, status, ownership, and/or attachment point, of each active grid element. Notably, each grid element has a unique identifier that does not change, e.g., a serial number, token key, etc., and there may be prefixes or suffixes to the unique identifier. This example illustrates a registration IP packet, an update IP packet, and/or a function IP packet.

In another example, a nuclear power station providing power to a resource node or transmission line and has associated with it an address of its IP-based communications that may change, but the unique grid element identifier will not change. Grid elements that distribute or regulate power to power consuming devices are more likely to change, have different functionality, update requirements, etc. than grid elements that provide for macro-generation. But small, mobile grid elements will still have a static grid element identifier (or portion thereof) and their location identifier and L1-3 identifiers will change when they move and may change if they do not move. Mobile grid elements may further include smart meters, mobile storage, electric vehicles, mobile microgeneration sources, etc. Note that there is no SS7 equivalent in a power network. There is telemetry and EMS that are used to stabilize the network for grid stability and reliability, but the transactions to manage the delivery power are done at transmission boundaries; it's manually intensive to move power over the grid. Grid elements do not currently have network intelligence in the prior art. The present invention provides for grid elements intelligence, and network intelligence, with the IP packet-based messaging with grid elements that are prioritized, routed, and have a security that corresponds to the grid element functionality, participation, and/or performance within the electric power grid. There are no routing tables in the power grid network prior art. There are switches at electrical bus level; but no routes that are addressable like communications. Advantageously, the present invention systems and methods provide IP messages having IP packets with prioritized communications to move both information and power, to control, and/or to settle energy and provide market-based financial settlements with IP packets and IP packet-based messaging. This provides new intelligence that gives new visibility with IP packets and their hierarchy along the grid that has alignment with and corresponds with electric power grid functionality, and its hierarchy factors for operations and corresponding communications and controls.

The present invention provides for an IP message that includes an IP packet that includes at least one of the following, and combinations thereof: a content, a priority, a security, and a transport route. Preferably, at least two security levels are provided, including a minimum security (i.e., not open or unsecured), a standard security (that is greater than the minimum security), an increased security with respect to the standard security, a top level security, and combinations thereof. Preferably, at least one transport route is provided for the IP message communication over the network; the at least one transport route including fixed, routable by a coordinator, and dynamic.

Preferably, the priority is selected from a standard time-based and/or function-based priority, a normal priority, an increased priority (with respect to the normal priority), a top level priority (with respect to all priorities), a market-based priority, a static priority, a dynamic or changing priority, and combinations thereof. In one embodiment of the present invention, the system provides at least two levels of priority, wherein at least one level of priority is based upon the dynamic priority of the electric power grid at any given time, which is based upon the needs of the electric power grid, which generally follow the prioritization in the order of grid stability (e.g. outage reporting), grid reliability, market price, general grid communications, etc.; however, the priority may further depend upon governing authority or entity of the grid; the market price or unit being removed from service or transmission line or LMP; the need for auto-dispatch control, load generation, curtailment, etc. where the IP messaging of the present invention provides for automatic and/or intelligent routing responsive to the prioritized needs of the grid, with secure, prioritized communications using a managed network and/or a hybrid managed network. Also, priority inspection of the IP packet is provided by the coordinator; additional inspection by the coordinator may include automatic review of IP packet content, composition, priority, payload, presentation, and combinations thereof. Thus, the IP messaging automatically drives the functionality and/or participation of the grid elements based upon the hierarchy of needs and/or prioritization of the electric power grid. Preferably, the IP message having the IP packet is operable to route itself through a coordinator or directly bypassing if the appliance has many routes from it to other grid elements or subsystems, all on a managed network. In another embodiment of the present invention, an appliance can be retrofitted to existing grid elements to transform them into active intelligent grid elements, which may be included within the housing of the grid element. The intelligent grid elements, devices and/or software operate to transform each of the grid elements into active grid elements.

The present invention provides systems and methods for generating and communicating an IP-based message for an energy management, communications, and/or financial settlements system. Also the present invention provides an IP message including: an internet protocol (IP) packet that is generated automatically by transforming a raw data content into a transformed content corresponding to participation in an electric power grid by at least one grid element. Preferably, the IP packet of the present invention is constructed and configured for transmission over an IP-based network used for energy management and financial settlements communications. Preferably, the IP packet is routable through the network by a coordinator. In one embodiment, the IP packet is automatically generated by the at least one grid element.

In a system for communication of IP-based messages within an electric power grid network according to the present invention, the system includes: at least one grid element having a processor operatively coupled with a memory, and at least one server, each constructed and configured for electrical connection and network-based communication via a network; at least one coordinator constructed and configured for electrical connection and network-based communication via the network; an IP-based message associated with at least one of the grid elements, the IP-based message including an internet protocol (IP) packet that is generated autonomously and/or automatically by transforming a raw data content into a transformed content, wherein the raw data content corresponds to the grid element participation in an electric power grid.

DEP thru IP packet, based upon the dynamic priority of the electric power grid at any given time, based upon the needs of the electric power grid, which generally follow the 1-6 priorities; depends upon governing authority or entity of the grid; outage for grid stability is #1; market price or unit being removed from service or transmission line or LMP; times when a message will dictate and auto-dispatch control, load generation, curtailment, etc. without being told b/c respond to needs of the grid due to intelligent routing, needs of the grid, and using a managed network. Preferably, the packet is operable to route itself through a coordinator or directly bypassing the coordinator if the active grid element and/or intelligent appliance has many routes from its location to other grid elements or subsystems, all on a managed network or hybrid managed network.

A grid element is any functional component within an electric power grid. By way of example and not limitation, at least one of the grid elements is a control device that operates, programs and updates select load consuming device(s) or generating devices associated with the electric power grid (including but not limited to control systems, thermostats, controllers, anything that controls the device, switch gear, large control systems operating from a control center or box with interface to a large control system, such as a distribution automation control system; transformation process includes whatever control systems are attached to the electric devices, their databases, tables, memory, ASICs, firmware, software, operating systems, and combinations thereof and/or other grid elements).

The systems, methods, and the IP-based messages of the present invention are applicable to grid element management, communications associated with grid element participation in an electric power grid for at least one predetermined function and relating to at least one predetermined location (although some grid elements may be mobile, while others are static and have a fixed geodetic location), and/or financial settlements for grid element participation in an electric power grid. Messages associated with financial settlements for grid element participation in the electric power grid for energy consumption, load curtailment, and/or supply of electric power are particularly important inasmuch as the present invention provides for transformed data associated with each of the grid elements, which may further include settlement grade data.

The following co-pending patent applications by the inventor are incorporated herein by reference in their entirety: application Ser. No. 13/463,761 filed May 3, 2012 (Pub. No. 2012/0221162); application Ser. No. 13/463,781 filed May 3, 2012 (Pub. No. 2012/0239218); application Ser. No. 13/464,665 filed May 4, 2012 (Pub. No. 2012/0221163); application Ser. No. 13/466,725 filed May 8, 2012 (Pub. No. 2012/0239219); application Ser. No. 13/471,589 filed May 15, 2012 (Pub. No. 2012/0226384); application Ser. No. 13/471,575 filed May 15, 2012 (Pub No. 2012/0245753); application Ser. No. 13/528,596 filed Jun. 20, 2012 (Pub. No. 2013/0345888); application Ser. No. 13/549,429 filed Jul. 14, 2012 (Pub. No. 2014/0018969); application Ser. No. 13/563,535 filed Jul. 31, 2012 (Pub. No. 2014/0039699); and application Ser. No. 13/659,564 filed Oct. 24, 2012 (Pub. No. 2014/0114844).

In one embodiment of the present invention, a multiplicity of servers and corresponding databases that are constructed and configured in network-based communication for receiving transformed data within IP packets from a multiplicity of grid elements is provided, wherein the databases may be cross-linked or associated in network communication, and may further include internal tables with rows, columns, and values; the server may extract, transform, and replicate data across the databases. As will be appreciated to one of ordinary skill in the art, the databases include at least one production database, and connection layers in at least two parts, further including middleware that connects multiple applications to databases (APIs that are SOA-based), and that allow native applications to send info in SIMM format to allow connection to databases, messaging engine(s) that may interact with a cache or persistence layer, and applications that sit on top of it, as well as firewalls and other physical security, encryption layers, and combinations. Encryption may be direct networked, cloud-based, IP-based or Ethernet-based network encryption.

The at least one coordinator provides for routing messages from the multiplicity of grid elements through the network connecting the databases associated with corresponding servers, and wherein servers operating the databases exchange information associated with the grid elements for affecting grid stabilization.

Each grid element is registered with the system and wherein the registration of grid elements is stored in the databases for predetermined periods of time for use with a financial settlement associated with the grid elements, and the information relating to financial settlement of the participation of the at least one grid element is stored in a database, and any raw measurement data is transformed into settled measurements for storage in a database. Furthermore, the information relating to grid elements participation is transformed from raw data into settlement data, and wherein the settlement data is stored in a database. Preferably, a web-based graphic user interface (GUI) display operates to communicate information to the grid operator(s) via encrypted IP-based communication. Raw data are not required to be retained in the database(s); however, transformed data and transformation methods are retained, and transformed settled data are retained in the case of financial and/or settlement data from the grid elements. This is important so that if market rules change, then the system and methods of the present invention provide for optimized settlement based upon updating the settled data to reflect latest rules. Thus the analytics engine(s) provides for reversible, updatable data from raw to settled, and then updated settled, to improve the settlement financial amount to compensate the participation of the grid element(s) within the electric power grid at the optimal rates for that period of time for the participation. Overall, the present invention provides for better, more accurate messages and transformed data, in particular for settlements data, including settlements in any format, including traditional currency or commodity trading or valuation, bartering KWP in PTB unit(s) in exchange for non-currency remuneration, credits, and combinations thereof.

The registration information associated with grid elements is used to determine attachment points to the electric power grid for distribution and transmission of power, and wherein the attachment point information associated with the grid elements is communicated to the settlement processor.

The settlement information associated with grid elements is preferably further communicated to or accessible by the market participant, utility, grid operator, etc., wherein a settlement is made for each grid element, and the settlement complies with regulations and/or standards established by FERC, NERC, and/or a governing authority for the electric power grid.

The server communicates a settlement message with each of the at least one grid elements via the network, wherein the settlement message is preferably an IP-based message. The grid element participation in the grid is provided for use by market participants via a display through a web-services enabled GUI. It may be accessible to and/or communicated via the network to payer and payee, trader, consumer, resource provider, TDSP, and/or market participant or entity who would benefit from having the capacity to monitor settlements including but not limited to ISO, RTO, etc., which need visibility to clearing price, and to financial settlements for grid element participation. Empirical data of the present invention associated with each grid element, because of its actual data collection over less than 15 minute intervals, has more granularity than modeling used in the prior art, so that the present invention systems and methods provide higher accuracy information that is relevant to making market-timing decisions and actions relating to participation by grid elements and owners thereof. For example and by way of comparison, this is not unlike futures trading in the markets, which requires visibility into clearing price. The exchange of information and its display and representation of data for advanced and automated settlements is preferably associated with kilowatt packets, PSVs, and PTBs. Real-time access for trading and for participation in the grid by grid elements is improved. Speed and security of data, in addition to increased accuracy and increased timeliness of data provided and communicated within the systems and methods of the present invention provide for improved financial settlements for participants. Empirical data has more granularity than modeling used in the prior art, the present invention provides higher accuracy information that is relevant to making market-timing decisions and actions relating to participation by grid elements and owners thereof, for example and by way of comparison like futures trading in the markets, which requires visibility into clearing price.

This IP-based message and IP packet having content elements (including, preferably, transformed data content) associated with the grid element participation is transmitted either wired or wirelessly by grid elements, and includes an interface that facilitates communication of the message with the grid elements, such as an interface that includes an IP-based interface. An IP-based interface is preferably selected from the group consisting essentially of WiMAX, High Speed Packet Access (HSPA), Evolution for Data Only (EVDO), Long Term Evolution (LTE), any first or second generation wireless transport method such as EDGE, or Code Division Multiple Access, Ethernet, any proprietary Layer 1-4 protocol that contains or is capable of transporting an Internet Protocol message, and combinations thereof. Preferably, the settlement message includes a derived Power Supply Value that meets the minimum requirements for measurement, verification and reporting accuracy as determined by the Governing Entity that regulates the operation of the electric power grid that includes utilities, market participants and/or grid operators.

Also, the systems and methods of the present invention include a security interface associated with each of the grid elements operable to receive security system messages from at least one remotely-located security system, wherein the security interface is standards-based or determined by the governing entity that regulates grid operations for utilities, market participants or grid operators.

The IP-based message of the present invention and its IP packet may further include a delivery priority including at least one of a plurality of methods to include priority access flags, virtual private networks, independent identifying addresses (MAC, IP, Electronic Serial Numbers), manufacturers specific identifying codes, or combinations thereof, wherein the methods comply with standards as determined by the governing entity that regulates grid operations for utilities, market participants or grid operators. There may be dedicated routes for the IP-based message and its IP packet, the routes over private networks that are Ethernet or proprietary, or other prioritized packet or encryption formats that have been created or approved for settlements by the governing body and/or standards bodies.

The grid element(s) further include at least one mobile device having at least one access point name (APN) for providing a priority of delivery for the message, wherein the at least one grid element transmits a signal or communicates a message to the server at the point of initial connection with the server via the network. Thus, the system may initiate a settlement request based upon disconnection, etc., or a customer or owner of any grid element (user) may initiate the settlement based upon user-inputs (from a mobile device, a computer, etc.) or by any profile change for any grid element.

The grid elements communicate a signal or a settlement message to initiate a financial settlement corresponding to participation in the electric power grid, and the signal or the settlement message is routed through a coordinator, which routes the settlement message to the settlement processor.

The IP-based message further includes at least one of: a geodetic reference, a element identifier, a grid element type, a grid element function, a grid element capacity, a grid element profile, a grid element attachment point reference, a kilowatt packet (KWP) value, a grid element power supply value (PSV), a grid element power trade block (PTB) value, a grid element balancing authority association, a grid element owner identifier, a grid element compatibility identifier, and combinations thereof.

The IP-based message (and/or its IP packet and/or its content) of the present invention may include factors for grid stability-based pricing, operating reserves-based pricing, factors considering peak and off-peak timing, and combinations thereof, and further include measured data that provides higher rate for settlement compared with projected, estimated, or VEE rate, and includes variable, higher, and more accurate rate for settlement, compared with projected or VEE. Thus the coordinator and/or server with information from the coordinator transforms the raw data from grid element participation in the grid into more accurate settlement data, which is then compensated at the optimal rate for that participation for that given time period. Preferably, the financial settlement is managed by a clearinghouse between market participants and utilities, and may further include individual cooperatives, groups (non-traditional), and non-boundary constrained groups, cooperatives that function to aggregate groups, etc.

Preferably, upon registration with the grid, each of the grid elements has a home location identifier and a non-home location identifier, and wherein the financial settlement includes factors and attributes for grid element participation associated with the home location identifier and with the non-home location identifier, which may further include factors associated with boundaries, regulations associated with each of the boundaries including factors affecting settlement across boundaries, within boundaries, etc., and considers the participation of the grid elements based upon location, and rules governing their Market participation.

The present invention provides a system for electric power grid element and network management including: at least one grid element constructed and configured for electrical connection and IP network-based communication with a server and/or a processor operatively coupled with a memory; wherein the grid element is transformed into at least one active grid element after initial connection with the server and/or the processor operatively coupled with the memory via a network. Preferably, the transformation for grid elements is automatic and/or autonomous. In one embodiment of the present invention, the server and/or processor coupled with memory initiates the transformation of the at least one grid element into the active grid element. In another case, the at least one grid element transmits a signal or communicates an IP-based message including an IP packet to the server at the point of initial connection with the server via the network, and/or the at least one grid element communicates a signal or a message to initiate its transformation via registration with the electric power grid; preferably, the signal or the message is routed through a Coordinator, which routes the message to a grid operator's appropriate subsystem depending on the function of the grid element. For grid stability, supply, and curtailment technologies functioning as supply as contemplated by FERC Order 745 the message must be routed to an EMS. Also, preferably, the message further includes at least one of: a geodetic reference, a grid element identifier, a grid element type, a grid element function, a grid element capacity and or energy capability, a grid element profile, a grid element attachment point reference, grid element telemetry capabilities and requirements based upon its function, a grid element power supply value (PSV), a grid element power trade block (PTB) value, a grid element balancing authority association, a grid element owner identifier, a grid element compatibility identifier, and combinations thereof.

Also preferably, the network-based communication is a standards-based communication or a proprietary communications protocol, and the communication is routable through a router and/or through a Coordinator, wherein the Coordinator receives and sends messages through a communications router. A translator is preferably further associated with the settlement processor and/or coordinator(s), for example, but not limited to the illustration of FIG. 31. The message includes a derived Power Supply Value that meets the minimum requirements for measurement, verification and reporting accuracy as determined by the Governing Entity that regulates the operation of the electric power grid that includes utilities, market participants and/or grid operators such that the derived PSV may be settled in the appropriate power market by a settlement manager or appropriate market participant or entity determining economic benefits associated with the provision of supply and/or curtailment by the active grid elements registered and functional within the electric power grid and responsive to the needs and requirements of the grid. Also, the message has a deliver priority including at least one of a plurality of methods to include priority access flags, virtual private networks, independent identifying addresses (MAC, IP, Electronic Serial Numbers), manufacturers specific identifying codes, or combinations thereof, wherein the methods comply with standards as determined by the governing entity that regulates grid operations for utilities, market participants or grid operators. Also, the active grid element(s) may further include at least one mobile or network device having at least one access point name (APN) for providing a priority of delivery for the message.

Figure 31:
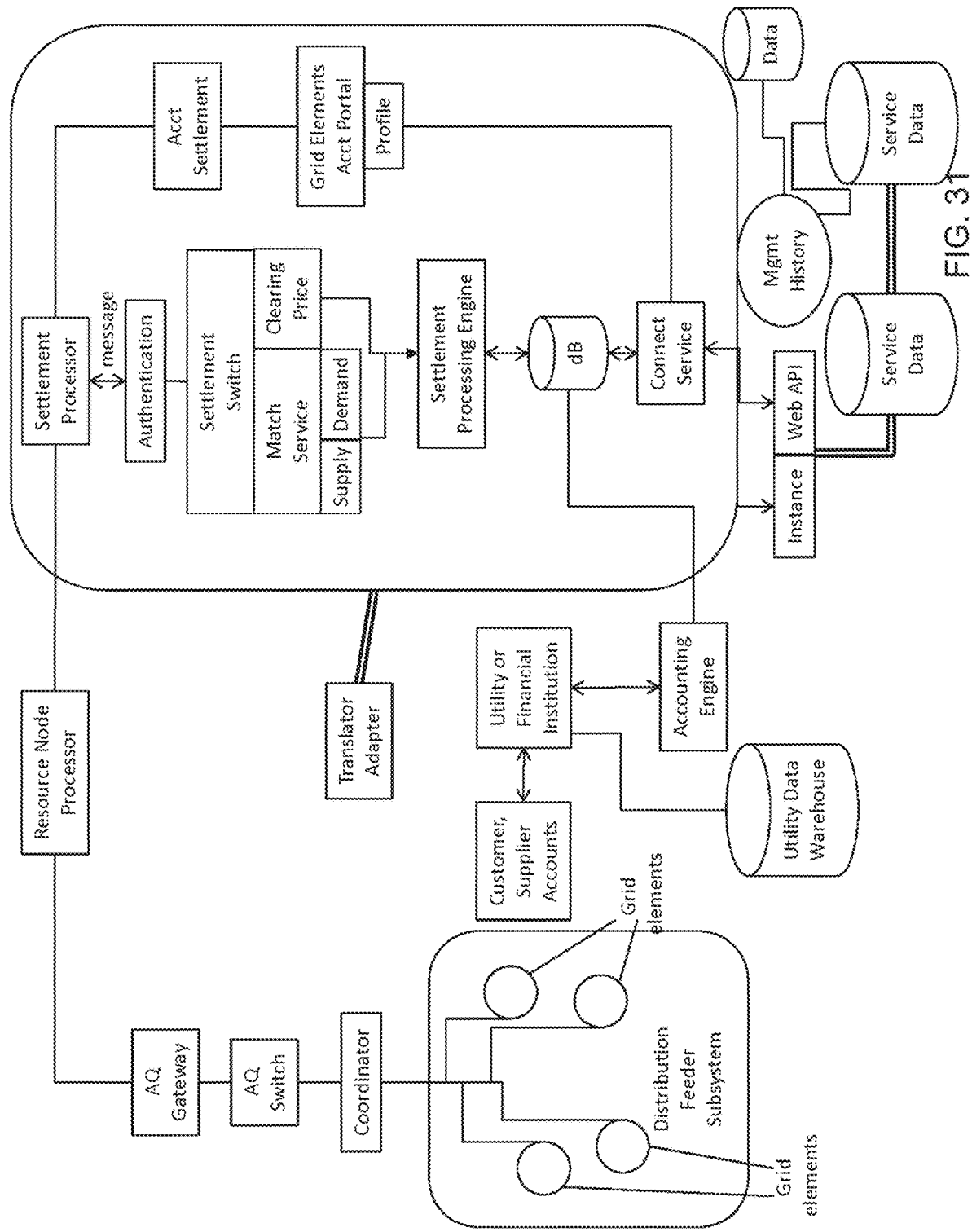
FIG. 31 is a schematic diagram illustrating settlement processor systems and methods of the present invention including grid elements, coordinator, translator, and settlement processor components.

The present invention provides for a plurality of grid elements that transform into a corresponding plurality of active grid elements after initial connection with the server via the network, and the at least one grid element includes at least one electrical device, a device that consumes electric power from an electric power grid, and/or a device that provides power to an electric power grid, a control device, that operates, programs, and/or updates other active grid elements. Active grid elements are eligible to participate in settlement-related activities, as illustrated in FIG. 31, and described hereinabove. Thus, grid elements are also selected from the group consisting of: a sensor, a transmission reporting or control device, a distribution system reporting or control device, a power-consuming device, an appliance, any inductive device that consumes power, any resistive device that consumes power, a meter (revenue grade or non-revenue grade), a switch, a controller, a control device, a thermostat, a building control system, a security device, any other distribution automation and elements that are part of distribution system such as transformers, traditional and solid state bi-directional, capacitor banks, reclosers, and combinations thereof. Also, at least one of the grid elements is under the control of an energy management system (EMS) associated with the electric power grid. Preferably, systems and methods of the present invention provide for microeconomic dispatch capabilities, including sub-micro-economic dispatch, and settlement therefor, which provide for security of grid operations and corresponding settlement for grid element participation in response to information provided by ISOs relating to outage, pricing, transmission congestion, and combinations thereof. The systems and methods of the present invention provide micro-level responsiveness since each grid element's participation includes forecasting modeling associated with "asset" availability at the macro level, as well as sub-EMS level market economic modeling at the resource node at the micro level, with all communications relating to the micro-level being communicated through the coordinator to allow KWP, PSV, and aggregation to form at least one PTB for grid element participation and corresponding financial settlement for that participation.

Following the registration through the Coordinator, the transformation relating to the active grid element enables the active grid element to provide status and function for providing normal and emergency grid operation, energy flows, transmission losses, reactive power, operating reserves and/or grid stabilization for the electric power grid, and the transformation is registered in a database, and the database is registered with an ISO, BA, Market Participant, NERC, utility service area, and/or FERC. For security and management by the Coordinator, preferably each of the at least one grid elements has a unique grid element identifier associated with it. Where the Coordinator interacts with or interfaces with legacy systems, in particular relating to settlement, as illustrated in FIG. 31, the Coordinator preferably updates the legacy systems associated with the grid and relevant to the grid element(s) through the translator or other dedicated software interface with the legacy systems.

The present invention also provides a multiplicity of databases constructed and configured in network-based communication for receiving registration data from a multiplicity of active grid elements, wherein at least one Coordinator for routing messages from the multiplicity of active grid elements through the network connecting the databases, and wherein servers operating the databases exchange information associated with the active grid elements for affecting electric grid operations, reporting, and/or stabilization, including service oriented architecture (SOA), Web Services (Web Services Description Language "WSDL"), published APIs, private APIs, and combinations thereof. Also, registration of grid elements and information or data relating to their transformation into active grid elements, including the attributes of the active grid elements, are stored in the databases for predetermined periods of time for use with economic and energy accounting settlement associated with the active grid elements, and the registration information associated with active grid elements is used to determine attachment points to the electric power grid for distribution and transmission of power, and may be further combined with information about the generation, transmission, and distribution system of the electric power grid, stored in the database, and processed with analytics to simulate modeling for attachment of active grid elements to the electric power grid. Furthermore, the registration information associated with active grid elements is used for communication with an EMS or other grid subsystems necessary for normal or emergency grid operations. Additionally, a registration is made for each active grid element, and the registration complies with regulations and/or standards established by Federal Energy Regulatory Commission (FERC) North American Electric Reliability Commission (NERC), Independent System Operator (ISO), Regional Transmission Organization (RTO), and/or a governing authority for the electric power grid. In any case, the server communicates a message to each of the at least one active grid elements after the initial connection and registration through the coordinator via the network, wherein the message is an IP-based message, which is preferably transmitted over a plurality of Ethernet capable communications networks, wired or wirelessly transmitted over a communications network.

In preferred embodiments of the present invention, the system further includes an interface that facilitates communication of the message with the grid elements, the interface including an IP-based interface, which is selected from the group consisting of WiMAX, High Speed Packet Access (HSPA), Evolution for Data Only (EVDO), Long Term Evolution (LTE), any first or second generation wireless transport method such as EDGE, or Code Division Multiple Access, Ethernet, any proprietary Layer 1-4 protocol that contains or is capable of transporting an Internet Protocol message, and combinations thereof. The present invention may further include a security interface associated with each of the grid elements operable to receive security system messages from at least one remotely-located security system, wherein the security interface is standards-based or determined by the governing entity that regulates grid operations for utilities, market participants or grid operators.

In another embodiment of the present invention, an apparatus for smart electric power grid communication is provided, including: a grid element constructed and configured for electrical connection and network-based communication with a server associated with an electric power grid; wherein the grid element is transformed into an active grid element after initial connection with the electric power grid, and wherein the grid element includes a unique identifier. Preferably, the transformation is automatic and/or autonomous, following initial activation of the grid element, and then the grid element is authenticated, registered, and then performs the function intended to do within the grid. So then as grid elements are transformed to active grid elements for participation in the electric power grid, in particular for those having a function intended as providing supply, including providing the TDSP with a network simulation model, as part of the registration process, the grid element has either loaded in its processor and memory or is capable of downloading grid information that allows for the grid to "self-model" the impact of the attachment of that element to the grid.

Preferably, the grid element transmits a signal or a message to the server, more preferably through a Coordinator, for registering with the electric power grid, and communicates wirelessly with the server, preferably via IP messaging with the server after attachment to the electric power grid.

Such apparatus embodiments for active grid elements include or are selected from the group consisting of: a sensor, a power-consuming device, an appliance, a meter, distribution and/or transmission elements, telemetry elements, power supplying device, storage device, controller, and combinations thereof.

In methods for electric power grid network management, the invention includes the steps of: providing at least one grid element constructed and configured for electrical connection and network-based communication with a server, energizing the at least one grid element and/or connecting the at least one grid element to an electric power grid; the at least one grid element making an initial connection with the server via a network and communicating a message to the server; and the at least one grid element automatically transforming into at least one active grid element for functioning actively within the electric power grid. Preferably, the method further includes the step of: the at least one grid element sending and/or receiving a message via communication with the server via the network, wherein the message is routed by a coordinator to the server. Also preferably, the communication is wireless transmission, and includes wireless IP-based messaging.

In operation of the system and methods of the invention, the communication further includes power event messages that further include at least one of: status of device(s), supply source(s), and/or demand; location of attachment; line losses; distribution and transmission capacity information; and combinations thereof, and the power event messages are based upon inputs initiated from a market participant, a utility, or an electric grid operator. Also, the power event messages include information about PSV or PTB associated with the at least one grid element.

While present invention relates generally to the field of electrical power control systems and more particularly to systems, methods, and apparatus embodiments for transforming grid elements into active grid elements following an initial registration with the electric power grid through a coordinator, following transformation of the grid elements to active grid elements, the electric power grid is functional for active management of power supply from any electric power generation source or storage device for introduction to an electric power grid, and/or load curtailment for consideration as supply. Preferably, these systems and methods and any apparatus embodiments of the present invention are in compliance with standards that are currently contemplated and are changing in response to the recognized need in the United States and other countries where the electric utility grid is not fully developed, but the demand for energy is expected to grow substantially over the life of the invention (e.g., NERC, FERC orders 745, 750, 755, etc.). Once transformed into active grid elements, the present invention systems, methods, and apparatus embodiments are operable to further provide for actively managing power supply from any generation source supply or storage and/or power supply from curtailment events applied to load consuming devices, thereby creating operating reserves for utilities and market participants, while optionally tracking power savings for both the individual customer, broadly defined as any consumer of electrical power whether this is an individual residential consumer, a large commercial/industrial customer or any combination thereof inclusive of retail electric providers and market participants, as well as the electric utility or electric power generation source supply (GSS), whether generating or distributing power for the electric power grid. Therefore, active grid elements include functionality for power generation supply, power storage supply, and/or load curtailment as supply, as well as load-consuming elements, telemetry elements, sensors, meters, controls, and combinations thereof. Where active grid elements change location or attachment to the electric power grid, then their active grid element attributes change accordingly to indicate the new, updated location and/or attachment point information or data. Where a portion of the electric power grid changes due to normal operation, or due to any element being out of service for any reason, including dysfunction of distribution and/or transmission of electric power along the lines to active grid elements and/or the communications network changes or has dysfunction, then preferably, the active grid elements are acknowledged by the system through the coordinator upon their reconnection with the grid and/or communications network. Furthermore, any active grid element is replaced with a new or substitute grid element, or taken out of service for more than a predetermined period of time, then the replacement or substitute grid element must be registered to be transformed into an active grid element as with any new grid element being introduced into service at any location or attachment point associated with the electric power grid. Where reconfiguration, repair, or other updating occurs, corresponding information related to the reconfiguration, repair, or other updating associated with each active grid element is communicated through the coordinator and updated in the database.

Grid Functionality

The following descriptions and definitions are included herein for the purpose of clarifying terms used in the claims and specification of the present invention, in addition to explanation of the relevant prior art, including the prior art figures and the figures illustrating the present invention.

Power Distribution Engineering: Fundamentals and Applications, James J. Burke, Marcel Dekker, Inc., NY (1994), describes basic power electric power systems, including distribution and transmission throughout an electric power grid, and grid elements and basic functionality of grid elements, is incorporated herein by reference in its entirety. Also, acronyms and abbreviations and definitions for terms related to electric power grids and systems and grid elements associated therewith, and regulations and authorities related thereto, are known in the art, and are also defined in the book Creating Competitive Power Markets: the PJM Model, Jeremiah D. Lambert, Pennwell (2001), and are incorporated herein by reference.

When curtailment or supply is provided in a distributed manner from a plurality of sources through some of the grid elements of the present invention, capacity is also created on the transmission and distribution system that is used to carry the physical energy to the load consuming devices, and/or the attachment point of the supply devices, and those consumers at their attachment point to the grid. This is sometimes referred to in both the industry and the description of the present invention as a "service point" and can represent any attachment point along an electric grid whereby the physical layer of wires meets the physical attachment of either load or supply that is used in accordance with the present invention. The creation of capacity for these "wired" networks is in itself new to the art, and is tracked with the other messaging described in the present invention via the Coordinator and with specific messaging that is used and identified for the purpose of transmission and distribution capacity created along every grid element that is used to distribute electric power in the electric power grid. These created capacities are preferably aggregated by service point, by attachment wires, by transformer, by feeder wire, by substation/electrical bus, by transmission line(s), by grid area, by geodetic points, by utility or MP service area, by LMP, by balancing authority, by state, by interconnect, by ISO, and combinations thereof. Thus, created capacity by active grid elements according to the present invention, includes both the actual capacity due to supply introduction or load curtailment, and/or the location of the capacity created, which is a function of the attachment point and with respect to the electrical bus (substation) and/or transmission feeder that is supplying it. This capacity is reported to the financial settlement system through the Coordinator and/or translator; in the case of translator communication, a translator interface is provided with the legacy elements, e.g., OASIS; alternatively, the Coordinator and/or translator tracks the capacity and has a market price input for transmission costs for the purposes of providing a settlement for the created capacity.

The present invention provides systems, apparatus, and methods for communicating IP-based messages associated with a multiplicity of grid elements that function within an electric power grid, and for communicating messages associated with the settlement associated with their active participation in the grid.

Following registration and transformation into active grid elements, the system provides for transmission and distribution of electric power supplied by an electric utility and/or other market participants to a multiplicity of the active grid elements (including but not limited to devices and nodes), some of which consume power, some supply power, some store power, and combinations. Active grid elements may function within the grid to provide for supply and/or load curtailment as supply. Each of the active grid elements have a Power Supply Value (PSV) associated with its energy consumption and/or reduction in consumption and/or supply (through generation and/or storage). And each grid element further operates to communicate (send and/or receive) messaging that is preferably managed through a network by a Coordinator using IP-based messaging for communication with the active grid elements, with the energy management system (EMS), and with the utilities, market participants, and/or grid operators. However, in some cases, messaging is provided between grid elements without passing through a Coordinator.

Any exemplary embodiments that are in accordance with the present invention described herein provide embodiments reside primarily in combinations of system and apparatus components, and processing steps, communications, protocols, messaging and transport all related to actively managing power load or supply on an individual subscriber basis and optionally tracking power savings incurred by both individual subscribers and an electric utility or other market participant, all of which directly involve active grid elements of the present invention. Accordingly, the systems, apparatus, and method steps components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The aggregation of the longstanding, unmet needs in the relevant art is the basis for new innovation, including solutions offered by the present invention, having systems and apparatus components that include the following attributes:

a. The system, apparatus, methods and devices utilize standards-based Open Systems Interconnect (OSI) Layer 1-4 communications protocols with a plurality of security encryption methods.
b. The communication layer is Internet Protocol (V4 or V6 or its derivatives thereof) based such that the messages, instructions, commands, measurements and telemetry is transmitted via physical layer delivered Ethernet, first generation wireless communications methods (analog or digital), second generation communications methods such as Code Division Multiple Access (1×RTT), Enhanced Data Rates for GSM Evolution (EDGE), third generation protocols such as Evolution for Data Only (EVDO), High Speed Packet Access (HSPA), Fourth Generation protocols Long Term Evolution (LTE), IEEE 802.11 (X) "Wi-Fi", or any derivative standard approved by the IEEE, International Telecommunications Union or any domestic or international standards body or any proprietary protocols that can operate in near real time and contain an Internet Protocol packet for the transmittal of their command, control, telemetry, measurement, verification, and/or settlement information, whether wired or wireless.
c. The command and control for the purpose of (b) can be created and controlled from a centralized processor, a distributed processing apparatus, or at the device level.
d. The aggregation of these methods result in the creation of real-time load curtailment that may be classified broadly as "Demand Response", macro or distributed generation and can be native load (i.e., real-time supply) as required by the electric power grid where the invention is utilized, and also be utilized to create Operating Reserves as defined by NERC, FERC, and/or any other governing body that regulates the operation of an electric power grid and/or utilities or other market participant providing power to an electric power grid.

FIG. 1 is a schematic diagram illustrating at least one coordinator and a multiplicity of grid elements within a system and methods of the present invention. Grid elements illustrated for example, and not limitation of the present invention, include smart appliances, smart meters, building control systems, sensors, storage devices, power generators (including alternative energy sources like wind, solar, water, etc.), active load clients (ALCs), active load directors (ALDs), active supply clients (ASCs), active supply directors (ASDs), controllers, coordinators, distribution elements, transmission elements necessary for grid operations and stability, and combinations thereof. Following registration with the system, and transformation to active grid elements for managed participation within the electrical power grid and corresponding systems and methods of the present invention, the active grid elements communicate with and through at least one coordinator and to the energy management system (EMS) or other grid operations subsystems, such as RTO/ISO operations systems, transmission operation systems, distribution operation systems, and function according to their intended purpose. By way of example and not limitation, a smart meter provides meter functions to track and communicate load consumed by one or more active grid elements and/or devices; a thermostat or building control system provides for HVAC and/or environmental conditions indication and control, including temperature management, humidity, lighting, security, etc.

Figure 2:
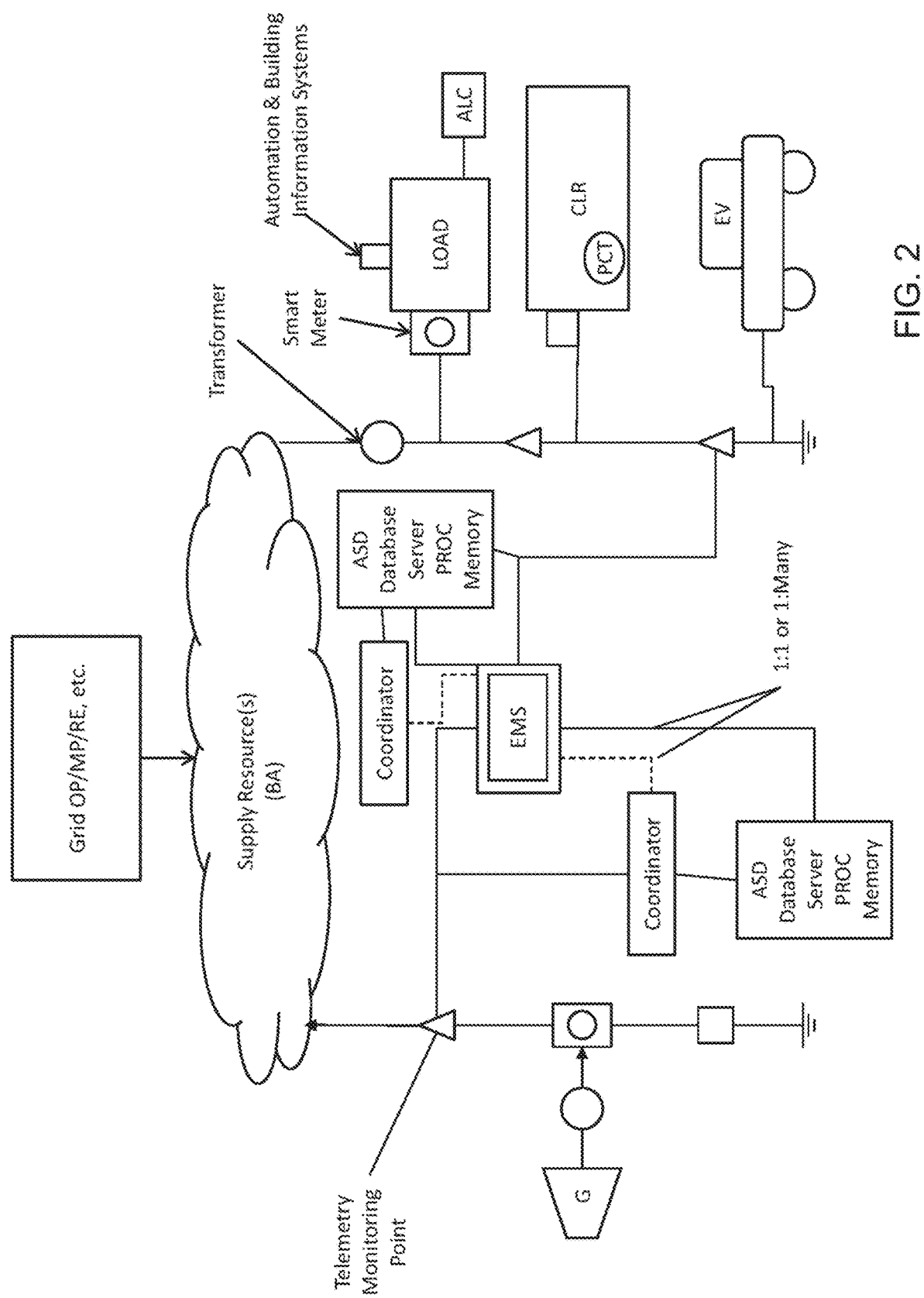
FIG. 2 is a schematic diagram illustrating grid elements, attachment points, and telemetry through a network associated with the systems of the present invention.

FIG. 2 is a schematic diagram illustrating grid elements, attachment points, and telemetry through a network associated with the systems of the present invention. FIG. 2 illustrates at least one controlling or participating entity, selected from the group consisting of a grid operator, utility, market participant, retail electric provider and/or distributor, and combinations thereof, an EMS, in electrical power connection and communication with a multiplicity of active grid elements, all within at least one balancing authority (BA), and all connected through an electrical power grid and communications network(s). The active grid elements provide telemetry and messaging relating to a multiplicity of grid element attributes and/or grid element factors, including but not limited to attachment point information, geodetic information, status, capacity, grid element identifier(s), grid element profile(s), power consumption and flows (instantaneous and historical), and combinations thereof. Preferably communication among active grid elements and the controlling or participating authority is provided over a network and routed through at least one coordinator via Ethernet and/or IP connectivity. A counter may also be included for tracking packets, and packet switching and routing is provided within the systems and methods of the present invention, wherein network communication for energy routing and energy information routing is provided with a messaging structure having layering, similar to an Open Systems Interconnection (OSI) model including layers for application, presentation, session, transport, network, data link, and physical communication functions, which defines the communications tasks of the system, and which provides a vertical set of layers forming a communication infrastructure for interconnection over public and private networks. Information describing general OSI model communication structures and functionality is known to one of ordinary skill in the art and described in Data and Computer Communications by William Stallings, MacMillan N.Y. (1985), which is incorporated herein by reference in its entirety.

The structure of OSI modeling for the systems and methods of the present invention are considered to provide communications networks for use in coordination with the physical structure and network of the electric power grid and the active grid elements registered therewith, and may further include TCP/IP. Ideally, the OSI model for communication network would be integrated with the physical network for electric power distribution and transmission, including active grid elements and controls, database, server, coordination with supply and load, etc. The present invention provides for the application of an energy network (i.e., the electric power grid) and a communications network, including the OSI-based model, and coordination to integrate the messaging with the power movement through the system.

Figure 3:
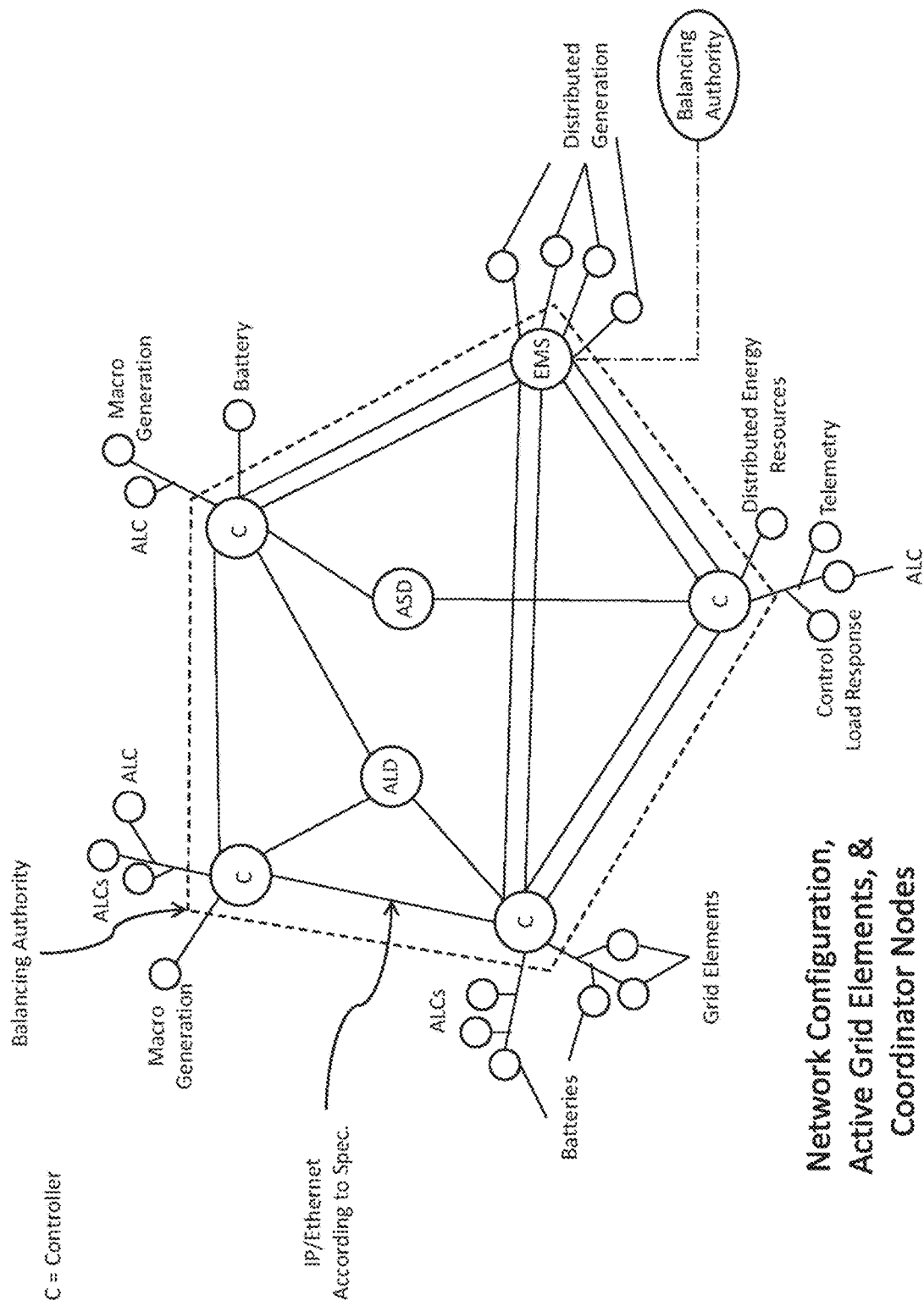
FIG. 3 is a schematic diagram illustrating an exemplary network node configuration for grid elements registration and communication.

FIG. 3 is a schematic diagram illustrating an exemplary network node configuration for grid elements registration and communication. In one embodiment of the present invention, the network for communication involving active grid elements and the coordinator and/or other grid elements includes a packet-switched network that is used to accept packets from a source node and deliver them to a destination node, such as in the case wherein a grid element makes initial registration with the system by sending an initial communication to a coordinator, and the coordinator responds and the systems and methods of the present invention then provide for automatic and/or autonomous transformation into active grid elements, wherein at the moment of registration the active grid elements are functional within the electric power grid to perform their designated or predetermined operations and roles or functions. FIG. 3 illustrates an example network configuration illustrating a multiplicity of paths or routes through a network for communication and energy routing within the electric power grid. The connections between active grid elements and coordinator(s) and other active grid elements are illustrated. In preferred embodiments of the present invention, at least one balancing authority (BA) includes at least one coordinator in network-based communication with a multiplicity of active grid elements, and further connected in electrical and data communication connections with at least one source of power and at least one EMS. By way of example, a new grid element prior to registration with the system of the present invention initiates a signal or message via the network following its initial energizing with power from any source (battery or externally-supplied power), wherein initial message includes at least one of the following: unique grid element identifier, equipment identifier, class of service information, capability, capacity, function information, geodetic information (GPS, physical address, etc.), attachment point, IP address information, communication format and content information, security, authentication information, and combinations thereof. Thus, after initial energizing of the at least one grid element, the grid element searches for at least one network available for communication with the electric power grid, preferably with the coordinator, and determines how to engage with the coordinator or at least to establish initial network communication with the coordinator, identification of network protocol, etc. A network identifier is included in the transformation and network interface for each of the at least one grid elements. Preferably, messaging between the at least one grid element and the at least one coordinator is provided by IP-based messaging over the network. Following the initial response and registration of the at least one grid element, there is a transformation into at least one active grid element, which provides that each of the at least one active grid elements is operable to function automatically and/or autonomously for its predetermined function within the electric power grid, including telemetry at predetermined intervals, continuously, or when change in state occurs for each of the at least one active grid elements.

In preferred embodiments of the present invention, the registration of grid elements may be provided using one or more of the following for providing unique identification for each grid element: messaging and/or signaling between active, inactive, IP address, V4, V6, proprietary, mesh or direct, TDM or pots, analog or digital telemetry, RFIDs, and combinations thereof. A registration for grid elements may further include registration into a home network or a visitor network, and/or movement of any of the active grid elements (following transformation after initial registration) to different locations or geographies and/or to different or new attachment points provides for at least one update of status for the movement or change for that active grid element. Attachment points are preferably provided in a location register that is defined by proximity to an electric bus or substation within the electric power grid, or any other predetermined geodetic location within the physical structure of the electric power grid.

Figure 4:
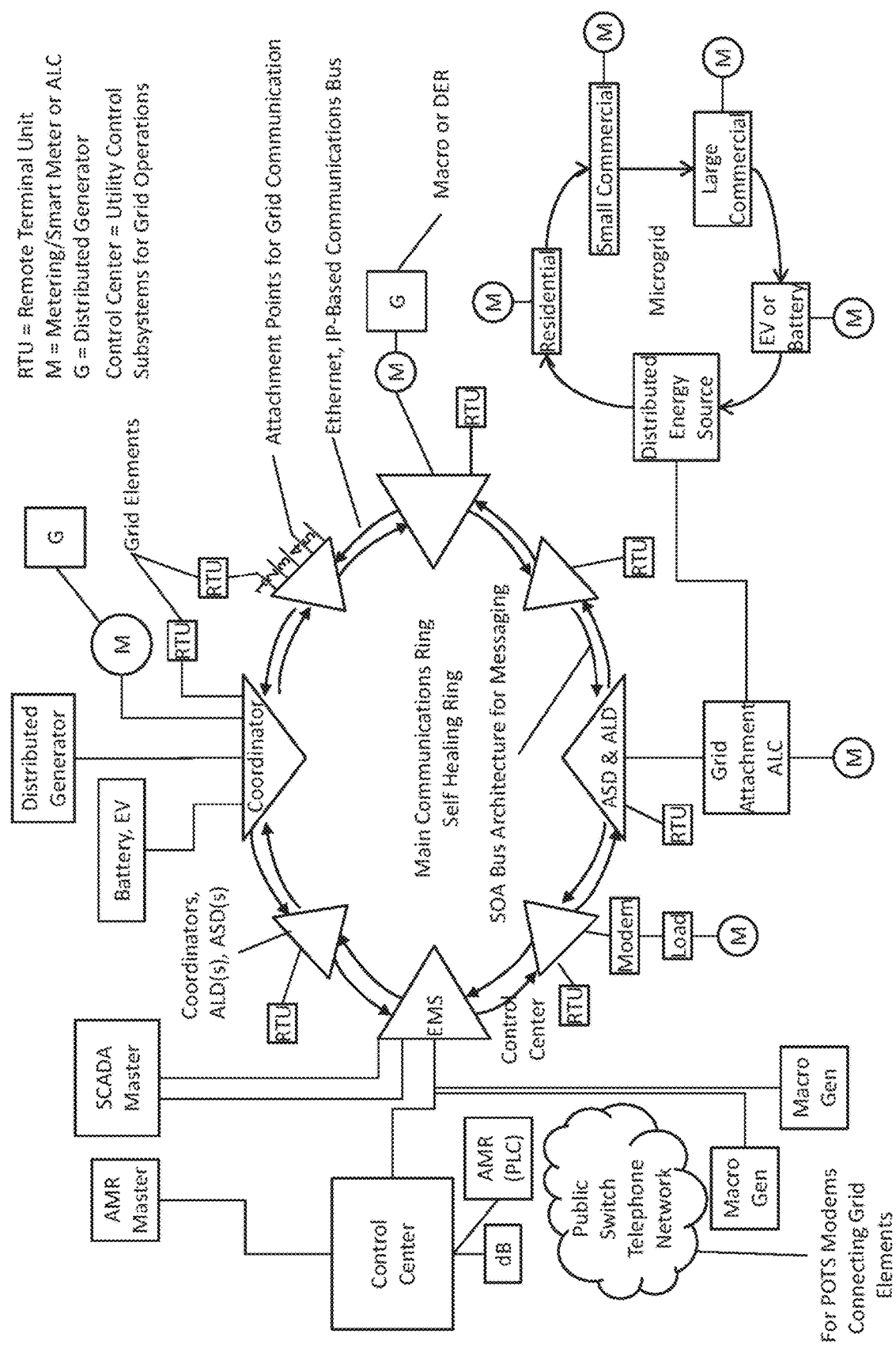
FIG. 4 is a schematic diagram illustrating a distribution automation communications network.

FIG. 4 is a schematic diagram illustrating a distribution automation communications network as part of systems and methods of the present invention, including a main communications ring having a multiplicity of active grid elements associated therewith, and further including at least one master control center and corresponding database, SCADA master, AMR master, switches and electrical network lines and connections (copper wire) and communications network lines and connections (fiber) and at least one distributed ring having a multiplicity of active grid elements associated therewith. In this exemplary network sector, the active grid elements and electrical power network and communications network are included within one balancing authority (BA). Several active grid elements function as meters and/or smart meters and provide for automated meter telemetry through the network from the grid elements to at least one coordinator. In a typical network architecture, at least one core network for a balancing authority is provided, and wherein a multiplicity of grid elements are constructed and configured in electric power transmission and/or distribution connection and network-based communication connection for sending and receiving messages between each of the grid elements and at least one Coordinator.

Figure 5:
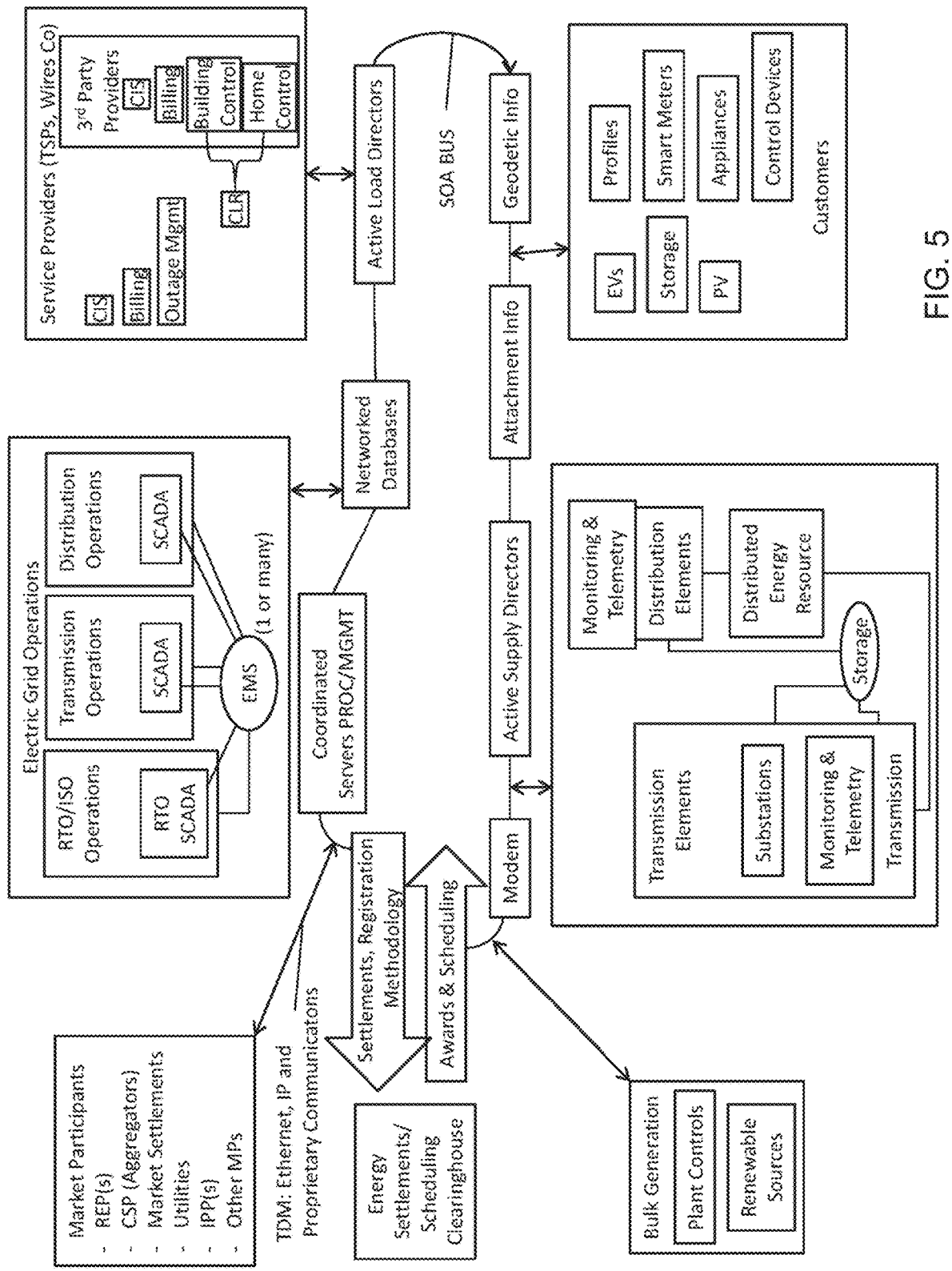
FIG. 5 is a schematic diagram showing energy system operations and communications via network-based connections.

FIG. 5 is a schematic diagram showing energy systems operations and communications network-based connections as part of systems and methods of the present invention, including compatibility and/or compliance with US National Institute for Standards and Technology (NIST) standards applicable to transmission and/or distribution lines for the electric power grid in communications network connectivity with a multiplicity of grid elements, market participant(s), utility or electric power generator supplier and/or third party energy provider (for GSS, as described hereinbelow), an energy market clearinghouse (ECM), an aggregator for providing at least one power trading block (PTB) for settlement for energy supply and/or curtailment as supply providing by at least one of a multiplicity of grid elements, including power consuming devices, ALCs, ALDs, ASCs, ASDs, and at least one coordinator.

Figure 6:
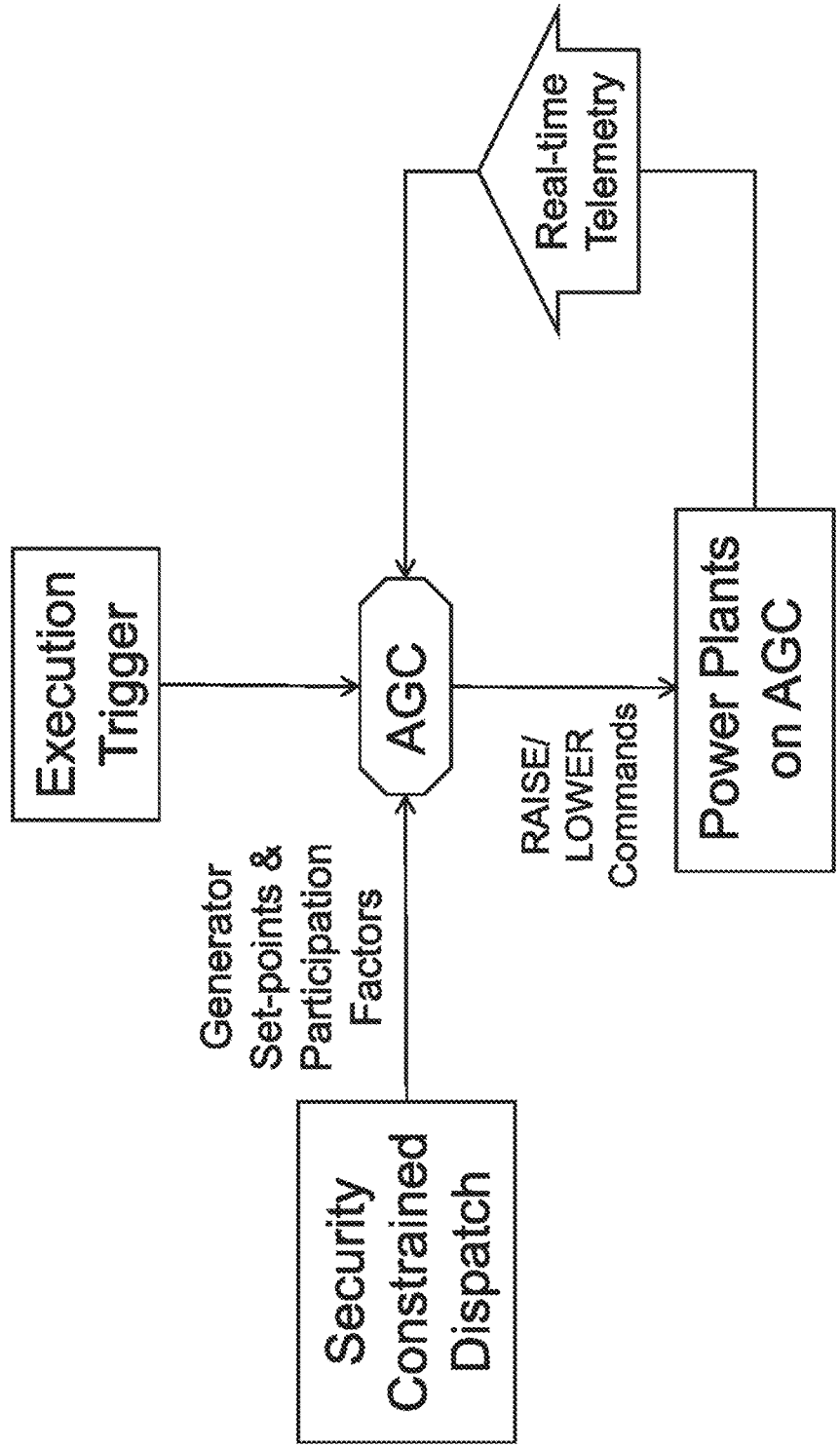
FIG. 6 is a schematic diagram showing a basic Automated Generator Control (AGC)/energy management system (EMS)/distribution management system (DMS) representation.
Figure 7:
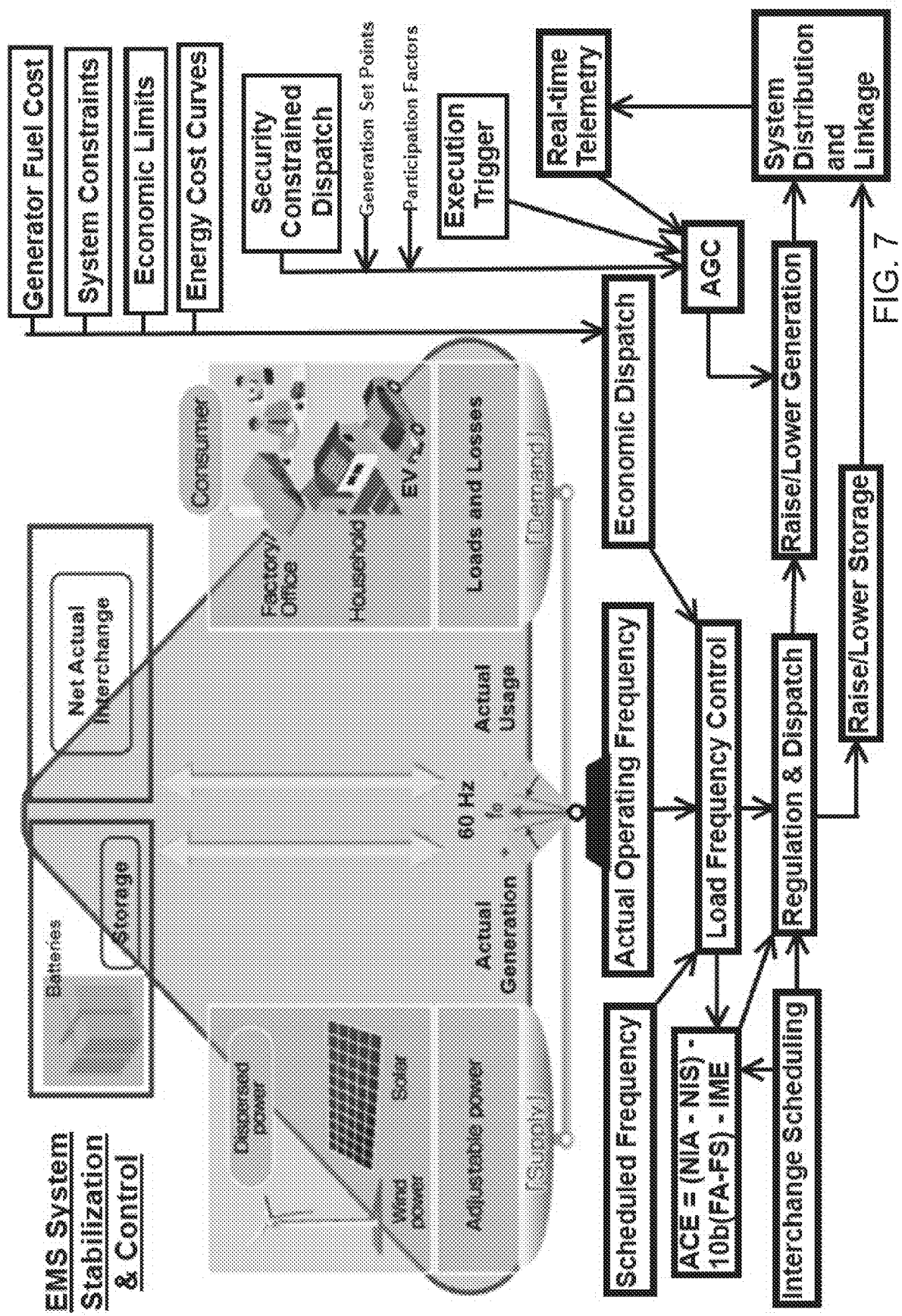
FIG. 7 is a schematic diagram illustrating an energy management system (EMS) as part of the system of the present invention.
Figure 8:
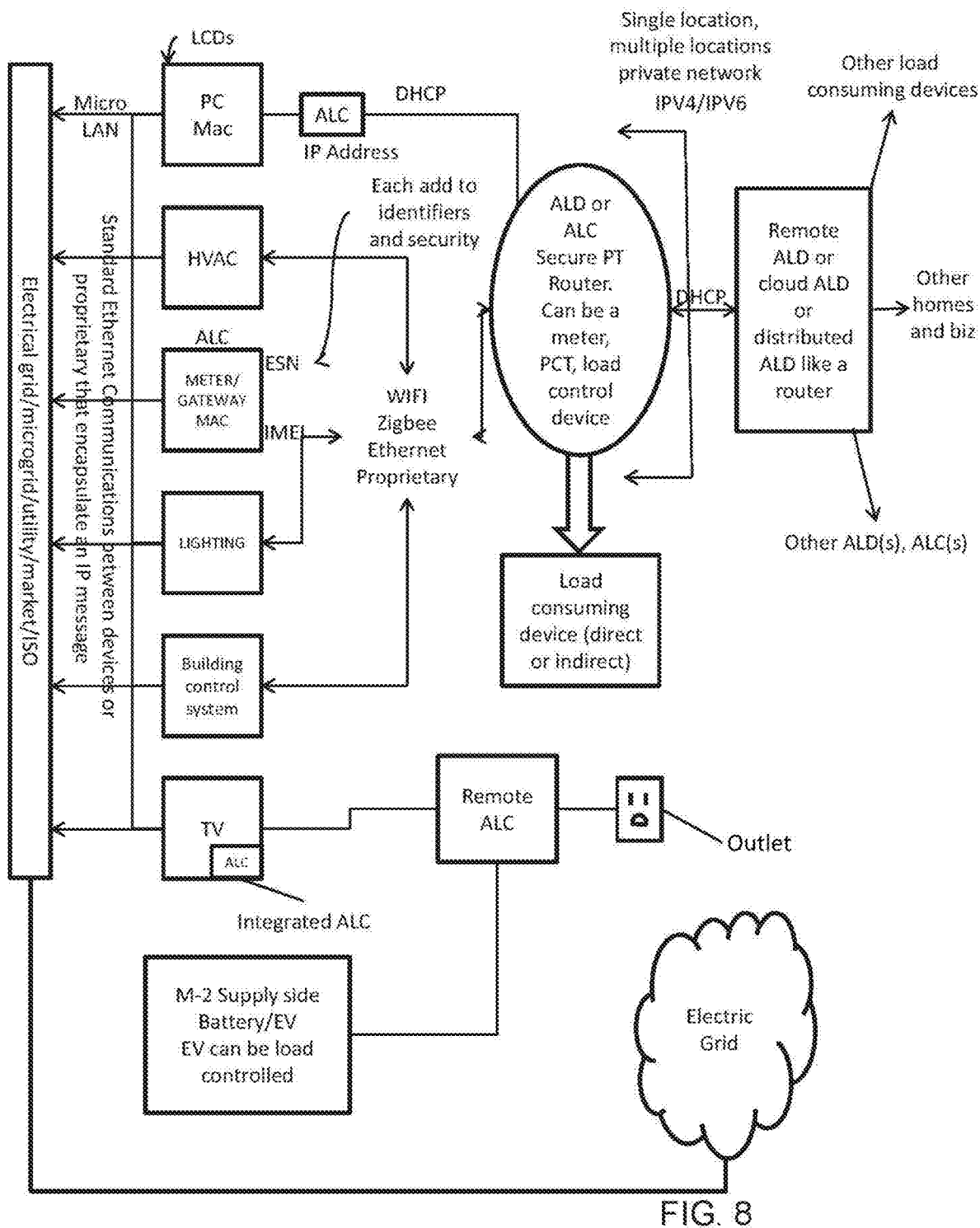
FIG. 8 illustrates a schematic diagram of an IP-based active power management system in accordance with an exemplary embodiment of the present invention.

FIG. 6 is a schematic diagram showing a basic AGC/energy management system (EMS) representation. By way of introduction to the present invention, FIGS. 1 and 8 illustrate a schematic diagram of an IP-based active power management (load and supply) system having active grid elements in accordance with an exemplary embodiment of the present invention. This diagram shows analogies for how active grid elements having predetermined functionality as load-consuming devices are addressable with IP-based messaging within the communications network by an active load director (ALD) and/or Coordinator, by comparison to basic communication networks such as the Internet. Similarly, Active Supply Director (ASD) and Active Supply Client or Element (ASC) provide for the corresponding management of electric power available or actually supplied to the electric power grid, whether by Generation Source Supply (GSS) elements or by Storage Source Supply (SSS), including battery or fuel cell, or compressed air, stored water, or any subsystem that includes a potential for discharging electricity as stored energy to the electric power grid, available for discharge or actually discharged into the grid. In any case, whether electric power supply for the grid is provided by generation or load curtailment, the supply is evaluated and rated by Power Supply Value (PSV) and Power Trade Block (PTB), which indicates the amount of power, including aggregated amounts acceptable for settlement by the grid, which are communicated by the active grid elements through the Coordinator and then to an energy management clearinghouse for settlement based upon PSV, PTB, and market factors associated with and communicated by the active grid elements and timing, duration, quality, type of event (for supply and/or demand response) within the electric power system energy management to the coordinator. Preferably, all information required for settlement is communicated within the systems and methods and by apparatus embodiments of the present invention, automatically and/or autonomously and preferably with IP-based messaging via the network; this information is routed by at least one coordinator and stored in memory in a database that is accessible by the energy management clearinghouse.

Each active grid element associated with supplying power and/or providing load curtailment within the electric power grid, includes with its attributes at least one Power Supply Value (PSV) associated with its activity and function within the grid. Power Supply Value (PSV) is estimated, modeled, measured, and/or determined or calculated at the meter or submeter, building control system, supply source, or at any device or controller that measures electric power within the standard as supplied by the regulatory body(ies) that govern the regulation of the grid. PSV depends on operating tolerances, operating standard for accuracy of the measurement. Notably, the PSV provides a uniform, systematic unit for addressing the power curtailment or power supply that is responsive to an energy management system (EMS) or equivalent for providing grid stability, reliability, frequency as determined by governing authority, grid operator, market participant, utility, and/or regulations applicable to the electric power grid operations. The PSV enables transformation of curtailment or reduction in power, in addition to the introduction of power supply to the grid, at the device level by any system, apparatus, and/or device that sends or receives an IP message to be related to or equated to supply as presented to the governing entity that accepts these values and award supply equivalence. PSV may be provided in units of electrical power units, flow, monetary equivalent, and combinations thereof. The PSV and/or PTB addresses the longstanding unmet need within the electric power management systems for a consistent or standard unit(s) that provide for blocks or bundles of energy are introduced, aggregated, and settled; the prior art nowhere teaches or discloses these functional units. Thus, the present invention includes a PSV that provides a unit for measuring and settling for each active grid element the power available for/introduced to the electric power grid and/or the curtailment power available (consistent with FERC orders 745, 750, 755 all published in 2011, which are incorporated herein by reference in their entirety) as a requirement for providing supply to the power grid, and, particularly wherein the supply to the power grid is provided for grid stability, voltage stability, reliability, and combinations thereof. Notably, "high performance reserves" from FERC order 755 covers for "deadband", i.e., the time between receipt of reg-up/reg-down, recognition of that order, and response to impact on the grid, which is about 5 minutes for high performance reserves, which are faster for supply than the traditional utilities.

PSV is preferably settled as traditional power delivery or curtailment systems at the nearest interconnection point, Location Marginal Price (LMP), node, transmission interconnection, balancing authority, utility service area, retail electric provider service area, ISO, state, and combinations thereof, i.e., settlement is available at the point of delivery and/or acceptance (or attachment point), and is facilitated by ALC, ASC, Coordinator, metering device, smart meter, sub-meter, and combinations thereof, or any revenue grade device accepted by the governing authority to determine PSV and/or settlement for each active grid element. Also preferably, PSV includes consideration for line losses proximal to those devices and/or grid elements, if not through real-time metrics then through modeling and/or estimation. Furthermore, regarding PSV and other metrics, where no real-time metrics for verification and settlement exist, modeling is used. Preferably, analytics is used in connection with the present invention for modeling, estimation, optimization, and combinations thereof, such as those analytics taught by U.S. Pat. Nos. 8,180,622, 8,170,856, 8,165,723, 8,155,943, 8,155,908, 8,131,401, 8,126,685, 8,036,872, 7,826,990, 7,844,439, 7,840,395, 7,729,808, 7,840,396, 7,844,440, 7,693,608, and US Patent Application Publication Nos. 20070239373, 20080262820, 20080263469, 20090076749, 20090083019, 20090105998, 20090113049, 20100023309, 20100049494, 20100168931, 20100268396, 20110082596, 20110082597, all of which are incorporated herein by reference in their entirety.

The present invention methods, systems, devices, and apparatus provide transformation of grid elements to active grid elements following their automatic registration with IP-based messaging communicated via the network and preferably through a coordinator. Following registration, the active grid elements operate according to their respective intended functions, and also preferably continue to have automatic communications and messaging via the network through at least one coordinator. Because of the automatic and preferably autonomous registration and ongoing messaging, active grid elements operate collectively for managing flow of power for an electric grid, micro grid, or other system, or combinations thereof, more particularly the supply of electric power for the grid, whether by generation, storage for discharge, electric vehicles (EV), which function as transportable storage and load consuming devices, either standalone or in aggregate, (and must be tracked to ensure proper settlement and grid stability management), and/or load curtailment, and function to ensure grid stability and to supply electric power from any source of power generation, storage, and/or curtailment that equates to supply.

According to the present invention, grid stabilizing metrics including voltage, current, frequency, power factor, reactive and inductive power, capacitance, phase control, and/or any other grid metric that is required by a grid operator, market participant, utility, and the like, to operate and maintain electric power grid stability as determined by the grid operator or the governing entity therefor. Preferably, these metrics are monitored and/or measured at a multiplicity of points, and more preferably using active grid elements and their attributes and status information throughout the electric power grid, including but not limited to locations within or at the distribution system, transmission system, electrical bus (substation), generation source, supply control devices, load control devices, load consuming devices (particularly those involved in curtailment activities), at least one Coordinator, and combinations thereof. The metrics apply to any size and type of active grid element, regardless whether the generation source is macro in nature, e.g., large scale generation such as large coal, nuclear, gas or other traditional or non-traditional sources of generation, microgrid generation, emergency back-up power generation, alternative energy generation, e.g., wind, solar, etc., or a power storage device or fuel cell that is potentially available for discharge.

Also, at least one of the active grid elements may include client devices or the associated power consuming or generation control devices have the ability to independently execute commands from an Active Load Director (ALD), Active Load Client (ALC), a $3^{rd}$ party Energy Management System (EMS), Active Supply Director (ASD), Coordinator, Generation Source Supply (GSS), Storage Source Supply (SSS), transmission/distribution capacity, messaging, settlements, security, and combinations thereof, that provide for both load consuming and generation to engage with the electric power grid at attachment points with assured grid stability as indicated by the grid stability metrics for compliance with requirements of the grid operator, utility, market participant, grid governing authority, and/or any other regulations applicable to the electric power grid. All of these active grid elements preferably receive their commands and send communications and/or messaging via an IP message via a Coordinator or Layer 3 router capable of handling all current and future iterations of IP messaging contemplated during the life of this invention. FIG. 6 is a schematic diagram showing a basic AGC/energy management system (EMS) representation as part of the system of the present invention. As shown in FIG. 6, a detailed EMS with automatic generation control and distributed energy resource (DER) (FIG. 3 and FIG. 4), and load resources (L and CLR in FIG. 3 and FIG. 4) is provided according to the present invention.

Also preferably, all messaging to and from active grid elements is controlled, managed, and transmitted through the Coordinator, which communicates between the many active grid elements, including and following their initial registration, and the EMS and/or grid operator, utility, governing authority, and combinations thereof. More preferably, all commands and communications are routed through and by the Coordinator, which is constructed and configured for direct and/or wireless communication with the multiplicity of grid elements, and further includes components of processor, memory, persistence layer, memory cache, messaging engine, security interface, status and/or change-in-status indicator, geodetic locator, telemetry, connections with the network, software operable for managing and changing the connections, database with software operable for storing and analyzing data associated with transmission and distribution attachments, service points, active grid elements, registration, authentication, PSV, PTB, identification, capacity and capability of load and supply, software version control for active grid elements, software improvement control, software for settlement, and combinations thereof. Other switch elements, which may be included as active grid elements, that may be applicable to the Coordinator, and are included with the present invention include customer identification and authentication, customer security, attachment information and capacities, reservations for utilizing the transmission and distribution system, signaling to the electric grid or its operator the plurality of all the above. The Coordinator functions as an "energy router" whereby the messaging required to route supply, demand and transmission/distribution capacity to and from the grid is differentiated from pure communications routing and relates to grid stability and improved grid performance. Thus, the Coordinator is not merely functional as a traditional telecommunications router, but further includes the aforementioned messaging, management, and control functionality required for supply or curtailment to the electric power grid. The Coordinator is consistent with compliance as contemplated in the aforementioned FERC orders where frequency deviations, security, and grid performance are all now needed in an era of aging grid infrastructure and a changing and dynamic load environment where the legacy macro grid and the interim "Smart Grid" elements are not capable of responding to the new needs that FERC and NERC have identified and charged the market participants to solve, which have not yet been solved by any prior art, but which are addressed by the present invention. The energy routing function of the coordinator serves as a traffic manager, and a messaging engine, to track all the active grid elements, secure reservations and settlement information on the electric power grid and the interface for one-to-many (i.e., one port for EMS to the many active grid elements under the control of an EMS and supplying grid stability from the many to the one) allowing for microelements and distributed generation and distributed load curtailment to perform with the macro grid without taxing and destroying the legacy infrastructure beyond its capabilities and limitations; the Coordinator is further operable for tracking and maintaining status of all devices within its defined boundaries, or as described hereinabove with respect to PSV, or determined by the governing authority for the grid, which includes a balancing area, an ISO, a utility, a market participant, and combinations thereof. FIG. 1 (in addition to other figures) provides a schematic diagram illustrating the Coordinator as part of the system and methods of the present invention. Additionally, since the Coordinator operates as "energy router" it is operable to register all new grid elements, it functions to "reserve" a message to introduce it to the network; once registered through the Coordinator and introduced into the electric power grid and communications network, including storage of its active grid element attributes in a database, each active grid element is also updated via messaging by, to and through the Coordinator.

The Coordinator operates further for communication of all telemetry, settlement, tracking, and combinations thereof for each active grid element. All active grid elements associated with the grid for supply and/or load curtailment are registered with the Coordinator and are routed within one or more ports within the EMS, for example as illustrated in the Figures; thus, the Coordinator and its application or functionality within the electric power grid, sending the signals, telemetry and messaging for primary frequency control, grid stability, control events, dispatch schedules for supply sources (both pre-scheduled and dynamic/real time in response to electric power grid conditions), and combinations thereof through messaging and coordination with the active grid elements. The Coordinator also preferably includes functionality for clearing and reporting to and with transmission reservations subsystems associated with the active grid elements. By way of example, prior art transmission reservations subsystems can be represented by companies such as OATI's OASIS transmission reservation system (illustrated at the Internet website www.oatioasis.com), which is overseen and regulated by FERC, but whose clearing and reporting is deficient in enabling reservations below macro transmission levels, and whose reservation systems include "firm" capacity and "non-firm" capacity that has very little value since its reliability is not assured. The present invention solves many of these problems and creates "actual measurable and verifiable transport capacity" by enhancing power distribution, settlement, and combinations thereof, by grid element, by service point, by device and by consumer. Additionally, telemetry for settlement for curtailment, supply from storage, and combinations thereof, area managed through the Coordinator. The Coordinator is further constructed, configured, and operable in IP-based or proprietary messaging communication, for providing a routing and control architecture and methods analogous to the OSI model used in telecommunications networks worldwide, applied for all active grid elements management and for supply, whether GSS or SSS, and load curtailment management for any of the multiplicity of active grid elements, and grid stability. The messages contemplated by this type of energy routing and capacity creation in itself creates the potential for a new standard for achieving FERC and NERC goals while seamlessly integrating into legacy subsystems of current art of macro electric utility architecture.

The method, system and apparatus embodiments of the present invention further provide that the active grid elements are operable to send change in state messages in lieu of a constant stream of IP messages via a telemetry path. The change-in-state messages provide the ability to only communicate the "deltas" (or change in state) and have the ALD, ASD, and/or server transmit, send, or stream the telemetry from the last "known value" until that last known value has changed, by communicating a "delta" message, rather than constantly streaming values, and may use "machine to machine" communications, text telemetry, or any low bit rate telemetry method that meets the requirements as established by the governing entity, but is capable of complying while simultaneously utilizing the transmission bandwidth and latency that is available at a service point or active grid element location. These change-in-state messages associated with the active grid elements preferably include the necessary information to report the Power Supply Value (PSV), PTB, and/or any other grid stability messages on an event basis rather than merely a telemetry basis and to send those messages through a server, and are transmitted to an energy management system (EMS) via a format as determined by the grid operator, microgrid operator, and/or other grid control entity while simultaneously achieving primary frequency control and grid stability at the service point and/or active grid elements and storing at the ALC, ASD, ALD, ASD or combinations thereof the necessary information in granular format sufficient to transmit for settlement or measurement & verification processes later either when better transmission speeds are available or retrievable by a manual intervention such as a smart phone, tablet or drive by apparatus where the memory may be downloaded to a mobile client.

The systems, methods, and apparatus embodiments of the present invention further provide for commands issued either directly by the EMS, Coordinator, ASD, ASC, ALD, ALC, load consuming device, "Smart Electric Meter" and its subcomponents (processor/memory), or by programming any active grid element, for example, a client device such as a programmable thermostat or building control system, wherein the commands anticipate the activation of a load curtailment event for any load consuming device (such as an HVAC system, a system profile that has been programmed for supply side indices such as market price of power or Operating Reserves or load side indices that take a consumer's preferences into account, or any other sensor) or the activation of a supply or demand event for any supply source associated with the electric power grid.

Just prior to the activation of the load consuming device a precise measurement of total load as measured by the meter or submeter, ALC, or load consuming device is made as to ascertain its contribution to the total amount of electricity prior to the activation of the load consuming device. Similarly, for ASD, ASC, or any supply source, GSS or SSS, electric supply availability and electric supply existing at the attachment point(s) is determined. Measurements by the same aforementioned measuring elements are made after the registration of the grid elements and their transformation into active grid elements, whether a load consuming or supply device or other function. Either through a baseline measurement or with precise timing of measuring the "before" and "after" load or supply contribution by the active grid element is recorded in the ALC or ASC, device, or passed or routed to the Coordinator or the EMS via an IP message utilizing one of the aforementioned communications methods to the ALD, ASD, and/or Coordinator, or is stored in the ALD, ASD, and/or Coordinator until a "change-in-state" message for the grid element(s) is communicated directly to the ALD, ASD, and/or Coordinator, so that it might be used in the calculation of load removed, "cut", reduced, or "added", or supply available or supply provided, in response to an ALD, ASD, and/or Coordinator, a preprogrammed load curtailment or supply profile, or in response to commands from an Energy Management System (EMS), or correspondingly, the ALC, ASC, Coordinator, a pre-programmed supply profile, or combinations thereof, or in response to commands from an EMS (preferably via the Coordinator) for active supply management from any supply source, whether generation, storage, or combinations thereof.

The following examples illustrating embodiments for the systems, methods, and apparatus of the present invention for registration and management of active grid elements follow the FERC regulations 745, 750, and 755 introduced in 2011 for Load Curtailment, Supply from Storage, and Supply from Generation.

Figure 9:
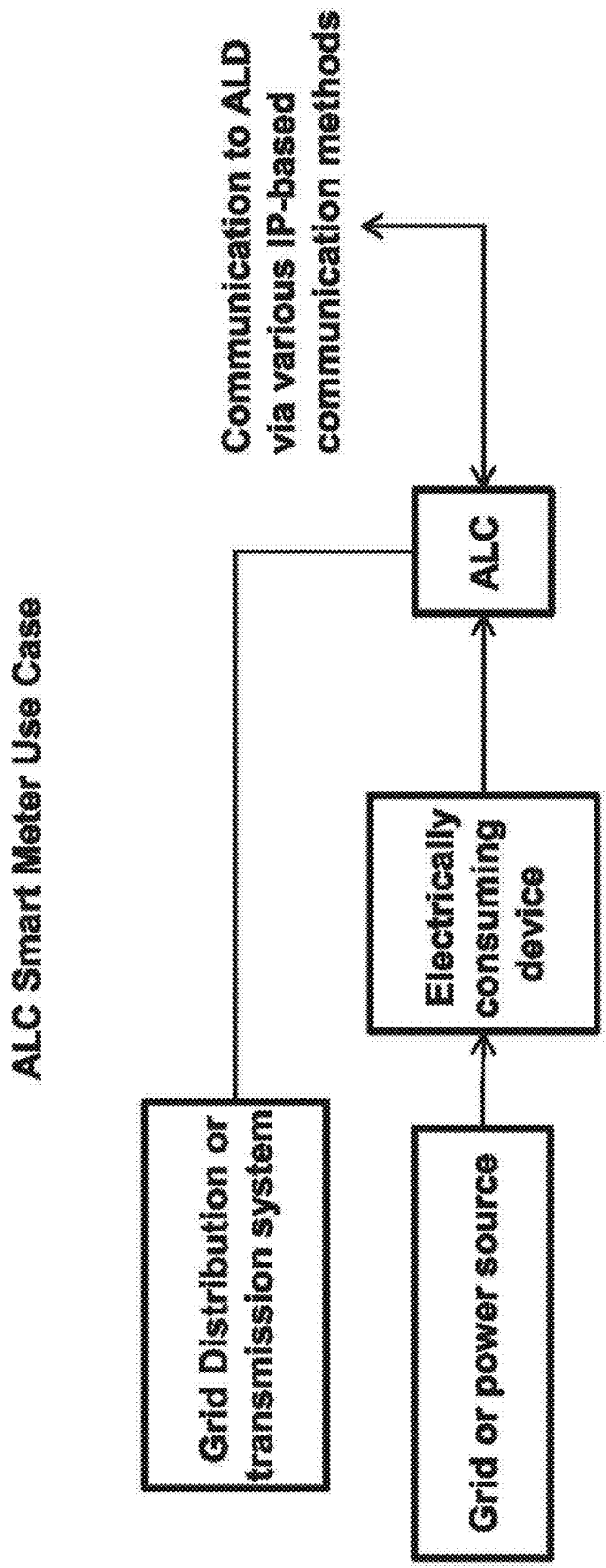
FIG. 9 is a schematic diagram illustrating an exemplary active load client (ALC) smart meter use case example according to the present invention, wherein the ALC is shown as a component of the system of FIG. 8.
Figure 10:
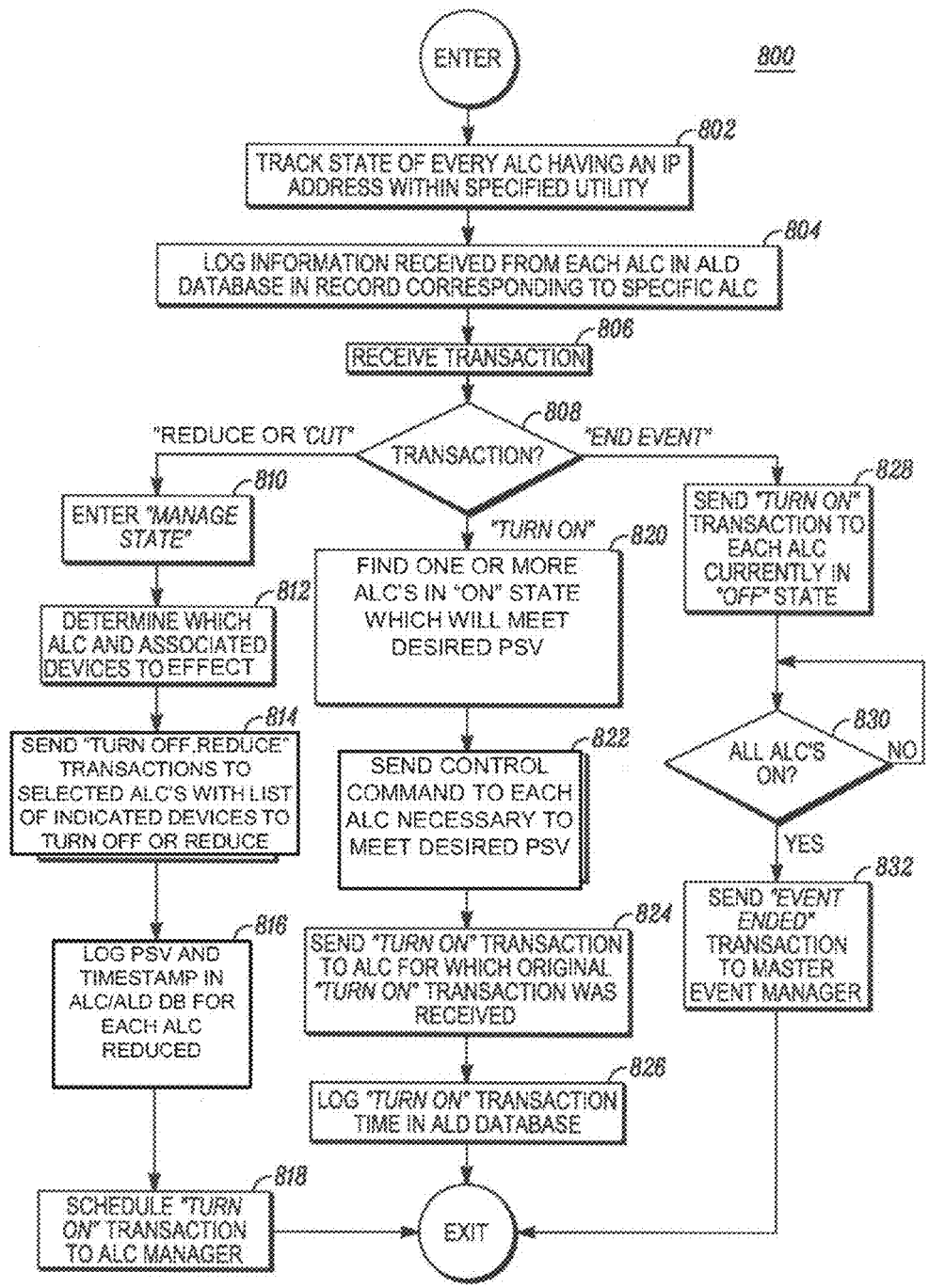
FIG. 10 illustrates a flow diagram of methods according to the present invention for tracking state of ALCs having an IP address within an electric power grid system.
Figure 11:
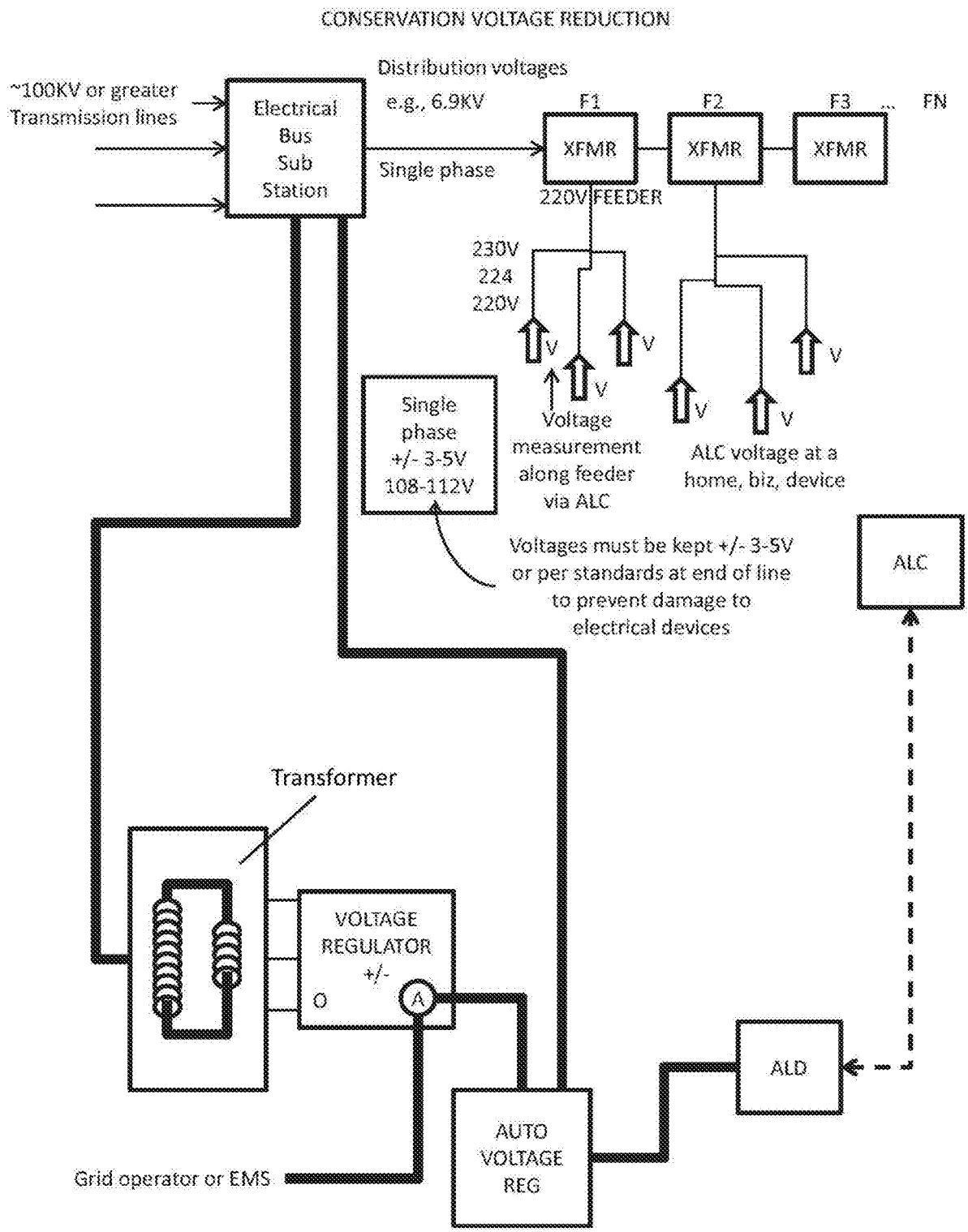
FIG. 11 is a schematic diagram an IP-based active energy management system in accordance with the present invention, including components of ALC, ALD, IP-based communication, load control devices and power consuming devices.

Relating to the load curtailment for providing a supply equivalent, FIG. 8 provides a schematic diagram illustrating an exemplary grid element as active load client (ALC) smart meter use case example according to the present invention, wherein the ALC is shown as a component of the system of FIG. 9. Additionally, or alternatively, by way of example and not limitation, smart breakers and command relay devices, are active grid elements following their registration according to the present invention, and may be considered and operated as submeters for measurement and verification purposes. In other method steps for the present invention, FIG. 10 illustrates a flow diagram of methods according to the present invention for tracking state of active grid elements as ALCs having an IP address within an electric power grid system. FIG. 11 is a schematic diagram providing an overview of an IP-based active energy management system (EMS) in accordance with the present invention, including active grid elements as ALC, ALD, IP-based communication, load control devices and power consuming devices, which are described in more detail in the following specification. As illustrated, the EMS/Grid Operator/Market Participant/Retail Electric Provider/Independent Power Producer/Automatic Generation Control component(s) of the system of the present invention are in networked communication with active grid elements (in this example, ALD(s)) via IP-based communication methods, for communicating with these active grid elements about load control events to control devices and/or ALCs for managing load consumed by power consuming devices. A variety of system elements are illustrated for exemplary purposes, to show the interaction between the active grid elements.

In another aspect of factors addressed by the present invention, consider an exemplary system arrangement for conservation voltage reduction (CVR). Transmission lines, which transfer electric power from the power generation source, such as by way of example and not limitation an utility, to an electrical bus or substation, where it is transformed to provide distribution voltages (e.g., about 6.9 kV in this example and single phase) to additional transformers, indicated as F1, F2, F3, . . . FN, where voltage measurement along the feeder via ALC(s). Under current standards, voltages must be kept at between about +/−3% and about +/−5%, but in any case maintained as required by standards, for final distribution at the end of the line to prevent damage to power consuming devices. The active grid elements functioning as ALCs preferably transmit voltage information and line loss information to the other active grid elements functioning as ALD(s). The active grid elements therefore establish a phase/voltage "locked" loop to automatically control the voltages so that the CVR creates megawatts of operating reserves according to the methods and systems of the present invention.

The present invention further provides that the active grid elements are operable to send change in state messages in lieu of a constant stream of IP messages via a telemetry path. The change-in-state messages provide the ability to only communicate the "deltas" (or change in state) and have the ALD, ASD, and/or server transmit, send, or stream the telemetry from the last "known value" until that last known value has changed, by communicating a "delta" message, rather than constantly streaming values, and may use "machine to machine" communications, text telemetry, or any low bit rate telemetry method that meets the requirements as established by the governing entity, but is capable of complying while simultaneously utilizing the transmission bandwidth and latency that is available at a service point or active grid element location. These change-in-state messages associated with the active grid elements preferably include the necessary information to report the Power Supply Value (PSV), PTB, and/or any other grid stability messages on an event basis rather than merely a telemetry basis and to send those messages through a server, and are transmitted to an energy management system (EMS) via a format as determined by the grid operator, microgrid operator, and/or other grid control entity while simultaneously achieving primary frequency control and grid stability at the service point and/or active grid elements and storing at the ALC, ASD, ALD, ASD or combinations thereof the necessary information in granular format sufficient to transmit for settlement or measurement and verification processes later either when better transmission speeds are available or retrievable by a manual intervention such as a smart phone, tablet or drive by apparatus where the memory may be downloaded to a mobile client.

The systems, methods, and apparatus embodiments of the present invention further provide for IP messages to include commands issued either directly by the EMS, Coordinator, ASD, ASC, ALD, ALC, load consuming device, "Smart Electric Meter" and its subcomponents (processor/memory), or by programming any active grid element, for example, a client device such as a programmable thermostat or building control system, wherein the commands anticipate the activation of a load curtailment event for any load consuming device (such as an HVAC system, a system profile that has been programmed for supply side indices such as market price of power or Operating Reserves or load side indices that take a consumer's preferences into account, or any other sensor) or the activation of a supply or demand event for any supply source associated with the electric power grid.

The balancing areas (BAs) provide for opportunities for the electric power grid and/or a multiplicity of grids that are constructed and configured for networked communication and power distribution therebetween. In one embodiment of the present invention, communication with active grid elements passes through or is routed by at least one Coordinator for providing the one-to-many coordination of communication, messaging, etc. between the many active grid elements and the EMS, inside a given BA or between BAs, which may involve at least one Coordinator for each BA, thereby providing for managed, coordinated cross-communication of status, change-in-status, grid stability metrics, control messages, and combinations thereof.

The present invention systems and methods provide for power trade blocks or power trading blocks (PTBs) for facilitating the collaboration across balancing areas and regions for supply and load curtailment management, for increasing power available, operating reserves, and/or grid stability. In preferred embodiments of the present invention, at least one PTB is introduced and/or provided to the electric power grid, including method steps of: valuing, trading, selling, bartering, sharing, exchanging, crediting, and combinations thereof. Thus the present invention provides for electric trading markets across BAs or microgrids or individual active grid elements, including load consuming customers or supply sources, whether generation, storage, distribution or transmission.

Telemetry, measurement, verification, PSV, PTB, and other factors described herein, in compliance with FERC 745, 750, and 755, provide with the present invention the capacity for active grid elements functioning for providing curtailment as operating reserves to be compensated for megawatts at the clearing price, and for supply to be provided or indicated as available to be provided, and compensated or settled for megawatts at the clearing price. Clearing prices are either determined by many attributes including their location of where the power is delivered or accepted by a generator of power or a purchaser of power. The term "Locational Marginal Pricing (LMP)" refers to a node where power is either delivered from a generator or accepted by a purchaser. A node corresponds to a physical bus or collection of buses within the network or any other geodetically defined boundary as specified by the governing entity. A load or supply zone is defined as an aggregation of nodes. The zonal price is the load-weighted average of the prices of all nodes in the zone. A hub is defined as the representative selection of nodes to facilitate long-term commercial energy trading. The hub price is a simple average of LMPs at all hub locations. An external or proxy node is defined as the location that serves as a proxy for trading between ISO-Balancing area and its neighbors. According to the present invention, the at least one grid element(s) includes transmission or distribution control node, monitoring node, telemetry node, routing node, electrical routing node, fault protection node, generation node, load control node, devices (active and passive), sensors, etc., wherein any node includes an interface and/or an attachment.

The following related US Patents and Patent applications, U.S. application Ser. No. 13/172,389, filed Jun. 29, 2011, which is a continuation of U.S. application Ser. No. 12/715,195, filed Mar. 1, 2010, now U.S. Pat. No. 8,032,233, which is a divisional of U.S. application Ser. No. 11/895,909 filed Aug. 28, 2007, now U.S. Pat. No. 7,715,951, are incorporated herein by reference in their entirety. These documents include descriptions of some active load management within power grids, and provide additional background and context for the present invention systems and methods.

The present invention systems and methods provide herein below for power trade blocks or power trading blocks (PTBs) for facilitating the collaboration across balancing areas and regions for supply and load curtailment management, for increasing power available, operating reserves, and/or grid stability. In preferred embodiments of the present invention, at least one PTB is introduced and/or provided to the electric power grid, including method steps of: valuing, trading, selling, bartering, sharing, exchanging, crediting, and combinations thereof. Thus the present invention provides for electric trading market across BAs or microgrids or individual active grid elements, including load consuming customers or supply sources, whether generation, storage, or distribution or transmission.

Telemetry, measurement, verification, PSV, PTB, and other factors described herein, in compliance with FERC 745, 750, and 755, provide with the present invention the capacity for active grid elements functioning for providing curtailment as operating reserves to be compensated for megawatts at the clearing price, and for supply to be provided or indicated as available to be provided, and compensated or settled for megawatts at the clearing price. Clearing prices are either determined by many attributes including their location of where the power is delivered or accepted by a generator of power or a purchaser of power. The term "Locational Marginal Pricing (LMP)" refers to a node where power is either delivered from a generator or accepted by a purchaser. A node corresponds to a physical bus or collection of buses within the network or any other geodetically defined boundary as specified by the governing entity. A load or supply zone is defined as an aggregation of nodes. The zonal price is the load-weighted average of the prices of all nodes in the zone. A hub is defined as the representative selection of nodes to facilitate long-term commercial energy trading. The hub price is a simple average of LMPs at all hub locations. An external or proxy node is defined as the location that serves as a proxy for trading between ISO-Balancing area and its neighbors. According to the present invention, the at least one grid element(s) includes transmission or distribution control node, monitoring node, telemetry node, routing node, electrical routing node, fault protection node, generation node, load control node, devices (active & passive), sensors, etc., wherein any node includes an interface and/or an attachment.

For vertically integrated utilities that do not have open markets as ISOs, their delivery or acceptance of power can occur at their boundaries of their "Balancing Area", which is defined as the geography where their transmission and distribution system extends and is subject to grid stability maintained by that utility. Balancing Authority boundaries can also be delivery points or (LMP) pricing points. It should be noted that vertically integrated utilities are subject to the same FERC and NERC rules as decoupled utilities in ISOs, except in vertically integrated utilities, local public utility commissions have more authority to enforce and enhance rules since the rate base is being charged for improvements to the grid within the balancing area (BA) that the utility serves. Three FERC orders (745, 750, 755; all from 2011) apply to electric power grid load management and distributed supply, including active grid elements and their registration and functionality within the system according to methods and apparatus embodiments for present invention. The trend in the world market is to inject market forces to utilities such that they must follow new FERC rules that permit the use of demand response technologies/load curtailment technologies to promote the need for fewer large scale, primarily fossil fuel power plants.

Power is generally traded in terms of "Capacity" the reserved peak amount of power that a generator agrees to reserve for the utility, market participant, or REP; and "Energy" is defined as the amount of power consumed by the utility, market participant, REP or any entity that is authorized to buy, sell or distribute power for the electric power grid, consumers, particularly commercial accounts, also purchase power in this manner. Energy is settled on the wholesale market in "Megawatt Hours", which is defined as one (1) million watts of electricity consumed at a metering point, or interchange of power such a LMP, transmission tie point between two utilities, a commercial customer large enough to consume such an amount, a utility (generating or distributing) or a market participant including a REP that generally purchases the power from a generating utility and utilizes the distribution network to supply its power purchased at the wholesale level and distributes its power to end consumers/customers generally in smaller increments of measurement "kilowatt hours (kWH)." These increments are important due to the introduction of programs involving utilizing curtailment technologies enabled by FERC Order 745, 750, 755 whereby utilities, market participants, REPs and CSPs may aggregate their curtailment/DR and/or supply in increments of "kW-representing a capacity figure" and "kWH" which represents avoided energy. Peak "capacity" charges are settled based upon intervals whereby the instantaneous peak (kW/MW) determines the "capacity" charge.

In particular, by way of more detailed explanation, in 2011, FERC issued a series of orders (745, 750, 755) that have had a pronounced impact on the injection of new technologies, particularly distributed load resource, curtailment, demand response technologies, and distributed supply sources, to the market to be implemented across all of the US and with direct applicability to World markets. FERC Order 745, issued Mar. 15, 2011 and adopted April 2011, and which is incorporated herein by reference in its entirety, provides that utilities, market participants, CSPs, REPs or any other entity that can aggregate a minimum trading block of power that can be accepted into the market, BA, or utility service area or regional trading area (RTO) must be compensated for such curtailment/load resource and demand response technology at the clearing price at the nearest LMP as though it was generation; this provides that active grid elements associated with these supply and/or curtailment activities may be individually tracked, managed, reported, and compensated based upon their individual contribution to the aggregated settlement. Said plainly, "Negawatts" have the same value as "Megawatts." Controversial, particularly to those utilities that still have the antiquated practice of rate base recovery of assets to insure profits, the conditions of which these "Negawatts" are compensated as "Megawatts" place a high value on those curtailment/load resource/demand response technologies that can create utility Operating Reserves for the benefit of grid stability. Operating Reserves, previously defined, come in different capacity and energy products or their equivalencies in the case of curtailment/load resources/demand response and are compensated at the nearest LMP based upon their ability to perform to the same level of measurement, verification, responsiveness (latency) and settlement as generation. This high standard has the practical effect of rewarding those advanced technologies that can perform as generation equivalencies (load resources), while still allowing capacity products (traditional and advanced demand response) to also participate in the market and perform the valuable function of providing capacity and energy resources without the need for transmission losses (avoided power avoids transmission of kWH/MWH to the endpoint, therefore freeing up transmission and distribution lines to carry power elsewhere where it is needed). It should be noted that most utilities do not have accurate measurements of distribution losses below their electrical bus (substation levels) and as such high performance, IP-based active grid elements and corresponding service points that allow this information to be brought forward to the utility operations promote the Operating Reserves and "Negawatts" and add to their value.

Related US Patents and Patent applications, including U.S. application Ser. No. 13/172,389, filed Jun. 29, 2011, which is a continuation of U.S. application Ser. No. 12/715,195, filed Mar. 1, 2010, now U.S. Pat. No. 8,032,233, which is a divisional of U.S. application Ser. No. 11/895,909 filed Aug. 28, 2007, now U.S. Pat. No. 7,715,951, all of which are incorporated herein by reference in their entirety; these documents include descriptions of some active load management within power grids, and provide additional background and context for the present invention systems and methods.

Also, in this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

By way of definition and description supporting the claimed subject matter, preferably, the present invention includes communication methodologies for messaging via a communication layer. IP-based communications over a network are most preferred. Correspondingly, and consistent with the communication methodologies for messaging according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols may be used, including but not limited to a "1G" wireless protocol such as analog wireless transmission, first generation standards based (IEEE, ITU or other recognized world communications standard), a "2G" standards based protocol such as "EDGE or CDMA 2000 also known as 1×RTT", a 3G based standard such as "High Speed Packet Access (HSPA) or Evolution for Data Only (EVDO), any accepted 4G standard such as "IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE and ITU have released improved WiMAX and Long Term Evolution wireless standards that have facilitated the consideration of new technologies to improve the response and control of power load control devices employing smart breaker and smart disconnect switches that include advanced smart meters where IP multimedia gateways are embedded or attach as separate connected printed circuit boards, submetering technologies that possess sufficient "revenue grade" metrology such that the measurements provided by these devices may be accepted for settlement purposes. The term "revenue grade" is an industry term, as will be appreciated by one of ordinary skill in the art, a percentage of accuracy determined by ANSI, which means that power measurement must be within ½% of the actual value being consumed. Thus, calibration standards are provided accordingly to OEMs of power measuring devices and/or chips. In embodiments of the systems and methods of the present invention, these calibration standards are met via components including a chipset and related software, and the transmittal of the power measurement information via IP-based communications as set forth hereinabove. Baselining techniques that provide a reference power usage point, sampling techniques that allow for verification of the power "state" and power consumption data for electricity consuming devices (inductive or resistive), reactive power, Power Factor, start-up current, duty cycles, voltage, consumption forecasts and most importantly real-time or near real time power measurement sampling, etc. are required to derive a Power Supply Value (PSV) that includes an American National Standards Institute (ANSI), ISO, grid operator, governing body revenue measurement, etc., which is preferably aggregated to reach the size of at least a single Power Trade Block (PTB) unit for the purposes of optimally monetizing the active load management from the customer perspective. PTBs are dependent on a grid operator, regional transmission operator, or independent system operator to determine the capacity size (in kW or MW) or energy data in (kWH or MWH) that can be accepted for bidding, trading, settlement by the utility, the end consumer/customer, the market participant, the CSP, demand response aggregator or any entity authorized by the government entity that regulates grid operators such as FERC, NERC etc. Generally due to measurement, verification, transmission and/or distribution modeling (which considers the impact to the grid from the curtailment activities at any geodetic location on the grid, but generally modeled by electrical bus or substation), the minimum acceptable PTB is 100 kW at the time of the present invention. This limitation is not expected to be permanent, given these advancements in measurement/verification, the near real time or real time IP/Ethernet based telemetry capabilities presented by a plurality of various communications methods as discussed in this embodiment and the advancements in service oriented architecture based (SOA) software and hardware subsystems, when combined with an ALD and ALC that can perform at a sublevel such that the minimum PTB can be determined at the device, home, building, service point, commercial, industrial, transformer, feeder, substation, transmission line and any sub-point along the transmission and distribution feeder system of an electrical grid as so long as minimum telemetry, measurement, verifications, validation are met and are capable of being aggregated to a minimum PTB acceptable to the grid operator, ISO, RTO, BA or any other increment of grid topography used now or in the future for settling power block increments by sub-PTB.

Embodiments of the present invention expand upon and enhance prior technologies by, among other things, employing WiMAX, High Speed Packet Access (HSPA), Evolution for Data Only (EVDO), both considered $3^{rd}$ generation wireless standards, Long Term Evolution (LTE), considered at the time of the invention as a "4G" standard and its derivative standards that are most assuredly to be introduced during the life of this invention, IEEE 802.11 (X) also known as "Wi-Fi" and its derivative standards inclusive of "Multiple Input Multiple Output" (MIMO), as set forth in the communication methodologies hereinabove, a plurality of proprietary mesh and point to point communications solutions or any Internet Protocol (IP)-based load control in a system with the ability to monitor and measure, in real time or in sufficient time increments to satisfy the telemetry performance standards as established by the Government or governing bodies (ex: National Electric Reliability Corporation (NERC), the Federal Energy Reliability Commission (FERC) the amount of power deferred, conserved or removed (or carbon, $SO_2$, or $NO_2$ eliminated), such as by way of example the Kyoto or Copenhagen Protocols that set up carbon credits. These improvements allow new options for electric utilities or any market participant to defer or invest in new power generation that is friendlier to the environment.

IP-based power management is advantageous over existing systems for many reasons. This is particularly true for communications and control that employ Internet Protocol Version 6 (V6) whereby each of the multiplicity of active grid elements, including but not limited to load consuming device (ALC), meter, load control device, programmable thermostat (PCT), building control system or any device utilized for the measurement and control of power, and any supply-related element or device and related sensors and controllers, and their corresponding derivation of PSV and/or PTB for the purpose of power management, whether curtailment or supply, can have its own static IP address, virtual private network with enhanced security, to provide for operating reserves acceptable to the grid regulator, operator, or equivalent. Revenue grade metrology and IP-communication of a unique identifier, such as by way of example and not limitation, a static IP address or dynamically assigned IP address through IP V4 to provide for a unique identifier at that time, for each of the grid elements or device(s), control device(s), the Coordinator, and combinations thereof are critical for the real-time aggregation of PSVs to form at least one PTB corresponding to the load curtailment event. Thus, every piece of hardware having an IMEI (international manufacturer equipment identifier) and electronic serial numbers or MAC address are combinable with IP V6 so that each device has a unique identifier that provides for enhanced security and settlement. Other well established methods of secure transmission include the use of encryption "keys" widely used amongst the transmission of information between two IP based or proprietary solutions for the secure communication of PSVs, PTBs, equipment identifiers, "states", or any other grid stabilizing command, control or status message necessary to implement advanced load curtailment, load resources, or demand response for purposes of creating or aggregating individual load sources, groups of load sources, or any sub increment to create Operating Reserves and other grid stabilizing reserves that improve grid stability and operation. And correspondingly, for all supply availability and/or actual supply provided or introduced to the electric power grid for each active grid element, PSVs and PTBs, are aggregated as power supply sources in groups, or any sub increment to create distributed power supply for introduction at any predetermined attachment points, geographic locations, and combinations thereof, provided that it complies with all requirements, by way of example and not limitation, FERC, NERC, governing authority rules and requirements, etc.

For example, the Coordinator provides for positive control allows a system controller to receive a response from any active grid element at any location following its automatic registration with the electric power grid. Once functioning as intended, the active grid element communicates additional messaging, for example, which indicates that the actual target device has turned "off" or "on", or reduced, as in the case of a variable speed inductive device or a variable power consuming resistive device whereby complete operation is not interrupted but power consumption is reduced to create the operating reserve via curtailment of some but not all of the power from the power consuming device. Correspondingly, for any active grid elements that function as power supply, GSS or SSS elements provide for electric power supply available for introduction through attachment points for the grid. Additionally, each active grid element includes an unique active grid element identifier, which may include an equipment identifier, but which is completely unique to each active grid element. Also, for each active grid element, its IP address is either dynamically assigned when the grid element is registered automatically with the system (e.g., through use of the dynamic host configuration protocol (DHCP)) or statically assigned by the serving IP network, thereby providing enhanced security to protect against an act of random terrorism or sabotage inadvertently shutting down power services. Existing power management systems, including those utilizing radio subsystems that operate in unlicensed and uncontrolled spectrum bands such as the FCC is in bands, do not address security problems adequately and thus are more likely susceptible to hostile or malicious acts. Further embodiments of these active grid element identifiers include the use of MAC addresses, standards based encryption keys, and the normal encryption technologies that are inherent with the use of standards based communications methods such as HSPA, EVDO and LTE where packets are encrypted from the point they leave the radio base station or in some cases the router and even the application layer itself. Further embodiments include Virtual Private Network (VPN) and VPN tunnels that form virtual physical layer connections via an IP transport layer.

The market for electric power forecasts its needs on a predetermined basis, e.g., at least one day ahead of the event for load curtailment or supply request. Load amounts for generation or curtailment are provided for at least one location, geography, BA, and/or attachment point for the grid; also, corresponding pricing for those load amounts, depending upon the timing for the event, are also provided. Standby and clearing of energy supply are provided. These are generally controlled by an energy trader in the market. Allocation is made for regulating reserves, operating reserves, ancillary resources, real-time energy, and combinations thereof. For example a bid is submitted to ERCOT. The status of each active grid element, including load-consuming devices and supply sources is provided through messaging, preferably through the Coordinator; also, the Coordinator provides for information and messaging relating to active grid element or device identification, capacity, status, etc. The Coordinator is the routing, status, capacity, identifier, tracking, and/or control communicator between the multiplicity of active grid elements and the EMS or control server, ASD. By reference to FIG. 8, ALC communicates its status through an ALD, ASD, and/or the Coordinator to the EMS and/or grid operator. The communication occurs through the various methods and components identified herein. The message from the active grid element and/or device, including identification of the element or device, capacity, availability for supply or load curtailment, etc. Significantly, each grid element must be registered with the grid to be activated functionally, to then provide for active grid element functional participation in the grid for the predetermined, intended function of the respective active grid element. In preferred embodiments, this registration occurs through the Coordinator and via IP messaging, and the telemetry is provided as required by the grid for those specific active grid elements, and depending upon their participation, function, and/or role in the grid. For example, telemetry streams at different rates for regulating reserves (real-time or change state every six seconds) and dead band controlled separately by the EMS, through the Coordinator, and for each of the active grid elements, including but not limited to ALD/ASD, controller, etc.

IP-based systems are also bandwidth or network efficient. For example, IP devices are controlled via the 7-layer Open Systems Interconnection (OSI) model whereby the payload of each packet can contain a message or "change in state" or any other message required in the previous embodiments for purposes of stabilizing, statusing and the creation of Operating Reserves for an electric grid or microgrid and does not require synchronous communication. This method of transmission (for example "UDP" communications) allows for very minimum overhead and low data rates on a broadband network. IP Networks can also establish Transport Control Protocol/Internet Protocol (TCP/IP) messaging formats for transport of messaging. For proprietary 'mesh" networks whose bandwidth performance is very poor and an IP message may be encapsulated in a proprietary data packet that may or may not contain encryption, an efficient asynchronous communication method may be the only way to send out a plurality of messages and message type for command and control or status reporting. Additionally, IP devices can report many states that are important to an electric grid operator, market participant. These states supply compliance information necessary for the entity to receive command and control to insure the safe and reliable operation of the grid, but are also necessary for measurement, verification, telemetry, settlement and Power Supply Values (PSVs) to provide the information needed to comply with the grid operator's standards to deliver Operating Reserves or any Demand response products where the end results improve grid stability and will allow the consumer, utility, market participant, REP, CSP etc. to receive monetary compensation for supplying these products as contemplated in FERC Order 745. These commands, including "no power" for outage or for simple demand response compliance measured and verified at the device level, the meter level, the electrical bus level or a plurality of all the above. Furthermore these commands are aggregated and presented to the grid operator or utility so that "many" end points, or active grid elements, can be simultaneously operated as one resource and responsive to an EMS. For example, the active load client 300 may be implemented with a battery backup mechanism to provide backup or auxiliary power to the active load client 300 when AC power is lost. In this case, when battery backup is invoked, the active load client can report a "no power" condition. Alternatively, a "no power" condition may be assumed if an active load client fails to timely respond to a message (e.g., a poll or other message) from the ALD server, particularly where multiple active load clients in a geographic area fail to timely respond to the ALD server messaging or multiple UDP packets receive no acknowledgement. Because the geographic location of each customer premises and active load client may be known at the time of installation or thereafter (e.g., using GPS coordinates), such network outages may be located on a per meter basis, or per load consuming device basis.

A multiplicity of use cases for communications relating to the active grid elements is provided under the systems and methods of the present invention. Messaging under the present invention includes any and all commands, queries, etc. that relate to the profiles of the devices, "health" of the grid, status information, etc. Profiles automatically drive what is started, when, for controlled restart, rather than only controlled restart commanded by the utility; the present invention provides for either the profiles and/or the utility to communicate for command and control, in particular for providing for grid stability and/or supply resource information.

Further embodiment allows the ALD, ASD, and/or Coordinator server to provide prior to the loss of communication or power a set of profiles or commands to be executed at the active grid elements level such that they operate automatically and autonomously providing the operating reserves that the grid operator or utility desires, storing the measurement and verification information for transmittal later, or in the case of a power loss, very precise "restart" procedures such that the simultaneous impact of a power restoration from a grid operator does not have the adverse effect of overloading the generation and distribution system. These embodiments of a "controlled restart" may also apply to a Customer Profile where the most mission critical devices at a consumer location are prioritized, known to the utility via a Power Supply Value and other load characteristics such as power factor, voltage, current, reactive power or any other grid stabilizing metric that is reported historically by the active grid elements such that the grid operator or the customer can use these autonomous profiles, autonomous active grid elements and memory in same to create "microgrids" that autonomously operate independent of the macrogrid operator and provide grid stabilizing load resources to those consumers that are isolated via the microgrid where other supply sources that can power and operate the microgrid either under the operation of a computer controlled system and apparatus or a separate utility or microgrid operator exists and may operate autonomously until communication with a host ALD or Coordinator is reestablished.

One of the most beneficial advantages of an IP-based power management system, as provided in one embodiment of the present invention, is accurate reporting of the actual amount of power available for the creation of Operating Reserves via a distinct PSV value and associated with the active grid elements at the time the reserves are needed, a forecast of Power available via the customer profiles due to a plurality of methods that include known "expected" behavior of customer and load consuming devices, the baseline methods previously described, and the ability to allocate different types of operating reserves based upon the Grid Operator, CSP, MP, Utility, and equivalent's needs at the given condition of the grid as well as power saved by each customer on an individual basis. Embodiments of the present invention monitor and calculate precisely how many kilowatts (or carbon credits) are being generated or saved per each of the active grid elements instead of merely providing an estimate. These values are stored in a Power Supply Value (PSV) associated with the active grid elements, wherein the historical consumption, the real time consumption, the baseline consumption data as provided by standards supplied by the governing body (NAESBY, FERC, NERC) establish the PSV that is used for transmitting via the IP message the information necessary for grid stabilizing operating reserves. Furthermore, embodiments of the present invention provide means for tracking the actual amount of deferred load and pollutants according to generation mix, serving utility and geographic area, and tracking by active grid elements individual contributions. These deferred pollutants are recognized as "Renewable Energy Credits" as exemplified by the recently passed North Carolina Law known as Senate Bill 567, where these PSV derived "Negawatts" count towards a generating and distributing utilities obligations for supplying renewable energy as a percentage of their total generation mix. According to the present invention, if active grid elements have metrics and telemetry that confirm their corresponding curtailment or supply is measured, verified, settled within the parameters established, then utility can accept the supply (aggregated by active grid elements to provide at least one PTB) that would have been available in the case of curtailment event, then renewable energy credits are available to the active grid element(s) level, i.e., megawatts equal renewable energy credits on a per active grid element basis.

The present invention provides systems and methods for managing power supplied over an electric power grid by an electric utility and/or other market participants to multiple active grid elements, each of which having a Power Supply Value (PSV) associated with its energy consumption and/or reduction in consumption. Preferably, according the systems and methods of the present invention, generation of the PSV includes estimating and/or baselining. Furthermore, PSV applications for carbon credits may be geodetically dependent, measured, or computed based upon electricity consumed from a source for each of the active grid elements; for carbon credits, PSV is then based upon fossil fuel electricity eliminated through efficiency, reduction and baselining, provided that the PSV is measurable and verifiable.

The present invention systems, methods, and apparatus embodiments provide for any active grid element (i.e., any grid element following its registration initially with the system) to communicate, in IP format or any proprietary messaging, any message that improves, modifies, enhances, changes, and combinations thereof, the characteristics in memory, ASIC, metrology, location, security, status, change-in-state, and combinations thereof, including PSV, PTB, or other information about participation in activities in the grid, including grid stability enhancement, load curtailment, real-time energy management, supply availability, metrology tables, device assignment, and combinations thereof. More preferably, all messaging, including initial registration for grid elements prior to their activation and transformation into active grid elements, and any updates, are provided between the multiplicity of active grid elements and the Coordinator, and managed from and through the Coordinator for one-to-many communications with the EMS, grid operator, supervisory control and distribution control and automation, transmission control, or any active grid management system.

Power flow from supply sources, whether GSS or SSS, to the grid, and/or power flow through the grid to the power consuming devices is selectively introduced, enabled, reduced and disabled by one or more active grid elements controlled and/or managed by the Coordinator, and measured with PSV and PTB accuracies for each of the active grid elements that are able to be recognized by the governing bodies within revenue grade metrology such that the active grid element(s) becomes in essence a sub-meter with PSV values that can report over the IP connection, preferably through the Coordinator, a plurality of states for any active grid element or device, necessary for grid stability and control over each ALC/ASC via the ALD/ASD such that each distribution point on the grid may be stabilized at each point of the distribution or transmission system to effect grid stabilization holistically rather than reacting to conditions as they occur. Power control messages from a controlling server, preferably communicated through the Coordinator, indicate amounts of electric power to be reduced and/or Operating Reserves to be created, and/or supply to be introduced at predetermined attachment points or location, and an identification of at least one controllable device to be instructed to disable, reduce or consume more a flow of electric power to one or more associated power consuming devices depending on the type of Operating Reserves needed at the time of activation by the ALD through the IP connection to the associated ALC to create the desired Operating Reserve or grid stabilizing reserves. Notably, the power control commands include a power inquiry command requesting the server to determine an amount of electric power available (PSV) for temporary reduction or increase from supply or adding to supply (for example, Auto Reg up for regulating reserves/Reg Down) by a requesting electric utility, market participant or electric power grid operator(s) and wherein the command processor issues an associated power control event message responsive to the power inquiry command, the server further comprising: a database that stores current power usage information for the at least one electric utility or electric power grid operator(s), wherein the event manager (or Coordinator) accesses the utility database responsive to receipt of the associated power control event message and communicates a response to the power inquiry command indicating the amount of power available for temporary reduction based on the current power usage information and the corresponding Power Supply Value (PSV), estimated, derived or generated therefrom, for each of the active grid elements. This polling command also functions as an "alert" to provide the active grid elements via the ALC/ASC to report the PSV, PTB, state, reactive power, voltage, current, or any other grid stabilizing metric to the ALD/ASD such that the ALD/ASD can by electrical bus, by regional transmission organization, by Balancing Authority, by microgrid, by individual consumer or by individual transformer or any other system at any point on the distribution system of the grid or microgrid a plurality of information such that the ALD/ASD/Coordinator can prioritize the order, the type of curtailment, reduction in power or profile to effect to stabilize the grid or microgrid or to supply the utility, REP, market participant, CSP or other an instantaneous and accurate snapshot of the available resource for dispatch and to prepare the active grid elements to look for a priority message delivered via an IP flag or specially formatted message so that the message combined with the Alert has the grid stabilizing effect. Thus, the present invention systems and methods provide for creation of the grid stability product and/or operating reserve; messaging is used for status, grid "health", down to active grid elements level.

In preferred embodiments of the present invention, operating reserve messages are prioritized over network, including over other traffic on the network. Furthermore, priority messaging is further includes so that on standards-based or proprietary communications networks that have sufficient speed, measurement (PSV) and are responsive to an EMS and/or Coordinator that have network priority over other packets, such that emergency and/or critical infrastructure protection power management commands receive priority over any other power control commands, to transmit those messages over other non-critical traffic.

In one embodiment of the present invention, a system for managing power on an electric power grid that is constructed and configured for supplying and receiving power from a multiplicity of sources, where the power flows to a plurality of active grid elements or is generated by a plurality of active grid elements, including power generation and storage solutions, that are enabled and disabled by a plurality of active grid elements including controllable devices, wherein the system includes: a server comprising a command processor operable to receive or initiate power commands and issue power event messages responsive thereto, at least one of the power commands requiring a reduction or increase in an amount of electric power consumed by the plurality of active grid elements functioning as power consuming devices or introduction or availability for introduction of distributed power supply by active grid elements including GSS or SSS; an event manager operable to receive the power control event messages, maintain at least one power management status relating to each client device and issue power control event instructions responsive to the power control event messages that may be initiated from a market participant, a utility, or an electric grid operator; a database for storing, information relating to power consumed by the plurality of power consuming devices and based upon the amount of power to be reduced to each of the power consuming devices or power supply source (GSS or SSS), generating at least one power supply value (PSV) or change in PSV associated with each active grid element, including transmission line losses in proximity associated with the location or attachment or service point of the active grid element; and a client device manager operably coupled to the event manager and the database, the client device manager selecting from the database, based on the information stored in the database, at least one client device to which to issue a power control message indicating at least one of an amount of electric power to be reduced or increased or introduced by distributed supply source, and/or identification of at least one controllable device to be instructed to disable a flow of electric power to one or more associated active grid elements functioning as power consuming devices responsive to receipt of a power control event instruction requiring a reduction in a specified amount of electric power; the plurality of controllable device and corresponding device interfaces facilitating communication of power control instructions to the controllable devices, the power control instructions causing the at least one controllable device to selectively enable and disable a flow of power to the power consuming device(s); and a device control manager operably coupled to the controllable device interfaces for issuing a power control instruction to the controllable devices through the controllable device interfaces, responsive to the received power control message, the power control instruction causing the controllable device(s) to disable a flow of electric power to at least one associated power consuming device for reducing consumed power, and based upon the reduction in consumed power, generating another (at least a second) power supply value (PSV) corresponding to the reduction in consumed power or power supplied or available for supply.

This embodiment may further include a combination of a processor, database, event manager, preferences manager and market conditions to include price of electric power, grid stabilization events and location of customer relative to the grid operator's generation, transmission, and distribution elements would effect a change on the electric grid by a change in the power consuming devices utilizes some or all of the information provided by the grid operator, market participant, or utility to automatically or manually through a plurality of communications methods (smart phone, tablet computer, computer, text response, phone message) elect to curtail or consume power to effect a change to the normal operation of a plurality of active grid elements in exchange for credits, economic/monetary incentives, rewards programs, or carbon/green credits. This provides that active grid elements receives a real time or near real time signal from a grid operator that alerts them to an economic event that would allow them to make substantial compensation for curtailing or accepting power at that minimum time interval for both reporting and responding as established by the governing entity. This is real-time pricing for grid stress/stabilization or very high commodity pricing.

Preferably, market pricing conditions via a customer profile that can be loaded to a smart phone, tablet, or any web-enabled appliance for accepting or modifying a profile or moreover a profile that automated controls based upon previously selected economic messages.

One embodiment of the present invention active grid elements and their registration is applied to controlling power distribution for a variety of electric utility companies, market participant (MP) or any other electric power grid operator(s) by actively monitoring the amount of power needed by each MP and supplying the required power by redirecting power from participating customers. In this embodiment, customers agree to allow the power management system to disable certain power-consuming devices during peak loading times of the day. In one example for active grid elements, smart breakers, load control switches (submetering ALCs) or any other device that can be interfaced or added within an electric consuming device or added at the point where the electric consuming devices receives power from a wall socket or any other electrical connection which have the ability to be switched on or off remotely, are installed for specific devices in an electric service control panel accessed by a known IP address following the initial registration of the grid elements. Alternatively, IP-addressable smart appliances may be used. The power management system determines the amount of steady-state power each device consumes when turned on and logs the information in a database for each subscriber. For example, a current sensor on each smart appliance or within each smart breaker or power measurement circuit that is incorporated in the device that serves as a de-facto ALC with metrology sufficient to be accepted as a PSV for aggregation to the ALD for the creation of Operating Reserves may measure the amount of current consumed by each monitored device. An active load client then multiplies the amount of current consumed by the operating voltage of the device to obtain the power consumption, and transmits the power consumption to the ALD server. When the serving utility needs more power than it is currently able to supply, the power load management system automatically adjusts the power distribution by turning off or reducing specific loads on an individual device or subscriber basis. Because the amount of power consumed by each specific load is known via the PSV and aggregated via the PTB, the system can determine precisely which loads to turn off or reduce and tracks the power savings generated by each customer as a result of this short-term outage.

Furthermore, based upon the reduction in consumed power, the systems and methods of the present invention provide for generating at the control center a power supply value (PSV) corresponding to the reduction in consumed power by the power consuming device(s). Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any device or controller that measures power within the standard as supplied by the regulatory body(ies) that govern the regulation of the grid. PSV variations may depend on operating tolerances, operating standard for accuracy of the measurement. PSV further includes forecasting, statistical sampling, baselining, and combinations thereof. The PSV enables transformation of curtailment or reduction in power at the device level by any system that sends or receives an IP message to be related to or equated to supply as presented to the governing entity that accepts these values and award supply equivalence, for example of a power generating entity or an entity allowed to control power consuming devices as permitted by the governing body of the electric power grid, e.g., FERC, NERC, etc.

PSV may be provided in units of capacity, demand, electrical power flow, time, monetary equivalent, energy and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Figure 12:
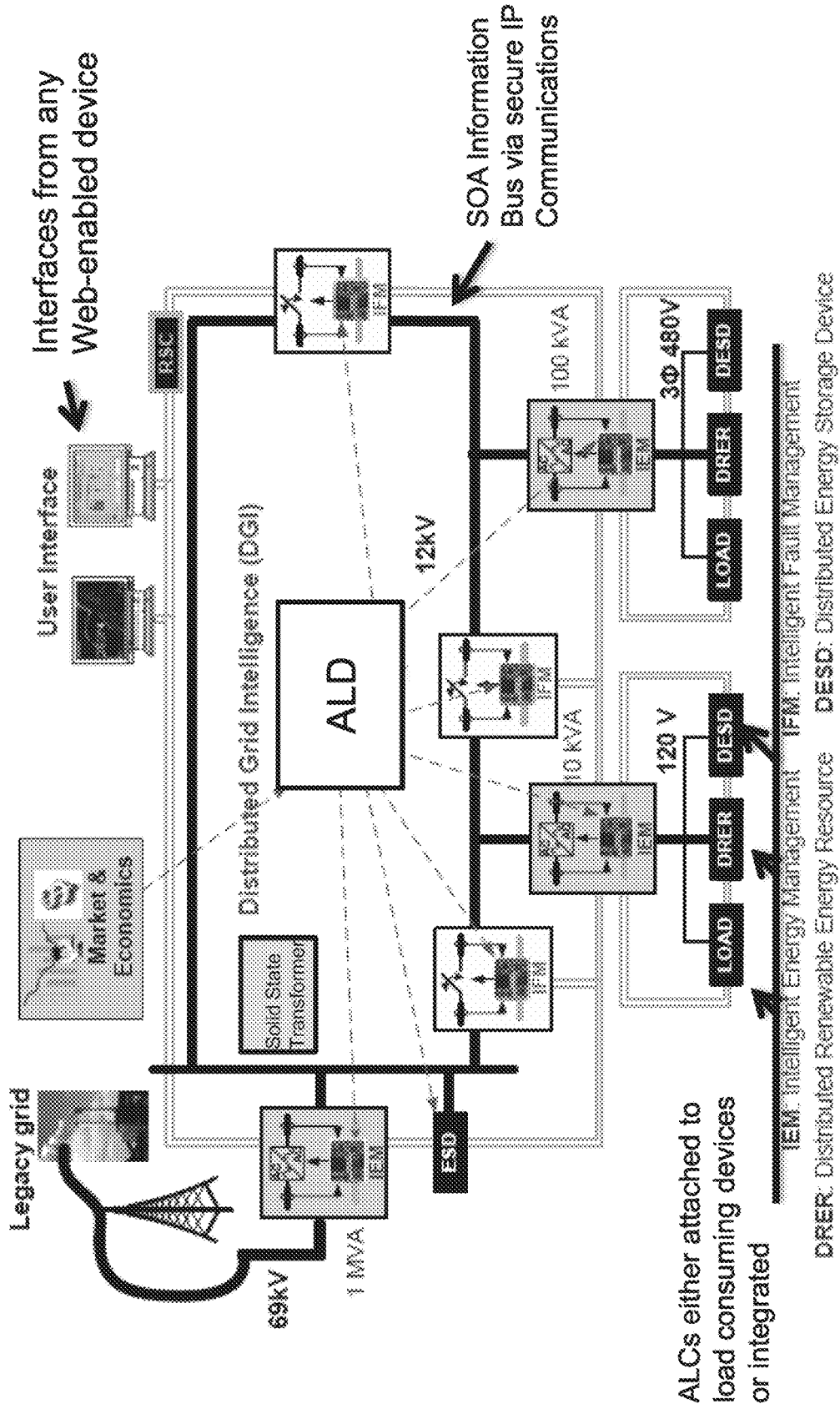
FIG. 12 is a schematic diagram illustrating components including ALD, ALC, and IP communications for distributed grid intelligence within systems of the present invention.

FIG. 12 provides a schematic diagram illustrating active grid elements including ALD, ALC, and IP communications for distributed grid intelligence within systems of the present invention.

Figure 13:
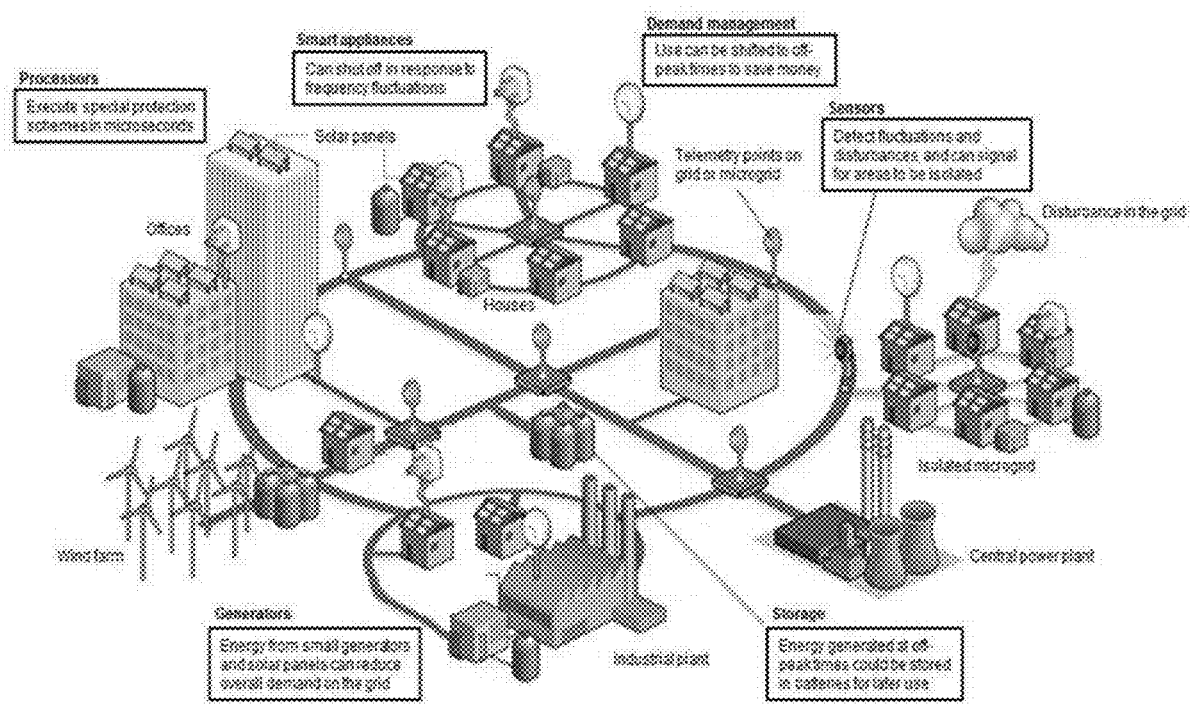
FIG. 13 is a schematic diagram that illustrates smart grid with decentralized networks according to systems and methods of the present invention.
Figure 14:
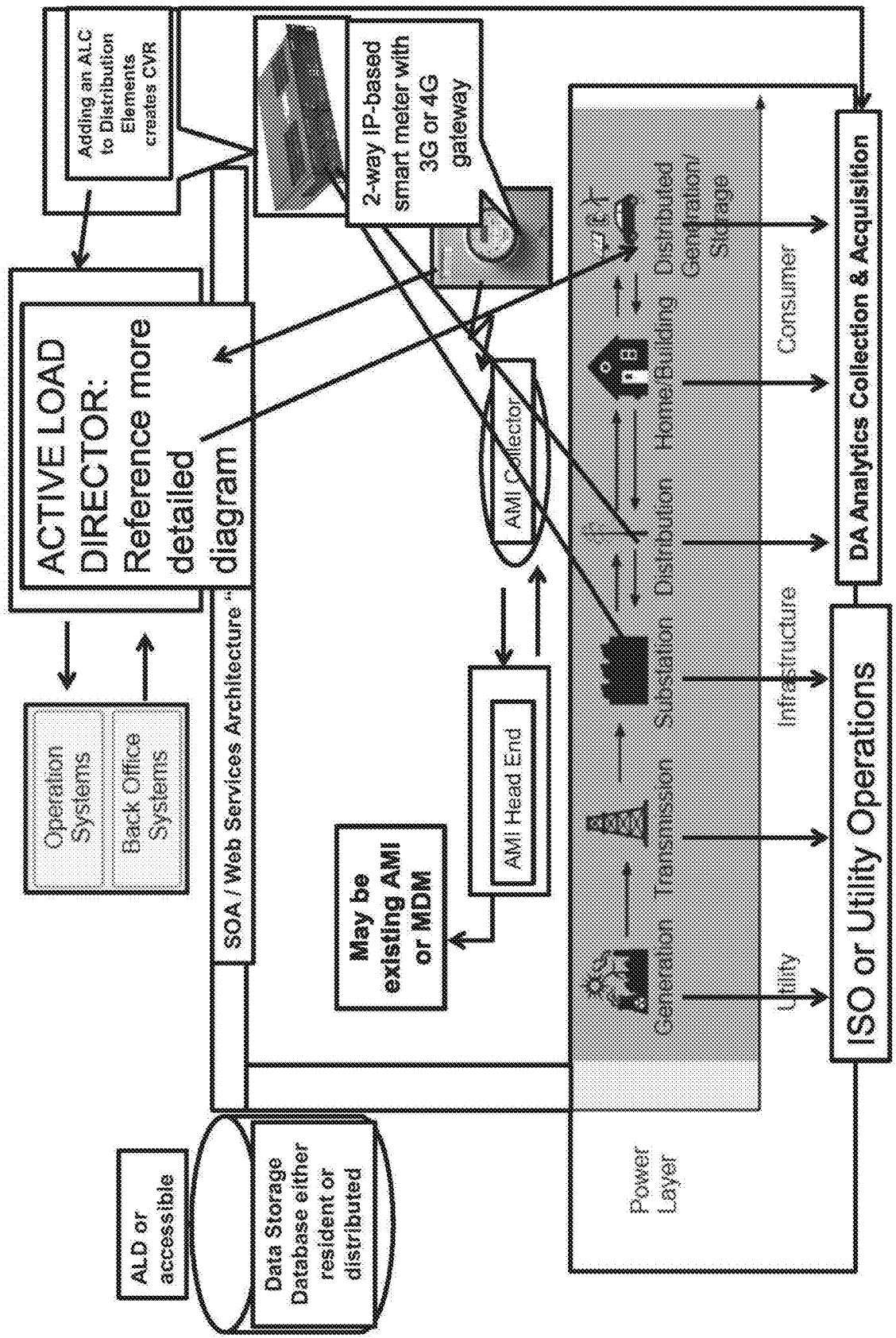
FIG. 14 is another schematic diagram that illustrates smart grid with decentralized networks according to systems and methods of the present invention.
Figure 15:
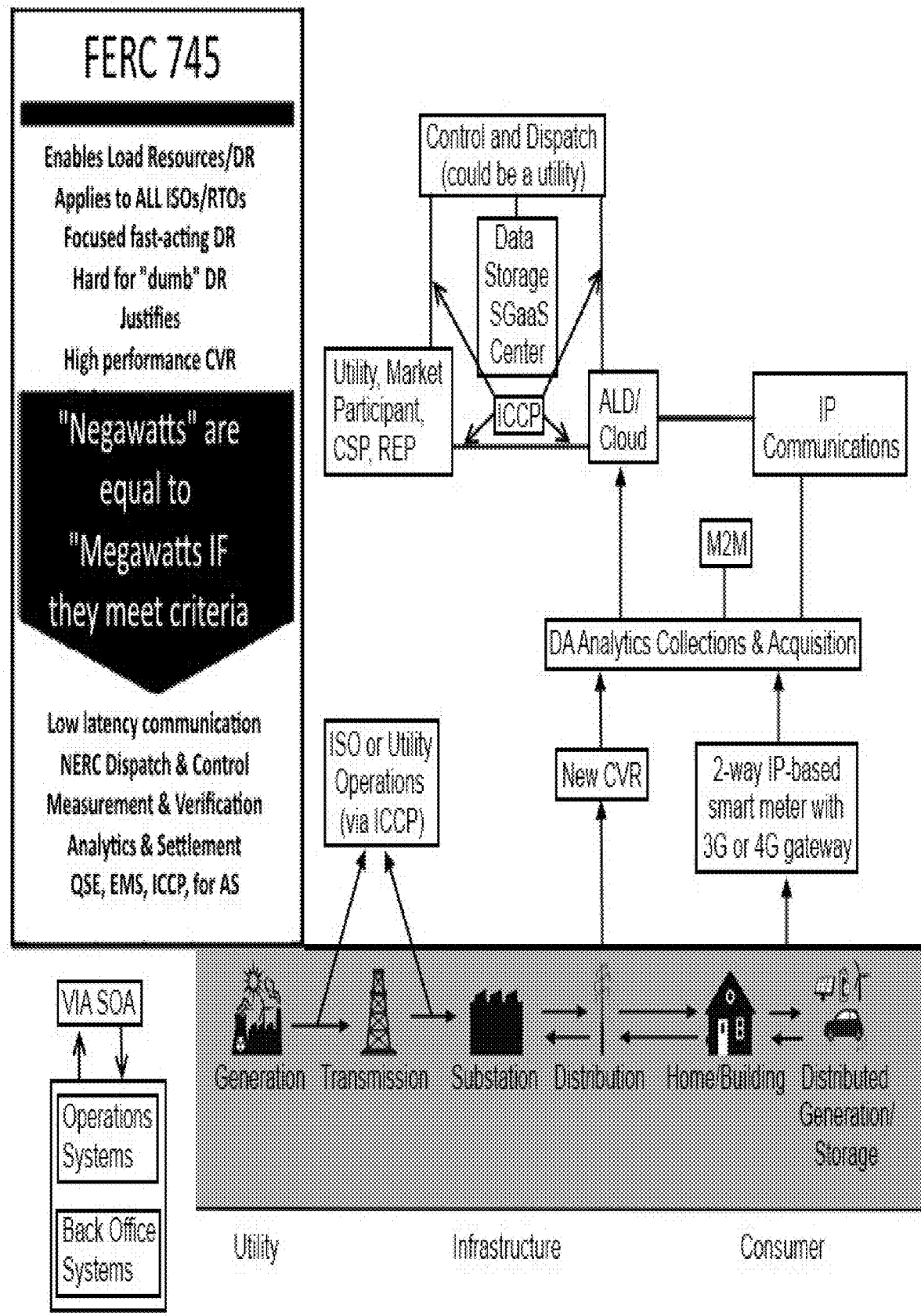
FIG. 15 is yet another schematic diagram that illustrates smart grid with decentralized networks according to systems and methods of the present invention.

Smart grid configurations including active grid elements are preferred under systems and methods of the present invention. By way of example, consider embodiments in FIGS. 13-15, which provide schematic diagrams that illustrate active grid elements within smart grid with decentralized networks according to systems and methods of the present invention.

Figure 16:
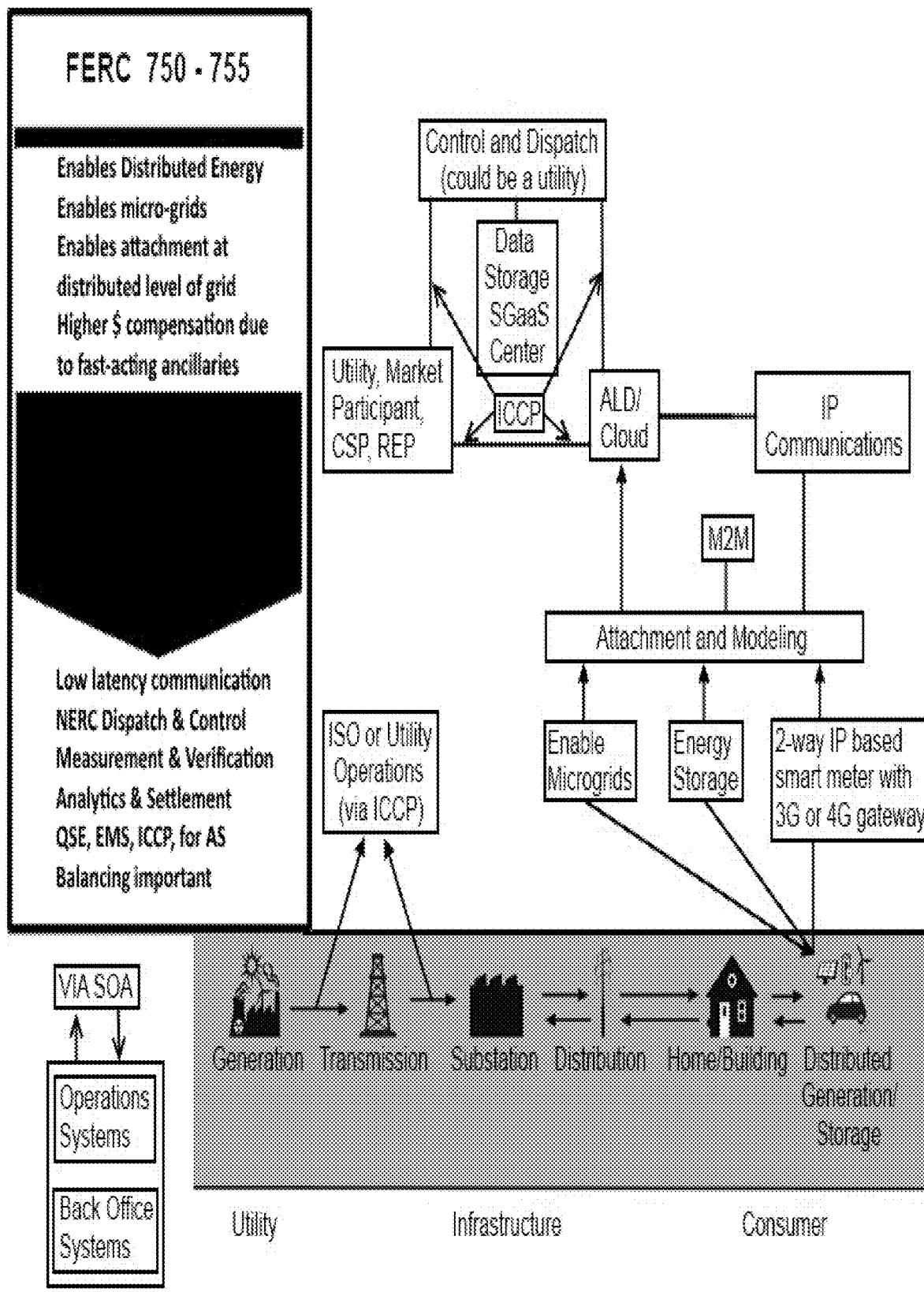
FIG. 16 shows a schematic diagram for supply from utility, market participant, CSP, and/or REP, ALD/cloud layer, ICCP, control and dispatch, and micro-grid enablement according to systems and methods of the present invention.

FIG. 16 shows a schematic diagram for supply from utility, market participant, CSP, and/or REP, ALD/cloud layer, ICCP, control and dispatch, and micro-grid enablement according to systems and methods of the present invention.

Figure 17:
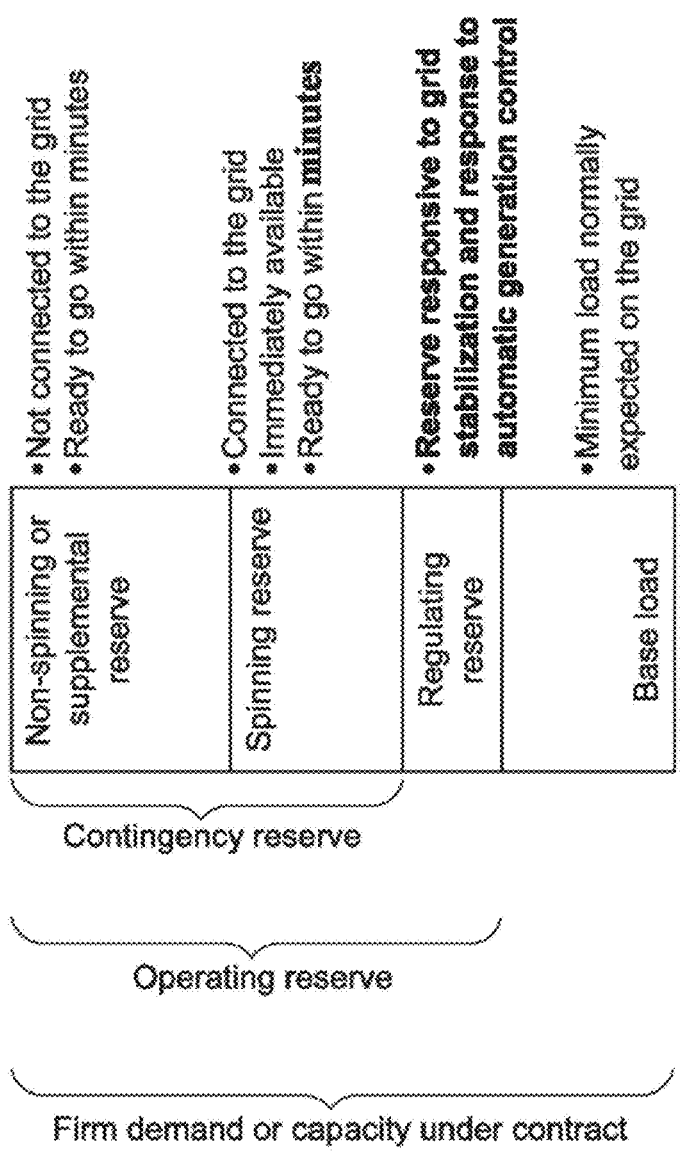
FIG. 17 is a graphic illustration of operating reserves categories and base load.
Figure 18:
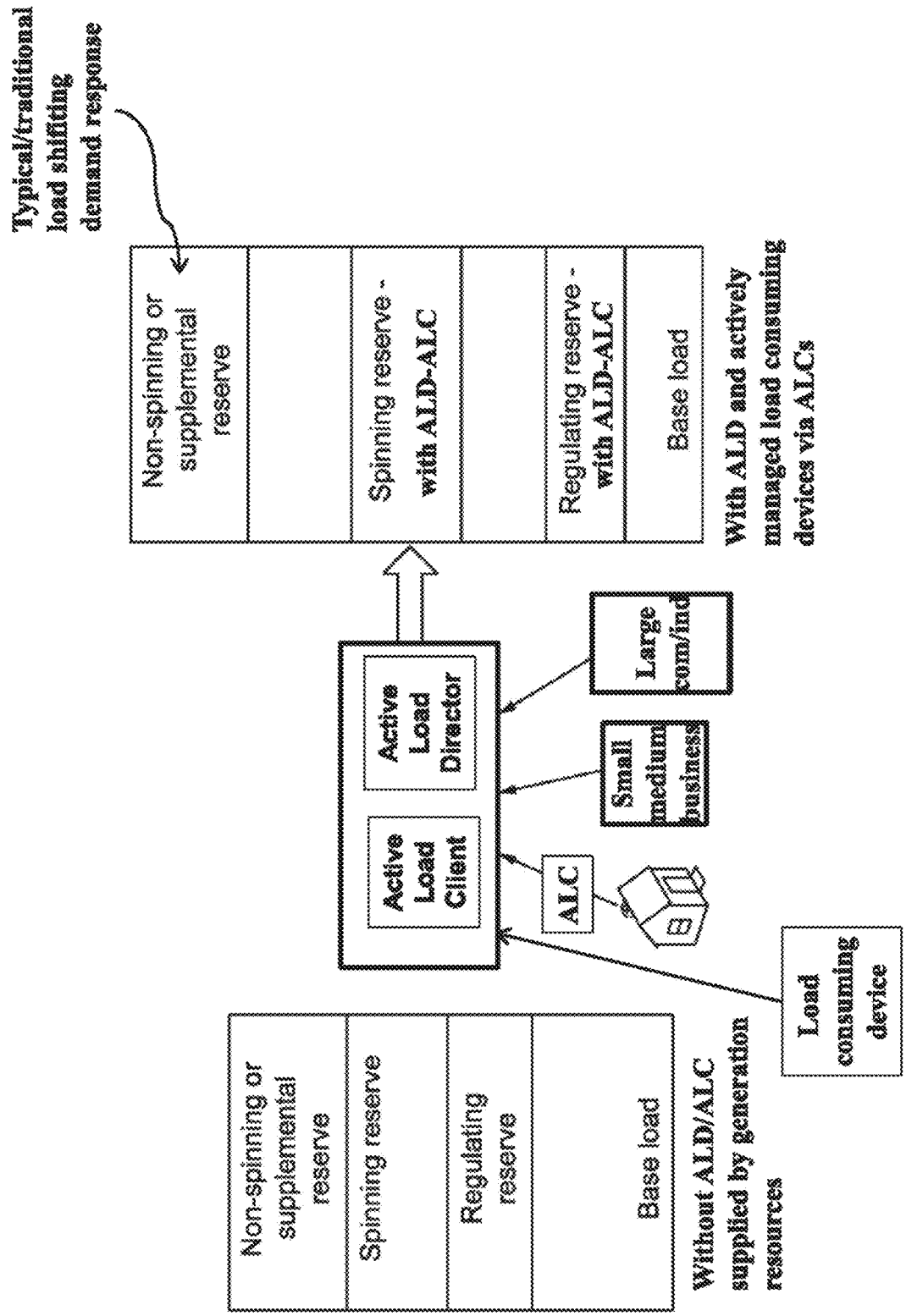
FIG. 18 is a schematic diagram representing operating reserves for supply side generation of electric power for a grid, active load director (ALD), active load client (ALC), power consuming devices, and other components of the systems and methods of the present invention for generating operating reserves of different categories.

As set forth hereinabove, the present invention provides systems and methods for generating operating reserves for an electric power grid. Correspondingly, FIG. 17 provides a graphic illustration of operating reserves categories and base load; FIG. 18 is a schematic diagram representing operating reserves for supply side generation of electric power for a grid, active grid elements, including ALD, ALC, power consuming devices, and other components of the systems and methods of the present invention for generating operating reserves of different categories.

Figure 19:
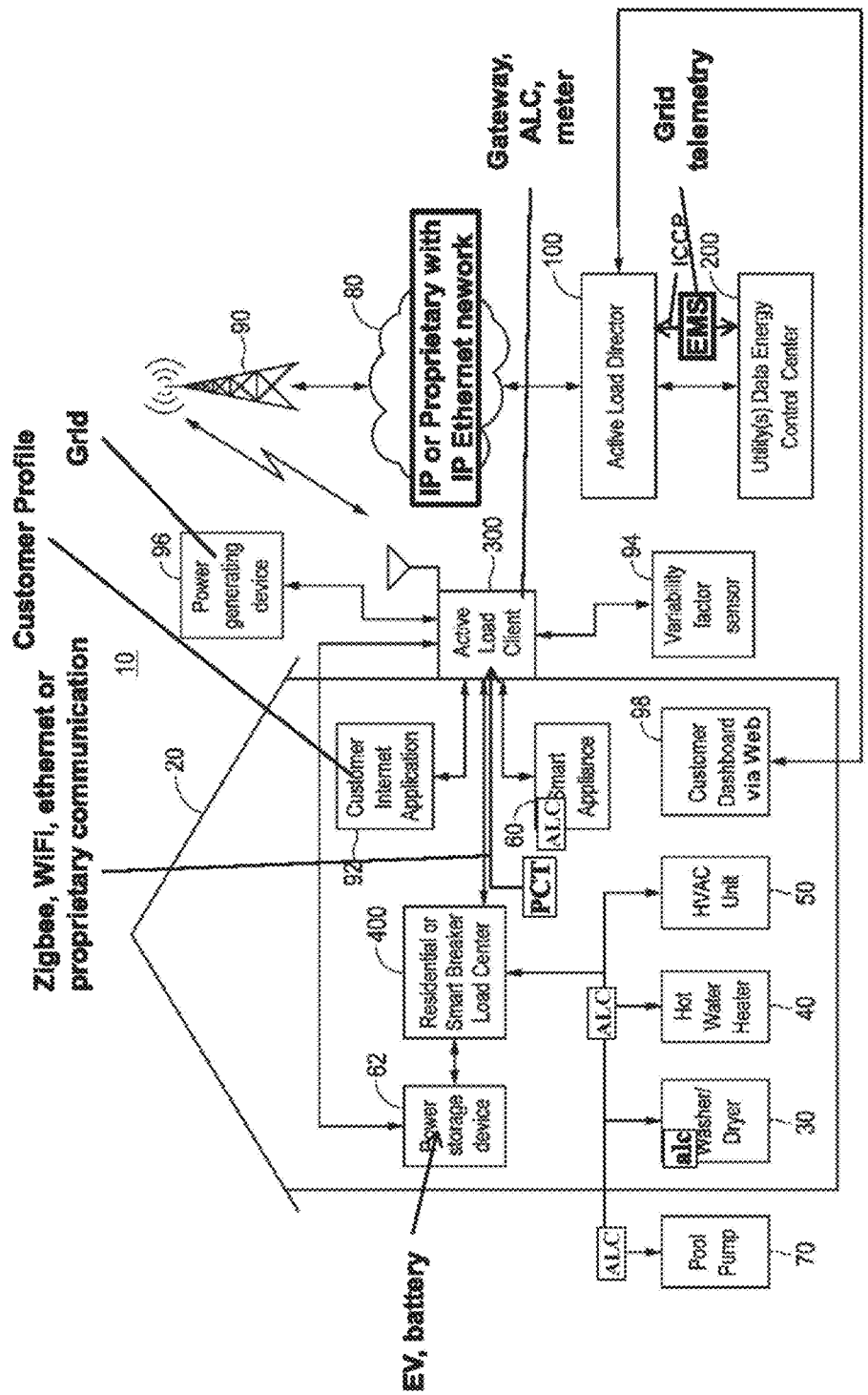
FIG. 19 is a schematic diagram showing one embodiment of the present invention including power consuming devices, control devices, ALC, ALD, customer profile, IP communication network, and grid telemetry components of systems and methods of the present invention.

FIG. 19 is a schematic diagram showing one embodiment of the present invention with active grid elements, including power consuming devices, control devices, ALC, ALD, customer profile, IP communication network, and grid telemetry components of systems and methods of the present invention.

Figure 20:
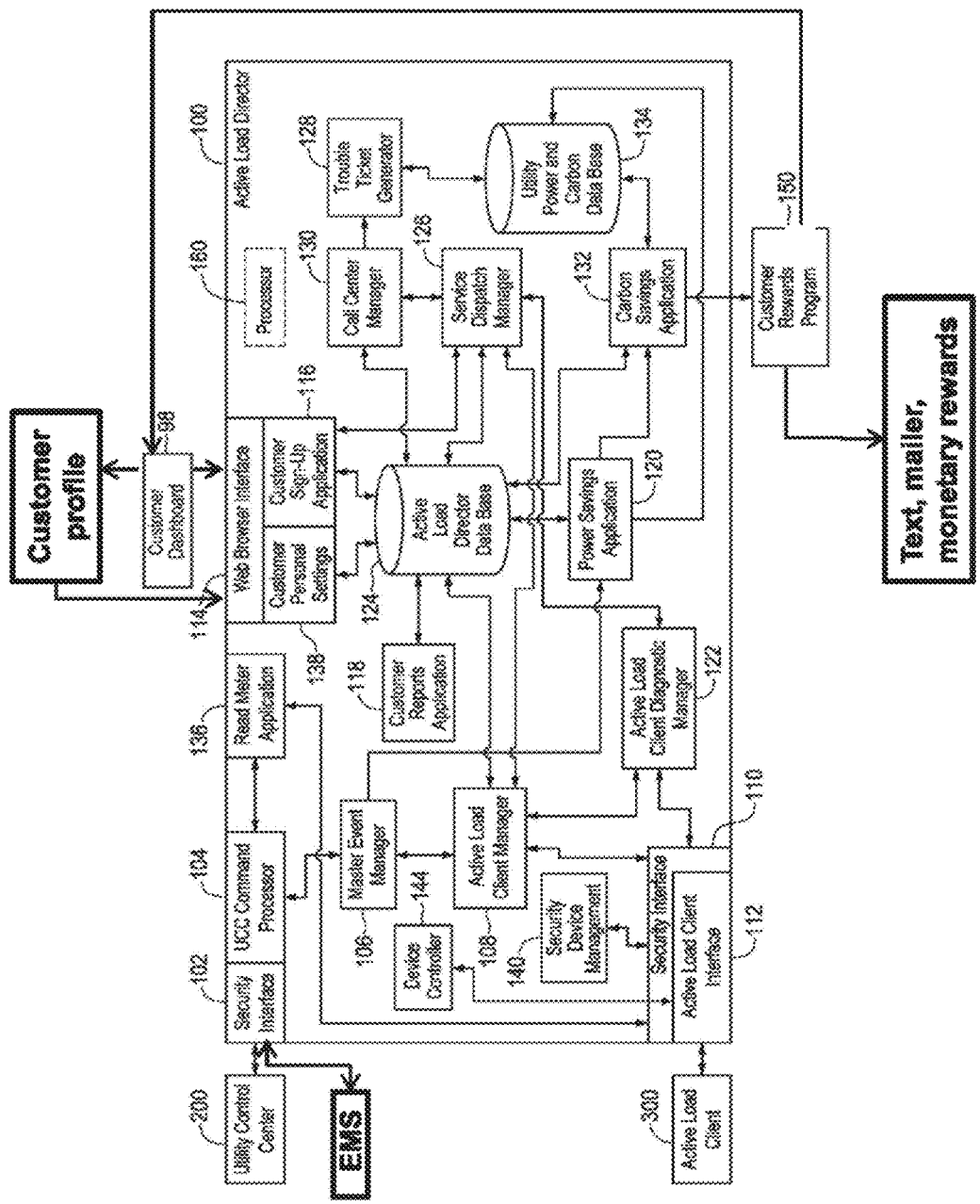
FIG. 20 is a schematic diagram showing one embodiment of the present invention including energy management system (EMS), power consuming devices, control devices, ALC, ALD, customer profile, IP communication network, and grid telemetry components of systems and methods of the present invention.
Figure 21:
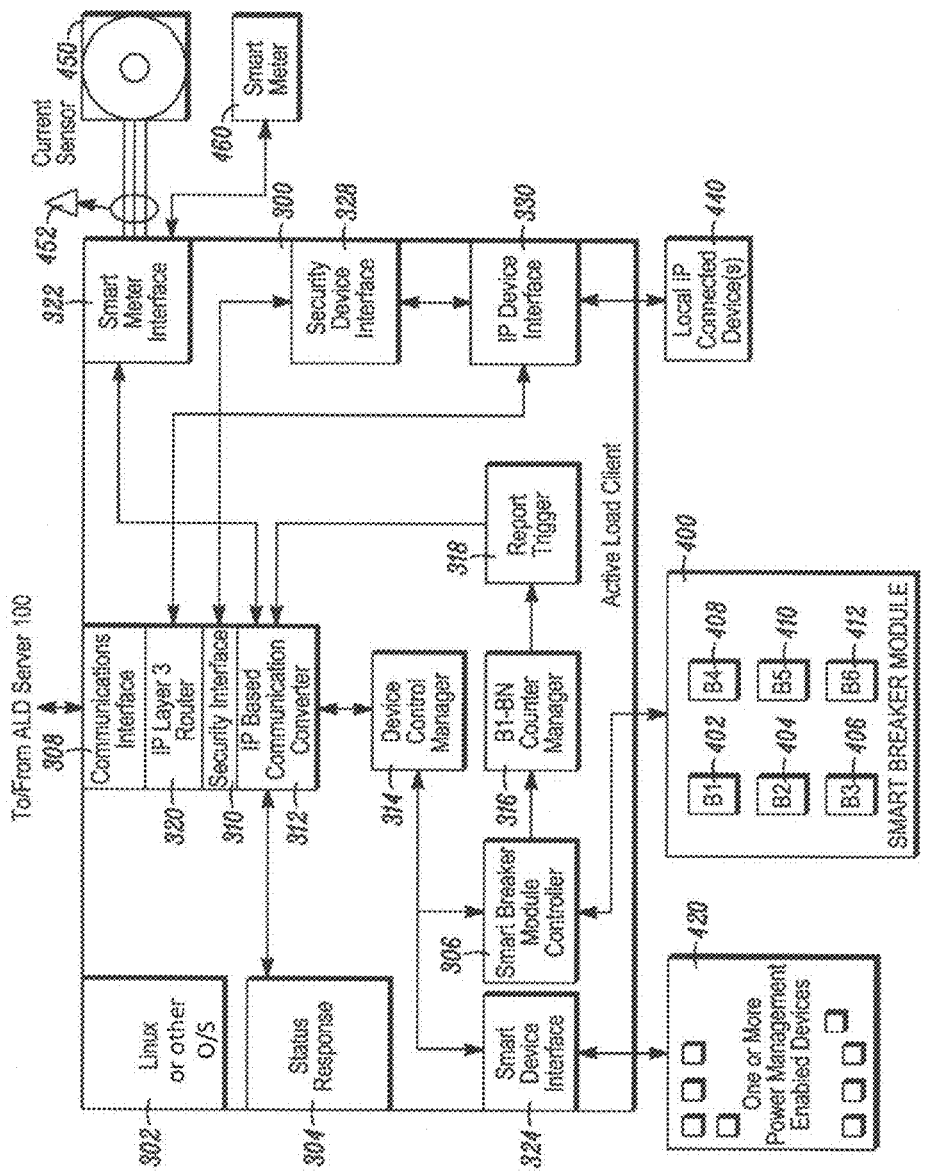
FIG. 21 is a schematic diagram showing one embodiment of the present invention including EMS, power consuming devices, control devices, ALC, ALD, customer profile, IP communication network, and grid telemetry components of systems and methods of the present invention.

FIG. 20 is a schematic diagram showing one embodiment of the present invention with active grid elements including EMS, power consuming devices, control devices, ALC, ALD, customer profile, IP communication network, and grid telemetry components of systems and methods of the present invention. In another illustration, FIG. 21 shows a schematic diagram for one embodiment of the present invention with active grid elements including EMS, power consuming devices, control devices, ALC, ALD, customer profile, IP communication network, and grid telemetry components of systems and methods of the present invention.

Figure 23:
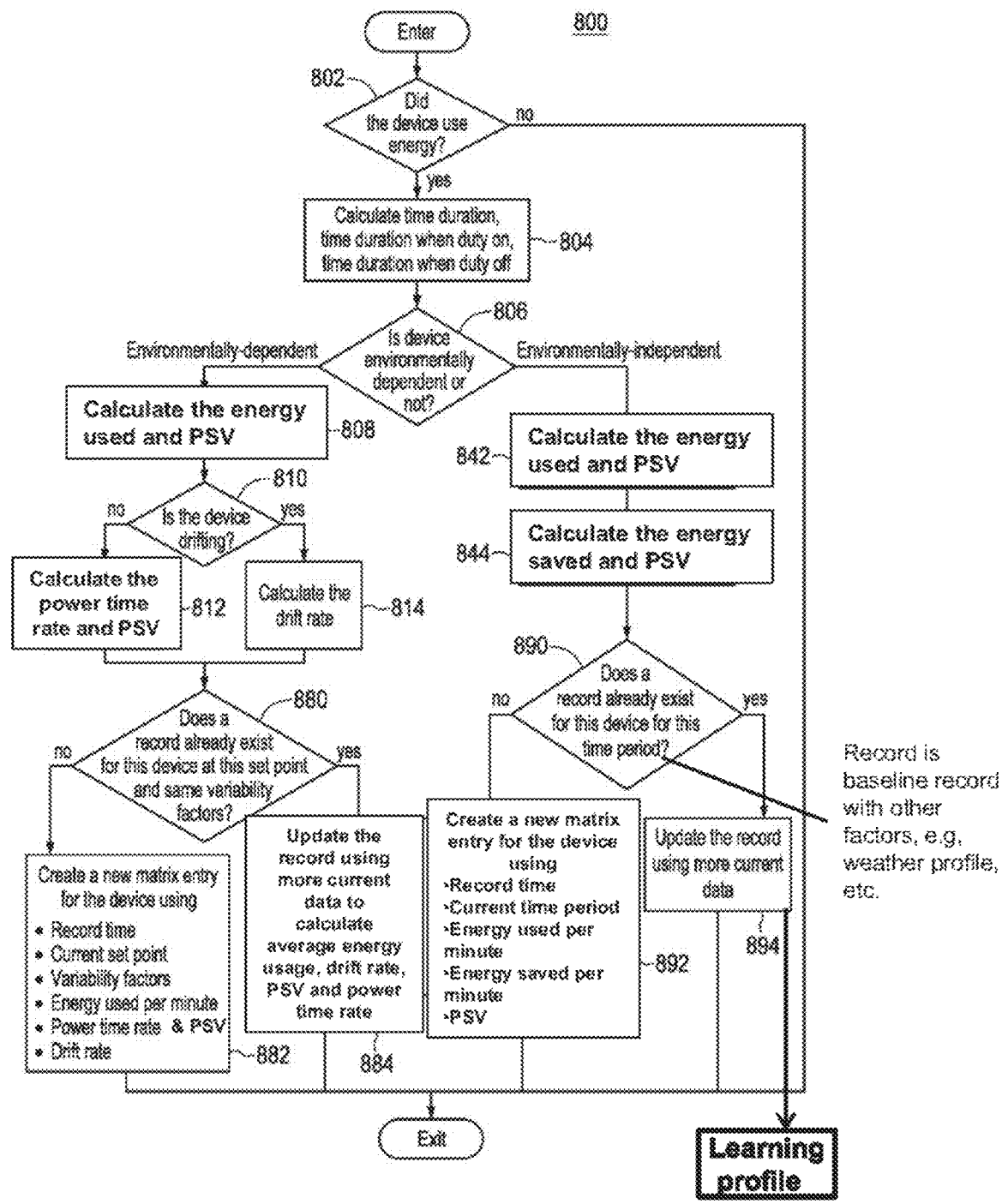
FIG. 23 is a flow diagram illustrating method steps for energy consuming devices and the generation of power supply value (PSV) according to embodiments of the present invention, including learning profile.
Figure 24:
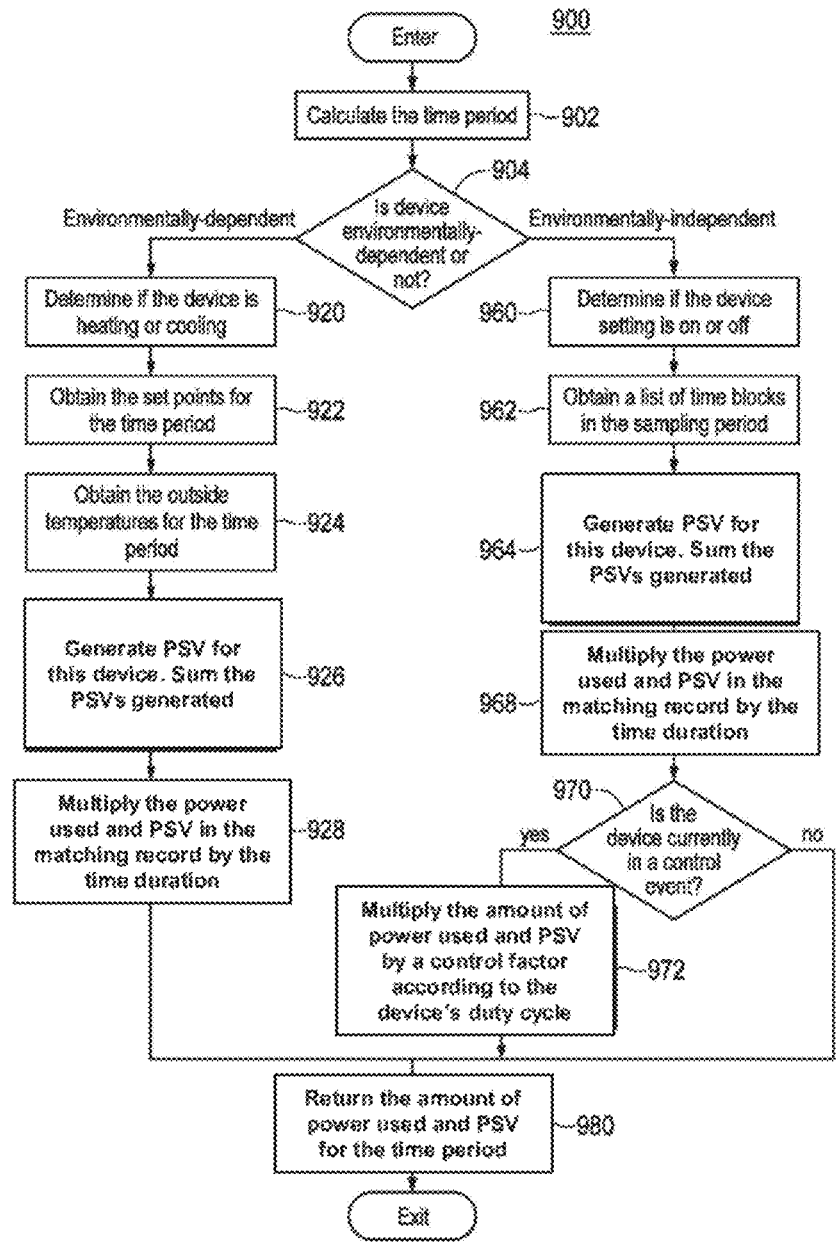
FIG. 24 is a flow diagram for methods of the present invention for calculating the time period for environmentally dependent and independent devices and determining or generating power supply value (PSV) for those power-consuming devices.

FIG. 22 is a table of consumer-adjustable parameters as examples for systems and methods components according to the present invention. FIG. 23 is a flow diagram illustrating method steps for energy-consuming devices and the generation of power supply value (PSV) for those devices, according to embodiments of the present invention, including learning profile. Furthermore, FIG. 24 shows a flow diagram for methods of the present invention for calculating the time period for environmentally dependent and independent devices and determining or generating power supply value (PSV) for those power-consuming devices.

Figure 25:
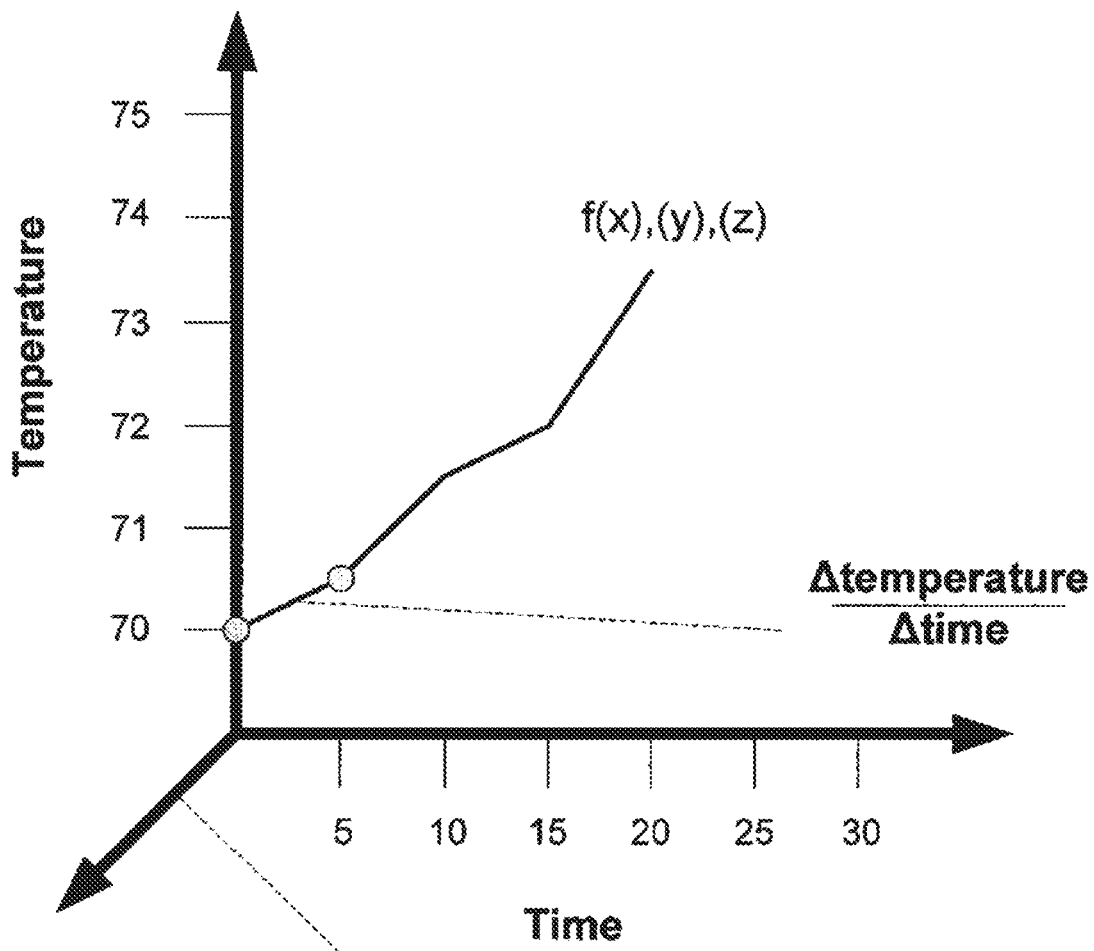
FIG. 25 is a graph showing at least three (3) dimensions for factors associated with load consumption and devices managing temperature control for corresponding power consuming devices, including the change in factors over time.
Figure 26:
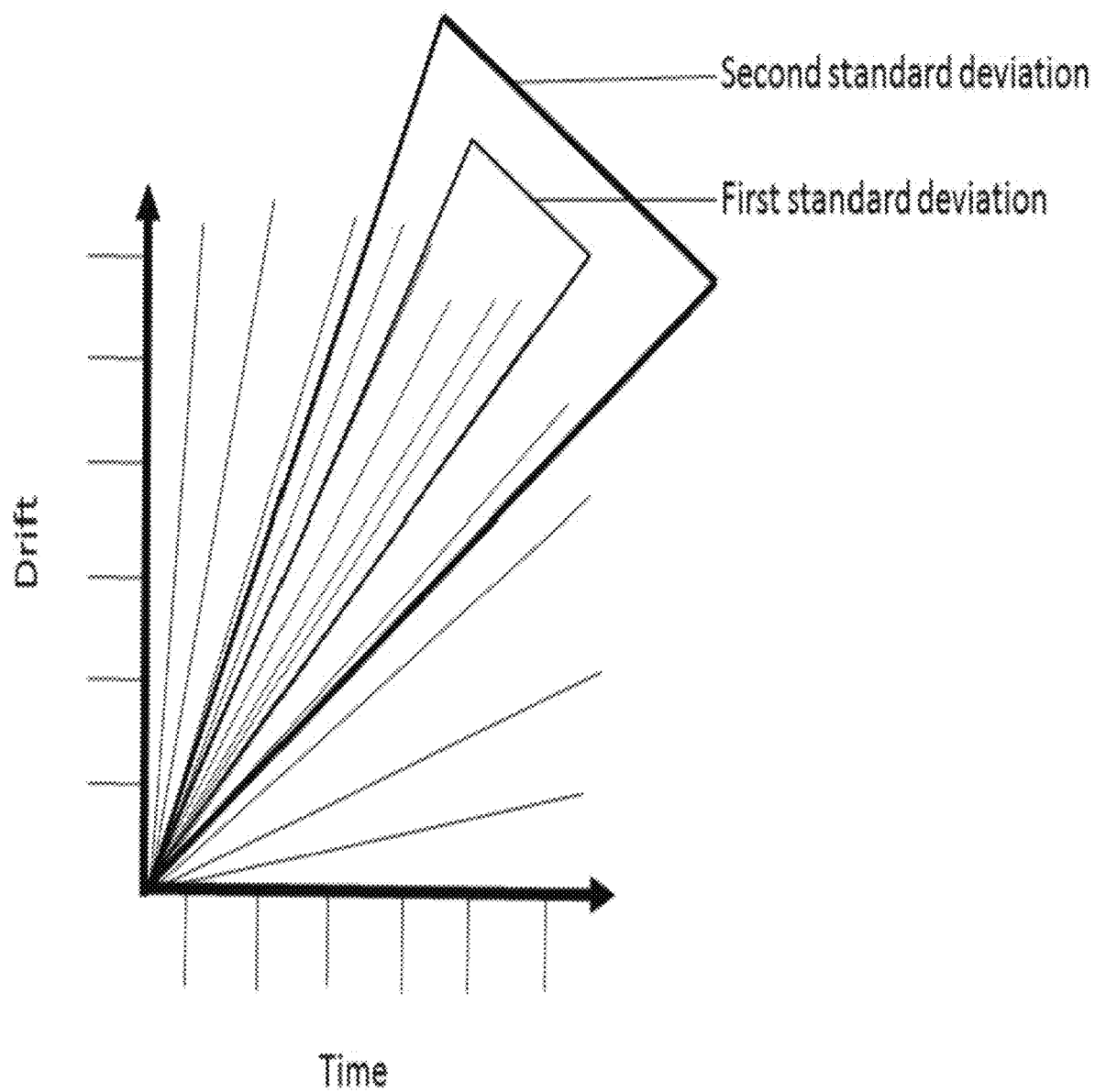
FIG. 26 is a graph showing first, second, and additional standard deviations of for the chart of drift versus time, for use with the systems and methods of the present invention.

By way of example, for active grid elements that function for temperature or environmental-factor controlling devices as power consuming devices, FIG. 25 provides a graph showing at least three (3) dimensions for factors associated with load consumption and devices managing temperature control for corresponding power consuming devices, including the change in factors over time. FIG. 26 is a graph showing first, second, and additional standard deviations of for the chart of drift versus time, for use with the systems and methods of the present invention. When active grid elements, including the coordinator and/or ALD is automatically considering load curtailment, preferably a search algorithm provides the most load against the least amount of consumers impacted. Based upon the thermal drift of structures, additional structures are identified and selected, to provide required curtailment for grid stability. Each structure has its own factors, as illustrated in FIG. 25. Thus, the ALD selects and provides instructions to the ALCs and/or power consuming devices based upon profiles and attributes. Alternatively, least-cost algorithms may be used by the coordinator for determining communications routing and energy routing through the active grid elements registered and updated within the systems and methods of the present invention.

Preferably, the system stores in memory on the server computer associated with the database for storing information relating to the energy management system and its various active grid elements, as described in the specification, e.g., identification of the last power consuming device(s) used for satisfying a load curtailment event, and automatically shifts their categorization for the ALD for purposes of selection for the next curtailment event.

Figure 27:
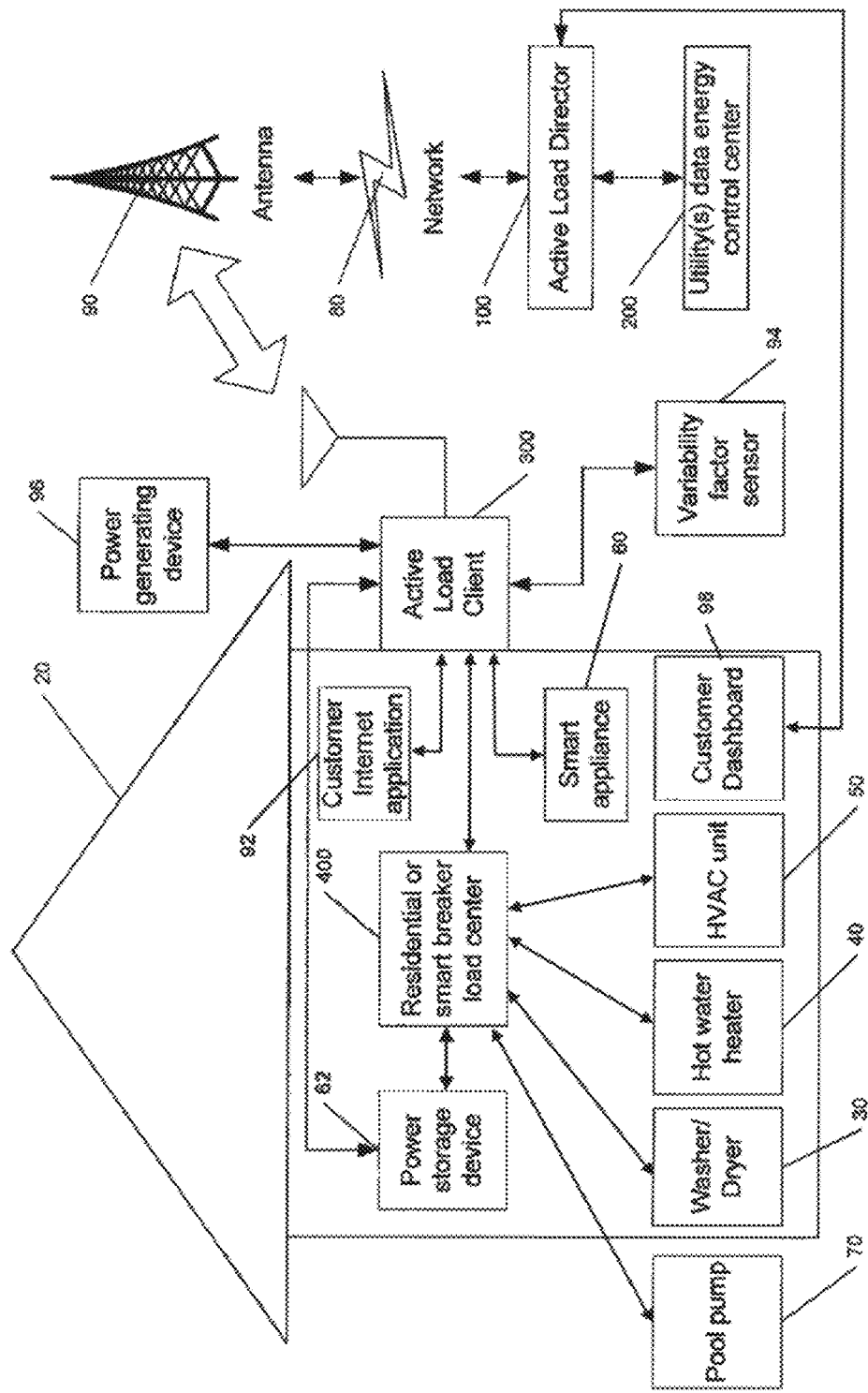
FIG. 27 is a schematic diagram illustrating exemplary IP-based active power management system in accordance with one embodiment of the present invention.

FIG. 27 depicts an exemplary IP-based active power management system 10 in accordance with one embodiment of the present invention. The exemplary power management system 10 monitors and manages power distribution to a multiplicity of active grid elements via a coordinator and/or an active load director (ALD) server 100 connected between one or more utility control centers (UCCs) 200 (one shown) and one or more active load clients (ALCs) 300 (one shown). The ALD server 100 may communicate with the utility control center 200 and each active load client 300 either directly or through a network 80 using the Internet Protocol (IP) or any other connection-based protocols. For example, the ALD server 100 may communicate using RF systems operating via one or more base stations 90 (one shown) using one or more wireless communication protocols, such as Global System for Mobile communications (GSM), Enhanced Data GSM Environment (EDGE), High Speed Packet Access (HSDPA), Time Division Multiple Access (TDMA), or Code Division Multiple Access data standards, including CDMA 2000, CDMA Revision A, and CDMA Revision B. Alternatively, or additionally, the ALD server 100 may communicate via a digital subscriber line (DSL) capable connection, cable television based IP capable connection, or any combination thereof. In the exemplary embodiment shown, the ALD server 100 communicates with one or more active load clients (ALCs) 300 using a combination of traditional IP-based communication (e.g., over a trunked line) to a base station 90 and a wireless channel implementing the WiMAX protocol for the "last mile" from the base station 90 to the active load client 300.

Each active grid element 300 is accessible through a specified address (e.g., IP address), and for the case of ALCs, each one controls and monitors the state of other active grid elements associated with them, for example, individual smart breaker modules or intelligent appliances 60 installed in the business or residence 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive), and vice versa, responsive to signaling from the ALC 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance and may be embedded in circuits or individual appliances or appliance controls or appliance control devices, whether internal to the device housing, or external thereto (e.g., a washer/dryer 30, a hot water heater 40, an HVAC unit 50, or a pool pump 70).

Additionally, the ALC 300 may control other active grid elements, e.g., individual smart appliances, directly (e.g., without communicating with the residential load center 300) via one or more of a variety of known communication protocols (e.g., IP, Broadband over PowerLine (BPL) in its various forms, including through specifications promulgated or being developed by the HOMEPLUG Powerline Alliance and the IEEE, Ethernet, Bluetooth, ZigBee, Wi-Fi, WiMAX, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off). All of these various active grid elements are automatically managed and provide for automatic messaging with the Coordinator and/or other active grid elements with which they are associated, as described herein.

There are several types of messages that the active grid elements (for example, an ALC manager 108) may receive from a coordinator and process accordingly. By way of example and not limitation, a security alert message, a priority message, a report trigger message, a status response message, a status update message, a power savings message, and combinations thereof. A security alert message originates from an optional security or safety monitoring system installed in the residence or business and coupled to the active grid element(s) (e.g., wirelessly or via a wired connection). When a security alert message is received by the Coordinator, it accesses the database to obtain routing information for determining where to send the alert, and then sends the alert as directed to those active grid elements affected or associated with the alert messaging. For example, the Coordinator may be programmed to send the alert or another message (e.g., IP-based message, an electronic mail message, a pre-recorded voice message, and combinations thereof) to a security monitoring service company and/or the owner of the residence or business.

A report trigger message alerts the Coordinator that a predetermined amount of power, PSV, PTB, and combinations thereof has been consumed by a specific device monitored by an active grid element. When a report trigger message is received from the active grid element(s), the Coordinator logs the information contained in the message in the database for the active grid element(s) associated with the information supplied. The power consumption information, including PSV, PTB, and combinations thereof, is then used by the Coordinator to determine the active grid elements (ALDs/ALCs) to which to send a power reduction or "Cut" or reduce message during a power reduction event to satisfy the operating reserve requirement.

A status response message reports the type and status of each active grid element in communication with the Coordinator. When a status response message is received from an active grid element, the Coordinator automatically logs the information contained in the message in the database.

In another embodiment, a power savings message and/or application may be optionally included to calculate the total amount of power saved by each utility or market participant during a power reduction event (referred to herein as a "Cut event" or "reduce event"), as well as the amount of power saved, PSV, PTB, and combinations for each active grid element that reduced the amount of power delivered, PSV, PTB, and combinations thereof, and matched against a baseline associated with that active grid element. The power savings application 120 accesses the data stored in the database 124 for each customer serviced by a particular utility and stores the total cumulative power savings, or PSV (e.g., in megawatts per hour, or kWH/MWH) aggregated by participating active grid elements and/or accumulated by each utility for each Cut or reduce event, i.e., curtailment or load control event, in which the active grid elements and/or utility participated as an entry in the database.

Figure 28:
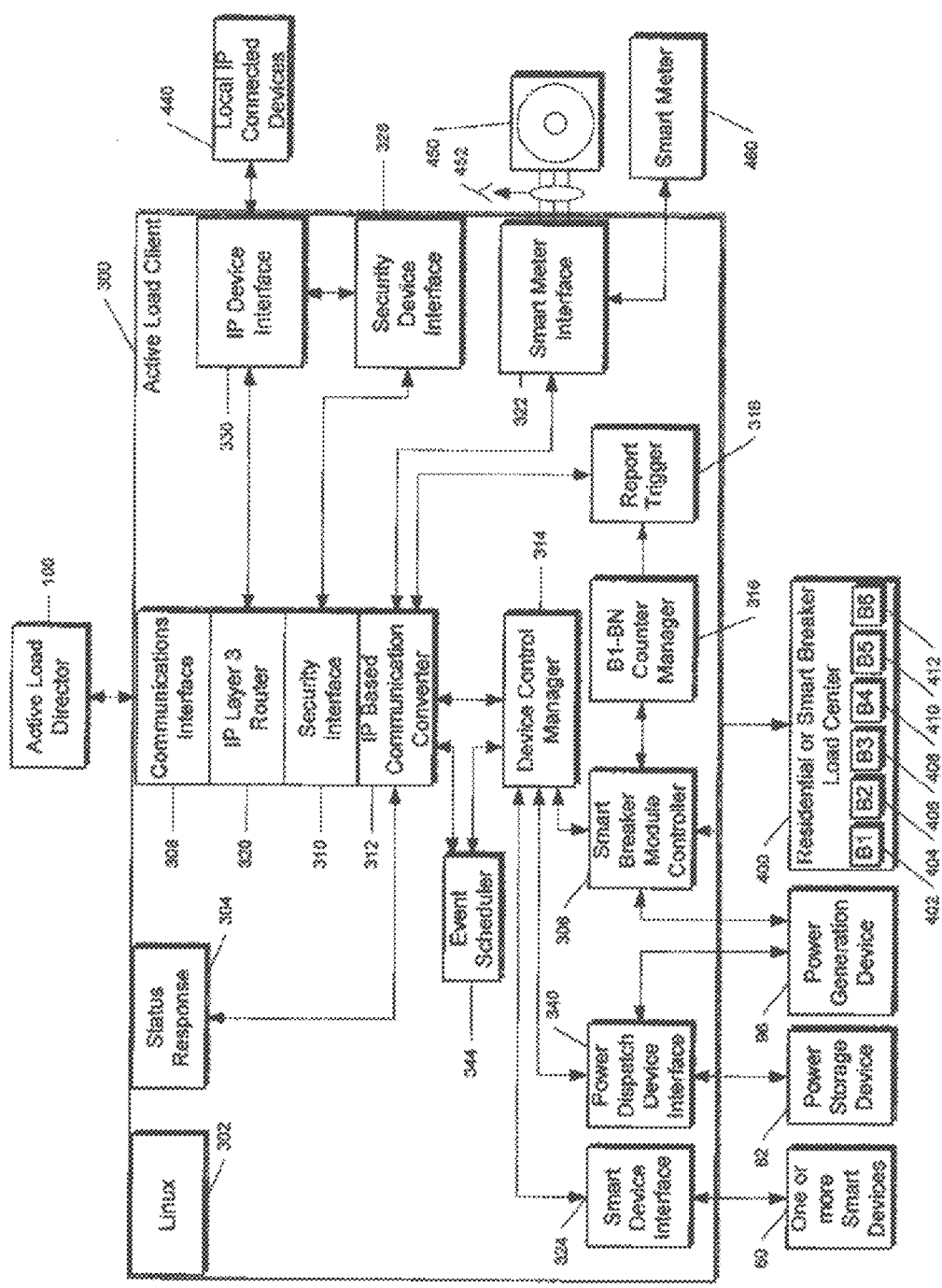
FIG. 28 is a schematic diagram illustrating a schematic diagram of an exemplary active load client in accordance with one embodiment of the present invention.

FIG. 28 illustrates a schematic diagram of an exemplary active load client 300 in accordance with one embodiment of the present invention. The depicted active grid element (here functioning as an active load client (ALC) 300) includes a Linux-based operating system 302, a status response generator 304, a smart breaker module controller 306, a smart device interface 324, a communications interface 308, a security interface 310, an IP-based communication converter 312, a device control manager 314, a smart breaker (B1-BN) counter manager 316, a report trigger application 318, an IP router 320, a smart meter interface 322, a security device interface 328, and an IP device interface 330. The active grid element as ALC, in this embodiment, is a computer or processor-based system located on-site at a customer's residence or business. The primary function of the active grid elements/ALCs is to manage the power load levels of controllable devices located at the residence or business, which the active load client 300 oversees on behalf of the customer. In an exemplary embodiment, the software running on the active grid element operates using the Linux embedded operating system 302 to manage the hardware and the general software environment. One skilled in the art will readily recognize that other operating systems, such as Microsoft's family of operating systems, Mac OS, and Sun OS, C++, machine language, among others, may be alternatively used. Additionally, the active load client 300 may include DHCP client functionality to enable the active grid elements to dynamically request IP addresses for themselves and/or one or more controllable devices 402-412, 420, 460 (which may be other active grid element s) associated therewith and/or managed thereby from a DHCP server on the host IP network facilitating communications between the active load client 300 and the ALD server 100. The active grid element may further include router functionality and maintain a routing table of assigned IP addresses in a memory of the active grid element to facilitate delivery of messages from the active grid elements to the controllable devices 402-412, 420, 460 and/or also for messaging via the network with the Coordinator.

A communications interface 308 facilitates connectivity between the active grid elements and the Coordinator(s), which may also include ALDs/ASDs. Communication between the active grid elements and the Coordinator and/or server and/or processor coupled with memory (functioning as server) may be based on any type of IP or other connection protocol, including but not limited to, the WiMAX protocol, and equivalents or alternatives, as discussed in the foregoing. Thus, the communications interface 308 may be a wired or wireless modem, a wireless access point, or other appropriate interface for any and all of the active grid elements.

A standard IP Layer-3 router 320 routes messages received by the communications interface 308 to both the active grid element sand to any other locally connected devices 440, which may include other active grid elements that are registered with the system and/or energy router (coordinator). The router 320 and/or coordinator including routing functions determines if a received message is directed to the active grid element and, if so, passes the message to a security interface 310 to be decrypted (if encrypted messaging). The security interface 310 provides protection for the contents of the messages exchanged between the Coordinator, server, and the active grid elements. The message content is encrypted and decrypted by the security interface 310 using, for example, a symmetric encryption key composed of a combination of the IP address and GPS data for the active grid elements or any other combination of known information. If the message is not directed to the active grid elements, then it is passed to the IP device interface 330 for delivery to one or more locally connected active grid elements, as determined by the coordinator. For example, the IP router 320 may be programmed to route power management system messages (including any type of messaging relevant to the active grid elements) as well as conventional Internet messages. In such a case, the active grid elements and Coordinator(s) may function as a gateway for Internet service supplied to the residence or business, or to other active grid elements, instead of using separate Internet gateways or routers.

An IP based communication converter 312 opens incoming messages from the server and/or Coordinator and directs them to the appropriate function within the designated active grid elements. The converter 312 also receives messages from various active grid element functions (e.g., a device control manager 314, a status response generator 304, and a report trigger application 318), packages the messages in the form expected by the Coordinator and/or server 100, and then passes them on to the security interface 310 for encryption.

The Coordinator routes and/or processes power management commands and/or command messages for various active grid elements logically connected. The active grid elements may include, by way of example and not limitation, smart breakers, smart meters, load control appliances, building control systems, and the like, 402-412 or other IP-based devices 420, such as smart appliances with individual control modules (not shown). Preferably, the Coordinator also processes "Query Request" or equivalent commands or messages from the server by querying a status response generator (which may be included within the Coordinator processing and/or database associated therewith) which maintains the type and status of each active grid element associated with the Coordinator, and providing the statuses to the server and/or database for retention, analysis, and other processing or reporting. The "Query Request" message may include information other than mere status requests, including settings for active grid elements, by way of example and not limitation, such as temperature set points for thermally controlled devices, time intervals during which load control is permitted or prohibited, dates during which load control is permitted or prohibited, and priorities of device control (e.g., during a power reduction event, hot water heater and pool pump are turned off before HVAC unit is turned off), PSV, PTB, and/or combinations thereof.

The Coordinator messaging with the active grid elements also preferably includes status response generator 304 that receives status messages from the server and, responsive thereto, polls each active grid element and/or controllable device 402-412, 420, 460 to determine whether they are functioning and in good operational order. Each active grid element responds to the polls with operational information (e.g., activity status and/or error reports) in a status response message. The Coordinator stores the status responses in a memory (or routes them to the database for storage) associated with the status response generator for reference in connection with power management events for supply and/or load curtailment.

Preferably, the Coordinator and each of the active grid elements further includes a smart device interface 324 that facilitates IP or other address-based communications with and from individual active grid elements 420 (e.g., smart appliance power control modules). The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the active grid elements with other active grid elements, including smart devices and appliances. The smart device interface 324 also allows the Coordinator to manage those devices that have the capability to sense temperature settings and respond to temperature variations.

By way of describing another embodiment, all active grid elements, including but not limited to smart breakers, smart meters, load control appliances, building control systems, and the like, module controller 306 formats, sends, and receives messages, including power control, PSV, PTB, and/or combinations thereof, instructions, to and from the smart breaker module 400. In one embodiment, the communications is preferably through a BPL connection. In such embodiment, the smart breaker module controller 306 includes a BPL modem and operations software. The smart breaker module 400 contains individual smart breakers, smart meters, load control appliances, building control systems, and the like, 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power or PSV, PTB, and/or combinations used by each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number), PSV, PTB, and combinations thereof, to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-412, and the power number, and sends the report to the IP based communication converter 312 for transmission to the server 100.

Preferably, the systems and methods of the present invention provide for automated remote updating of active grid elements via communications through the network with the Coordinator(s), including but not limited to software, firmware, chipsets, kernels, and combinations thereof. Updating through the Coordinator(s) and/or central server, and/or dedicated server for updating active grid elements is provided by the present invention. Also, commands are sent for purposes for updating any and all attributes of the active grid elements, including PSV, and/or PTB by a central and/or remote device or server, or processor, meant to enhance for update PSV, PTB, or location of PTB server point ASIC within an IP message or proprietary message that deal with table spaces, pricing, changes in acceptable time increments, status messages, location of market (LMP, node, electrical bus, etc.) for the load for marketing, aggregated, settled, and combinations thereof. The updating is for purposes of PSV, PTB, or ability to know the health and/or status of any active grid elements within any zone within the electric power grid. Thus, the systems and methods of the present invention provide for automatic updating of any and all active grid elements by remote server or dedicated device(s), through Coordinator(s) and/or directly to active grid elements that affect any aspect of updating of active grid elements relating to software, firmware, rules, metrology, ASICs, chipsets, machine code, operating systems, and combinations thereof. Furthermore, active grid elements may be updated for improved or increased accuracy of active grid elements to qualify PSV and PTB associated therewith. Also, the present invention provides for active grid elements with smart cross-communication that provide for at least one active grid element to transmit commands to at least one other active grid element within the network associated with the electric power grid.

Figure 29:
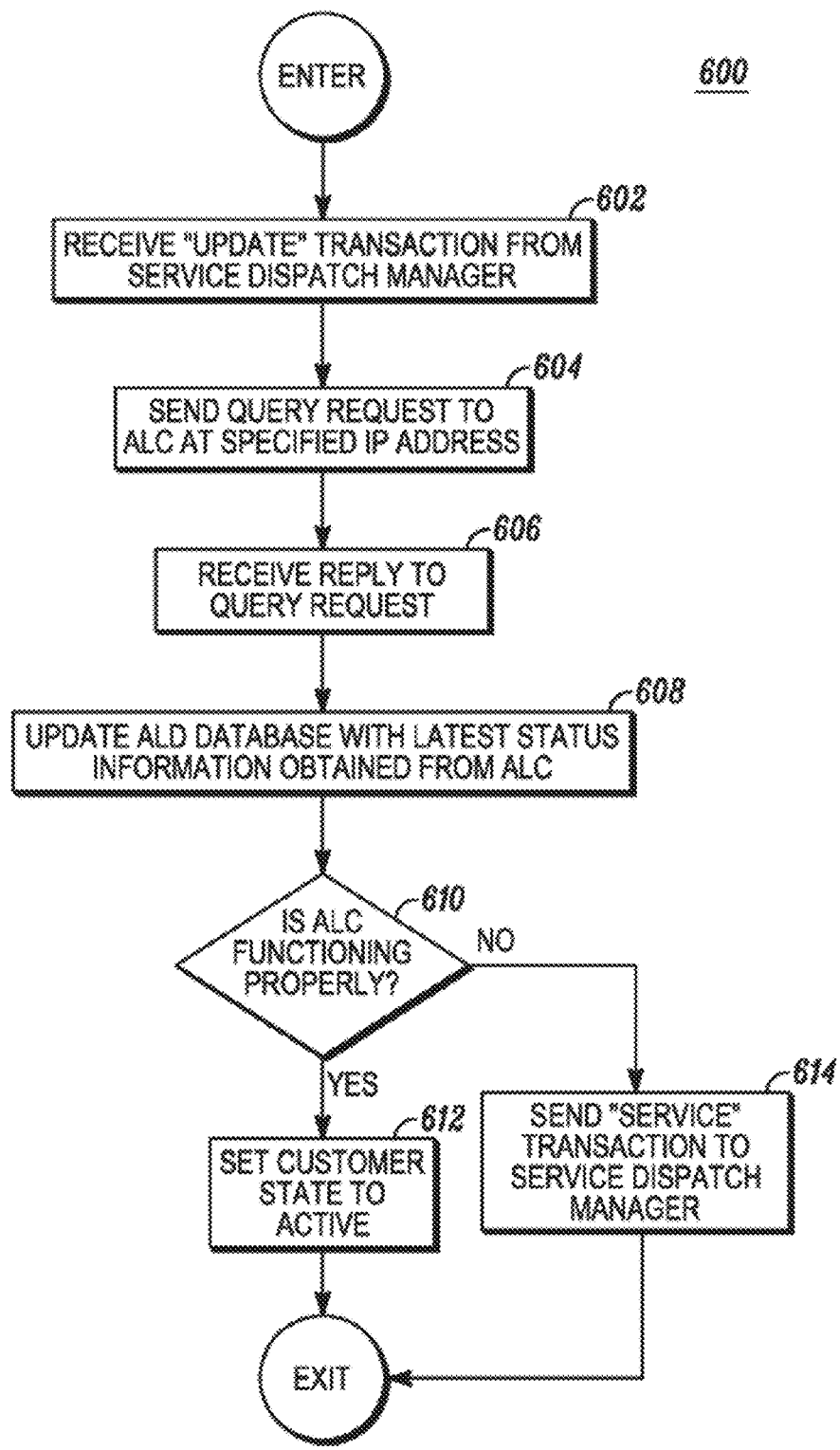
FIG. 29 is a flow diagram illustrating steps in a method for updating information relating to ALCs and/or ALD database.

FIG. 29 illustrates an exemplary operational flow diagram 600 providing steps executed by the server (e.g., as part of the Coordinator) to confirm automatically the registration of any grid element to the power management system 10 associated with the electric power grid, in accordance with one embodiment of the present invention. The steps are preferably implemented as a set of computer instructions (software) stored in a memory (not shown) of the server and/or Coordinator and executed by one or more processors (not shown) of the server. In accordance with the logic flow, the Coordinator 108 receives (602) an automated messaging from any grid element that is energized, but not already registered with the system; the messaging includes attributes of the grid element as set forth hereinabove. The Coordinator responds with messaging to confirm the registration of the grid element, which then transforms it into an active grid element, thereby providing its functionality to be associated with the electric power grid. An "Update" or similar transaction message or command from the Coordinator that uses the IP address specified in the "Update" message to send (604) out a "Query Request" or similar message or command to the active grid element. The "Query Request" message includes a list of active grid elements the server 100 expects to be managed automatically. Updating software, firmware, or any code embodiment via communication network via IP messages after the active grid elements are registered via the Coordinator or other operations processor/database. The Coordinator also receives (606) a query reply containing information about the active grid elements (e.g., current IP network, operational state (e.g., functioning or not), setting of all the counters for measuring current usage (e.g., all are set to zero at initial set up time), status of active grid elements or other devices being controlled (e.g., either switched to the "on" state or "off" state)). The Coordinator updates (608) the database with the latest status information obtained from the active grid element. If the Coordinator detects (610), from the query reply, or as indicated in the messaging from the active grid element that the active grid element is functioning properly, it sets (612) the active grid element state to "registered" and/or "active" to allow participation in Coordinator server activities within the electric power grid and power management system associated therewith. However, if the Coordinator detects (610) that the active grid element is not functioning properly, it sends (614) a "Service" or similar transaction message or command to a service dispatch manager 126.

Figure 30:
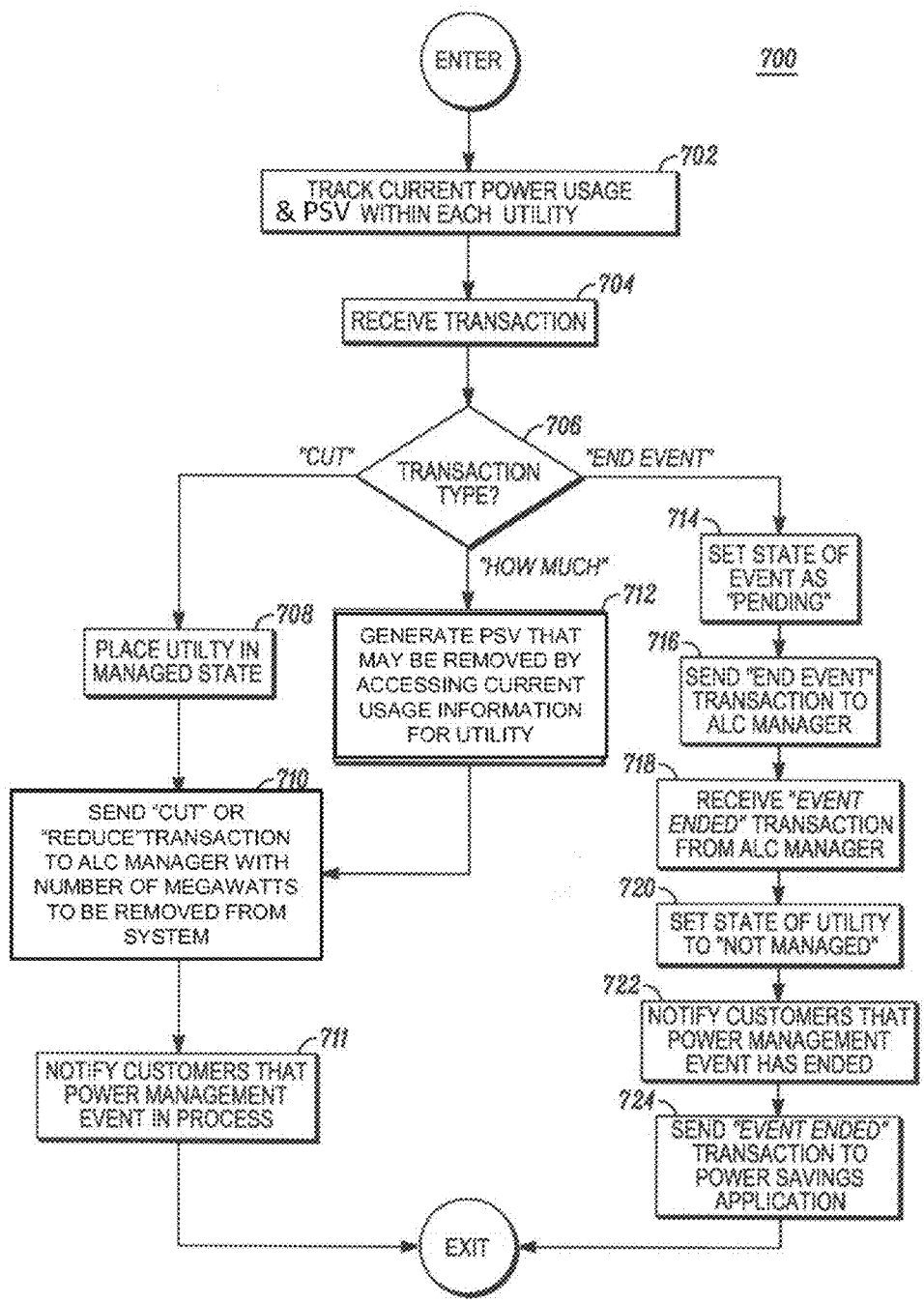
FIG. 30 illustrates a flow diagram of methods according to the present invention for tracking power usage and power supply value (PSV) generation.

Referring now to FIG. 30, an exemplary operational flow diagram 700 is illustrated providing steps executed by the Coordinator and/or server 100 (e.g., as part of the master event manager 106) to manage activities and/or events in the exemplary power load management system 10 and communication about them with registered and active grid elements, in accordance with one embodiment of the present invention. The steps are preferably implemented as a set of computer instructions (software) stored in a memory (not shown) of the server and executed by one or more processors (not shown) of the server and/or Coordinator. Pursuant to the logic flow, the Coordinator tracks (702) current power usage and/or PSV within each utility and/or active grid element associated with the Coordinator and/or server.

Additionally, active grid element profiles for power consumption are included in the present invention. The embodiments described utilize concepts disclosed in published patent application US 2009/0062970, entitled "System and Method for Active Power Load Management" which is incorporated by reference in its entirety herein. The following paragraphs describe the Active Management Load System (ALMS), which includes at least one Active Load Director (ALD), and at least one Active Load Client (ALC) in sufficient detail to assist the reader in the understanding of the embodiments described herein. More detailed description of the ALMS, ALD, and ALC can be found in US 2009/0062970, which is incorporated herein by reference in its entirety.

By way of example, based upon the reduction in consumed power, the systems and methods of the present invention provide for generating at the control center a power supply value (PSV) corresponding to the reduction in consumed power by the active grid elements. Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any active grid element that measures power within the standard as supplied by the regulatory body(ies) that govern the regulation of the grid. PSV variations may depend on operating tolerances, operating standard for accuracy of the measurement. The PSV enables transformation of curtailment or reduction in power at the active grid element level by any system that sends or receives an IP message to be related to or equated to supply as presented to the governing entity that accepts these values and award supply equivalence, for example of a power generating entity or an entity allowed to control active grid elements such as power consuming devices as permitted by the governing body of the electric power grid, e.g., FERC, NERC, etc.

PSV associated with active grid elements may be provided in units of electrical power flow, monetary equivalent, and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Energy consumption patterns associated with active grid elements are subject to analysis that may be used for a variety of different types of activities. For example, based on the energy consumption patterns created from this data, the Coordinator will derive performance curves and/or data matrices for each service point to which the active grid elements are attached and determine the amount of energy reduction that can be realized from each active grid element and its functionality within the electric power grid. The Coordinator(s) create a list of service points associated with the active grid elements through which energy consumption can be reduced via demand side management, interruptible load, or spinning/regulation reserves. This information can be manipulated by the Coordinator and/or ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

Generally, the embodiments described encompass a closed loop system and method for creating a profile, calculating and deriving patterns of energy usage and supply, and making use of those patterns when implemented through the machinery of a system comprised of active grid elements combined with the physical communications link and when these inputs are manipulated through a computer, processor, memory, routers and other necessary machines as those who are skilled in the art would expect to be utilized.

As illustrated by FIG. 31, a settlement processor is provided for systems and methods of the present invention. Advantageously, and by way of comparison to electronic settlement associated with point of sale transactions, for example as with gasoline purchases at a pump station with electronic payment, traditional boundaries used with financial settlements for grid elements are not restrictive factors with the systems and methods of the present invention. By way of illustration and not limitation, a grid element may be an electric vehicle; once registered through the coordinator to participate in the system, the mobility of the grid element allows it to connect and participate within the power grid to consume or draw power (charging) and to supply power (discharging the battery) at a multiplicity of locations across traditional boundaries. With the systems and methods of the present invention, the grid element location for its participation (consuming or supplying power) is automatically identified with the activities and the settlement for that participation is provided at the point of attachment.

The present invention further provides systems and methods for settlement of participation in the electric power grid by grid elements that include a coordinator and/or translator network-based communication to communicate with legacy systems associated with the electric power grid, the legacy systems including network management systems, energy management systems, ISO, utility, SCADA, EMS, meter data, tables, graphical information system asset management server including updated changes within the distribution system, customer information systems, enterprise billing systems, outage management systems, data warehouse, historical data, legacy demand-side management system, legacy information and/or control system having grid information for grid elements for active control of those grid elements, and combinations thereof. Regardless of type and frequency of telemetry for those legacy systems, the present invention provides for increased frequency up to real-time data, and improved accuracy of data associated with the participation of the grid elements in the electric power grid. Benefits for the consumer of electric power from the grid include more accurate data associated with grid element participation in the grid, and therefore reduced payments and/or increased total compensation in the case of a power generator or curtailment activities acting as supply.

For the present invention, a node is a point within the electric power grid at which power is generated or drawn out. Resource nodes are the points at which power is passed back, connectivity nodes of the generator to the system. Settlement quality measurement of the injections and withdrawals; 15 min price is calculated and used for real-time energy settlement through the use of reporting grid elements that possess revenue grade metrology, as defined by standards bodies, such as ANSI in North America, or the appropriate standards bodies that specify the accuracy to classified as revenue grade by the governing body and are transformable by changes in the software and or firmware to improve the accuracy of the power measurement at the point of settlement. Thus the systems and methods of the present invention provide for accuracy improvements of any type, and any and all updates to profiles, preferences, and any other upgrade associated with any grid element, in particular those providing for increased settlement accuracy, which are communicated over the network by IP-based messaging or proprietary messaging.

The ratings of the GSU are provided by the resource entity and are entered into the model. The 15 minute market-based price is calculated for the resource node, even if the resource node is offline. A clearing price is still calculated, even if no additional power is supplied by a generator at that node and also, for the resource node, in the event transformers de-energize for maintenance. Grid elements are deployed and are configurable in a loop (or a loop feeder) fault tolerant design so that if there is a fault, the power is re-routed automatically. The 15 minute-based prices can change and be recalculated in the event that part or all of the electrical bus is de-energized. Some feeders off of electrical buses are not in a fault tolerant configuration and when they fail or are de-energized, it is still possible to clear a price for providing resource if a supply or curtailment source has been registered through the art and ultimately to the grid operator, Market Participant, ISO, utility, or plurality thereof. In this use case a distributed energy resource can inject energy to the de-energized distribution or transmission lines and thus create the use case of settlements per attachment or per measuring grid element per customer. Nodal price is equal to the subsystem average in the prior art; this teaches away from the present invention inasmuch as the systems and methods of the present invention provide for real-time accurate measured contributions and load consumption. Thus, price for generation is optimized and/or maximized for each grid element that participates in supply of power or load curtailment as supply to the grid at those nodes. Clearing price for power is provided at the node, in the example case wherein the electrical bus is de-energized and alternative and/or distributed power supply is provided to any and/or all of the power-consuming grid elements associated with that node, includes not only the capacity and energy charges, but also preferably includes the base distribution and attachment charges, which are normally granted to the TDSP for that period of time in which such power is supplied, measured, tracked, communicated, transformed, etc. according to the present invention for settlement.

Preferably, systems and methods of the present invention consider the information provided by ISO, which publishes a day ahead, a week ahead, a month ahead and/or real time pricing for capacity, energy and operating reserves. Consideration of this information provide by ISO is provided through a pricing element communicated through the Coordinator. The pricing element may further include factors and/or information relating to the impact of commodity pricing (e.g., natural gas) as an input to the settlement systems and methods of the present invention.

A resource node is associated with the electrical bus, in which a resource is measured and an output is settled. It is theoretically possible to settle at the electric bus for generation resource connected to the grid at only one electric bus, then at that bus as the resource node. For all others, the resource node is the generation resources side of the e-bus where the generation source is connected to the electrical power grid or where there are aforementioned boundaries that also possess a grid element that employs revenue grade metrology and reporting thereof.

Settlement for grid elements according to the present invention considers the location of each of the grid elements, the location settlement at the closest node for the connection of the grid element(s) to the electric power grid, including the physical attachment point to the distribution system or at the grid element that measures the "net" power injected at the attachment point to the electric grid that is also capable of grid stabilization (frequency synch, voltage support, etc.).

SCED—Security Constrained Economic Dispatch

Security messaging is provided by systems and methods of the present invention. NIST and NERC provide standards for encryption of data, market data is provided by rules according to those standards. Data generated in the systems and methods of the present invention for automated financial settlements associated with the grid element participation, due to the increased accuracy and timeliness of the data, are preferably provided with secure messaging and access consistent with the standards for NIST and NERC, which are incorporated herein by reference in their entirety (including the version published as of the date of the filing of the present invention). Preferably, this data is secured and access is provided to market participants on a subscription basis, provided that they agree to all security and data usage requirements associated with market rules and privacy rules and/or laws governing the electrical grid and/or energy markets. If regulatory bodies or market governing bodies deem the data to significantly advantage those who have adopted it, due to the speed and execution of trading energy consumption, forecasting and projection, then the market may purchase subscription access. By way of example, security is provided in at least one form, such as VERISIGN and PAYPAL certificates provided to ensure secure financial transactions; group keys, dynamic keys, certificates, VPNs, etc. used with the communications of financial settlement messaging according to the systems and methods of the present invention. Veri sign authentication, and functionally similar security services associated with electronic communications of financial settlement, which are incorporated herein by reference herein, includes SSL (secure socket layer), PKI (public key infrastructure), Verisign Trust Seal, and Verisign Identity Protection (VIP) services are owned by Symantec.

Price is determined by SCED, which runs about every minute or so, which takes current grid conditions, and runs a multi-variable algorithm (non-linear program) to determine constraints and prices, determines what Gens should do; feeds EMS all the generators. Every ISO has a unique SCED, because based upon topology, and every grid is unique. Generators at different resource nodes, generation tie lines, wires, losses, etc. the grid looks different, number of meters and analog points, etc. The foundation algorithm is similar for each ISO. Inputs and initial conditions and develops an output; SCED is a market management system, to include topology (particularly of generators, based on ICCP signals), and SE, to determine the least cost generator plan for the whole system. Based upon verifiable costs of individual units, constraints, etc. ISOs each have it all, but not shared between or among ISOs.

State estimator (SE) products provide standardized power equations, take all inputs and conditions of the grid at one time, provides measurement equivalents, special protection schemes, and dynamic ratings, and run it every 6 seconds. It uses the latest value available, not based upon every message arriving at the same time; it is not possible for every message to arrive at the same time. Updated dynamic load forecast is based upon learning algorithm by ISO, a neuro-net program; the foundation is IEEE-based, but each ISO is different. State estimator output is the input to SCED. Network application that sits on EMS; results set are communicated to SCED for providing a market management system.

Distributed energy resources (DER) that are not attached at the distribution level is not subject to SCED. DER is recipient of pricing information, so DER makes decisions about pricing at the hub level, distribution level, or interconnection substation. So the electrical bus or substation, which always has an LMP, is settled at the load zone or hub, which are defined by ISO, based on aggregate of generation for that territory. Load zone is weighted average of LMP for that time period for that zone. Hub is weighted average of resource nodes for that time period for that zone. That information is communicated into SCED or any other EMS, so that it knows resource availability, so then every attachment point could be a resource node. Also, that information is communicated into State Estimator (SE), but importantly, there is no SE for the distribution grid. Transmission grid is mostly ring bus with redundancy. SE provides information about how to keep it stable, which is possible because it is a ring. The distribution grid (DG) provides radial lines that drop to zero; so the prior art does not provide for how to create SE for distribution grid reliably. The present invention provides packet communication to create SE, for a solution set, where equations converge to a point. DG will converge off of iterations or assumptions, although it is difficult to correlate DG. Problems exist in the prior art with confidence levels for keeping the grid stable at the transmission level. The present invention provides for communications and controls to aggregate information and grid functionality to hub or zone arrangements, which function for solving SCED at the zone, because the zone forms a ring, which can use the SE with reasonable confidence that the outputs are reliable (at least 95%). Therefore, the present invention IP packet communications provide for pricing at nearest load zone, for clearing power at attachment points. Improving grid stability occurs when DG is used, but it is not predictable with absolute certainty. This is why DG is not in SCED, because it is not modeled in SE; so then the modeling must be at attachment points for grid elements that function for distributed generation. DG modeling at transmission grid according to the present invention would provide for load zone price or no price if only at DG for settlement at market prices. If fast acting frequency support is required and provided, then paid a premium at market prices for that day, which compensates higher amounts for being more responsive in providing power via Distributed Energy Resources (DER). The premium is provided on capacity payment, being available quickly for a period of time, which provides a generation premium. SCED applies to price on the transmission grid, i.e., price through ICCP because SCED feeds EMS all set points and prices, EMS adds quality codes, etc., and sends out ICCP. Auto-dispatch of DER may be provided automatically by the systems and methods of the present invention if the DER is online, and communicating in the IP packets of the present invention, and if least next cost price for generation, then it is possible to clear at market pricing based upon SE/SCED. There, the price is independent of the resources cost; SCED, no matter what price of generation, it provides the clearing price based upon market constraints; if generation has a verifiable cost greater than the price, then in settlements, where generation does not receive a loss, then the generation will be paid more than its costs, and the subsidy comes from the load.

As set forth hereinabove, the prior art includes estimations and network models that are used to approximate the electric power flows in the grid, particularly the transmission, distribution system and losses at or approximate to the attachment points of loads; however, the present invention includes estimations, network models, and, significantly, real-time measurement of actual participation by each of the grid elements, and the losses associated with transmission, distribution, and resource nodes, versus estimations. By way of example and not limitation, the present invention provides for kilowatt packet based settlement, including power supply value (PSV) factors and, where appropriate or required, including aggregation of supply and/or load curtailment as supply activities by a multiplicity of grid elements and/or entities to provide a power trading block (PTB) or minimum amount required for settlement. Thus, the estimations and approximations are replaced with actual data captured under the present invention systems and methods; therefore the efficiency of the electrical power grid settlement and functionality, because increased capacity so that additional resources utilize existing infrastructure to its fullest extent without incurring redesign or new construction to expand capacity of the grid distribution and transmission. Furthermore, because the new art contains an active coordinator which when in combination with processing and database elements allow for the decision making and ultimately pricing and resource nodes to be defined further down in the distribution system and closest to the end consumer, ultimately improving the operations and efficiency of the grid, maximizing transmission and distribution capacity and most importantly saving the consumer money or its equivalents for compensation. It also facilitates the participation of the same consumers who possess distributed energy or curtailment technologies to participate in the market and respond to market pricing conditions to improve the supply and grid stability.

By contrast to the prior art, embodiments of the present invention preferably provide for real-time data to be used to inject or transform legacy grid elements that further improve grid operations and functionality for distribution of electric power in the grid. Clearing and monetizing the increased capacity is another benefit of the present invention systems and methods, which provides that increased capacity is measured and settled.

In one embodiment of the present invention, metering for settlements and billing is preferably provided with the advanced communications via network, preferably IP-based communication for grid elements through the coordinator to allow participation in the electric power grid by grid elements for supplying, providing curtailment as supply, and/or consuming power or usage and financial settlement that allows customers to provide supply, curtailment as supply, and/or consume power beyond their committed base rate or anticipated rate in response to requirements of the grid (for increased supply, for grid stability, etc.) that are communicated or projected by EMS. This allows the grid operator and/or market participant with the ability to activate supply from any source and provide for financial settlement therefor including consideration for the cost of the infrastructure and transit commits, if any, capacity, grid stability, and combinations thereof. This provides an alternative to either capped ports with fixed billing or actual data transferred, which are models more frequently seen in the prior art electric grid settlements, where occasional usage "bursting" is either not allowed or penalized with higher bills, either of which penalizes the customers. In preferred embodiments of the present invention, systems and methods provide for advanced financial settlements for grid element participation, including data communication through the coordinator and/or translator to interact with legacy systems, as needed, and to interact with the grid elements and/or their controlling owner through network-based IP communication of actual participation with supply, curtailment as supply, and/or consumption or usage of power (demand), wherein the data rate sampling of activity for participation and corresponding settlements are provided on a less-than-15-minute interval, preferably less than 10 minutes, and more preferably less than 5 minutes. Exemplary data sampling techniques are provided in unrelated art, such as for $95^{th}$ percentile metering, with such techniques as set forth in the article entitled "$95^{th}$ percentile bandwidth metering explained and analyzed," (written by Dylan Vanderhoof, dated Apr. 4, 2011) for datacenter bandwidth metering as described in the article being incorporated herein by reference in its entirety.

By contrast to the settlement systems and methods of the present invention, OASIS is an example of prior art that reserves capacity on transmission subsystems at boundaries where transmission control between two grid operators intersect. OASIS "tags" transmission capacity at these boundaries; only providing that information at boundaries, notably because the utility or grid operator may own or control the lines within the boundaries. New developments in the FERC regulated transmission subsystems allowing for the private ownership of transmission lines that also regulated by tariff and by FERC also must present capacity information to industry accepted market information subsystems at the boundaries. Without actual loss information as present art provides, the likelihood that consumers (loads) are overpaying for inefficiencies of the "wires" can reach as high as 50% in some estimates of the industry. If the information and transformation of grid elements provided by the described art provides more capacity for the "wires" utility or grid operator, the transmission distribution service provider (TDSP) can sell more electricity at higher rates if real-time measured data is available and used for settlement, rather than merely extending to all consumers, as a percentage and/or flat fee charge in addition to usage-based, rate-based charges. There is otherwise no incentive for utilities/

TDSPs who are rate-based to improve the efficiency of the electric grid for distribution and transmission within their boundaries. The present art teaches away from legacy methods by necessity. Without the present art, long term costs of power for end-consumers will dramatically increase as worldwide power consumption is projected to double in the next 20 years while capacity within the networks of most utilities is not being replaced and new transmission subsystems are not keeping pace with demand. Public Policy and FERC have recognized these facts hence the issuance of the aforementioned FERC orders, with more to come, and projections from the NERC Long Term Reliability Assessment report projecting capacity margins declining in most RTOs, utility service areas and other geodetic references.

The coordinator within the systems and methods of the present invention provides for settlement for grid element(s) participation in the electric power grid by energy and communications routing through and with the existing settlement infrastructure for the electric power grid. The systems and methods further include at least one translator or converter to work within the legacy systems, ISO, market participants, etc. for the electric power grid for importing and exporting data and information relating to settlement. This data is integrated automatically by the systems and methods of the present invention at the translator or converter so that the data associated with the grid element(s) participation in supply or demand curtailment as supply, or load (power consumption), and translate the data for use in automated real-time settlement. Preferably, the automated real-time settlement includes actual, measured data for each of the grid elements, transformed into kilowatt packet (KWP) units. Also, preferably, KWPs are further combined with power supply value (PSV), and aggregated to form a minimum power trading block (PTB), and combinations, as required for optimized and maximized settlement values for load and for generation, respectively, i.e., power consumers are charged accurately for actual power consumed, and generation supply providers are paid maximally for their participation (availability for supply and/or actual supply), due to the improved data accuracy, and improved data availability (more data and/or continuous data supply, or anything improved over the standard, which is about 15 minute intervals). Preferably, financial settlement for each of the grid elements is provided by systems and methods of the present invention for participation by grid elements in real-time or less than 15 minute interval data-time.

The present invention provides automated advanced settlements for IP-based active power management (load and supply) systems having active grid elements, which have predetermined functionality within the electric power grid, and are addressable with IP-based messaging within the communications network by an active load director (ALD) and/or Coordinator wherein the messaging occurs over communication networks, such as the Internet. The present invention improves and expands upon prior art systems and methods, including U.S. Pat. No. 5,560,022 issued Sep. 24, 1996, filed Jul. 19, 1994 by inventors Dunstand, et al., and assigned on the face of the document to Intel Corporation, for Power management coordinator system and interface, which is, including its specification and figures, incorporated herein by reference in its entirety.

The following U.S. Patent Applications, each invented by Joseph W. Forbes, Jr., are herein incorporated by reference in their entirety: application Ser. No. 13/463,761 filed May 3, 2012 (Pub. No. 2012/0221162); application Ser. No. 13/463,781 filed May 3, 2012 (Pub. No. 2012/0239218); application Ser. No. 13/464,665 filed May 4, 2012 (Pub. No. 2012/0221163); application Ser. No. 13/466,725 filed May 8, 2012 (Pub. No. 2012/0239219); application Ser. No. 13/471,589 filed May 15, 2012 (Pub. No. 2012/0226384); application Ser. No. 13/471,575 filed May 15, 2012 (Pub No. 2012/0245753); application Ser. No. 13/528,596 filed Jun. 20, 2012 (Pub. No. 2013/0345888); application Ser. No. 13/549,429 filed Jul. 14, 2012 (Pub. No. 2014/0018969); application Ser. No. 13/563,535 filed Jul. 31, 2012 (Pub. No. 2014/0039699); and application Ser. No. 13/659,564 filed Oct. 24, 2012 (Pub. No. 2014/0114844). These applications provide detailed descriptions of the systems, methods, and apparatus embodiments relating to active management of electric power grids and their corresponding supply and demand components. By way of example, Active Supply Director (ASD) and Active Supply Client or Element (ASC) provide for the corresponding management of electric power available or actually supplied to the electric power grid, whether by Generation Source Supply (GSS) elements or by Storage Source Supply (SSS), including battery or fuel cell, or compressed air, stored water, or any subsystem that includes a potential for discharging electricity as stored energy to the electric power grid, available for discharge or actually discharged into the grid. In any case, whether electric power supply for the grid is provided by generation or load curtailment, the supply is evaluated and rated by Power Supply Value (PSV) and Power Trade Block (PTB), which indicates the amount of power, including aggregated amounts acceptable for settlement by the grid, which are communicated by the active grid elements through the Coordinator and then to an energy management clearinghouse for settlement based upon PSV, PTB, and market factors associated with and communicated by the active grid elements and timing, duration, quality, type of event (for supply and/or demand response) within the electric power system energy management to the coordinator. Preferably, all information required for settlement is communicated within the systems and methods and by apparatus embodiments of the present invention, automatically and/or autonomously and preferably with IP-based messaging via the network; this information is routed by at least one coordinator and stored in memory in a database that is accessible by the energy management clearinghouse.

Each active grid element associated with supplying power and/or providing load curtailment within the electric power grid, includes with its attributes at least one Power Supply Value (PSV) associated with its activity and function within the grid. Power Supply Value (PSV) is estimated, modeled, measured, and/or determined or calculated at the meter or submeter, building control system, supply source, or at any device or controller that measures electric power within the standard as supplied by the regulatory body(ies) that govern the regulation of the grid. PSV depends on operating tolerances, operating standard for accuracy of the measurement. Notably, the PSV provides a uniform, systematic unit for addressing the power curtailment or power supply that is responsive to an energy management system (EMS) or equivalent for providing grid stability, reliability, frequency as determined by governing authority, grid operator, market participant, utility, and/or regulations applicable to the electric power grid operations. The PSV enables transformation of curtailment or reduction in power, in addition to the introduction of power supply to the grid, at the device level by any system, apparatus, and/or device that sends or receives an IP message to be related to or equated to supply as presented to the governing entity that accepts these values and award supply equivalence. PSV may be provided in units of electrical power units, flow, monetary equivalent, and combinations thereof. The PSV and/or PTB addresses the longstanding unmet need within the electric power management systems for a consistent or standard unit(s) that provide for blocks or bundles of energy are introduced, aggregated, and settled; the prior art nowhere teaches or discloses these functional units. Thus, the present invention includes a PSV that provides a unit for measuring and settling for each active grid element the power available for/introduced to the electric power grid and/or the curtailment power available (consistent with FERC orders 745, 750, 755 all published in 2011, which are incorporated herein by reference in their entirety) as a requirement for providing supply to the power grid, and, particularly wherein the supply to the power grid is provided for grid stability, voltage stability, reliability, and combinations thereof. Notably, "high performance reserves" from FERC order 755 covers for "deadband", i.e., the time between receipt of reg-up/reg-down, recognition of that order, and response to impact on the grid, which is about 5 minutes for high performance reserves, which are faster for supply than the traditional utilities.

PSV is preferably settled as traditional power delivery or curtailment systems at the nearest interconnection point, Location Marginal Price (LMP), node, transmission interconnection, balancing authority, utility service area, retail electric provider service area, ISO, state, and combinations thereof, i.e., settlement is available at the point of delivery and/or acceptance (or attachment point), and is facilitated by ALC, ASC, Coordinator, metering device, smart meter, sub-meter, and combinations thereof, or any revenue grade device accepted by the governing authority to determine PSV and/or settlement for each active grid element. Also preferably, PSV includes consideration for line losses proximal to those devices and/or grid elements, if not through real-time metrics then through modeling and/or estimation. Furthermore, regarding PSV and other metrics, where no real-time metrics for verification and settlement exist, modeling is used. Preferably, analytics is used in connection with the present invention for modeling, estimation, optimization, and combinations, such as those analytics taught by U.S. Pat. Nos. 8,180,622, 8,170,856, 8,165,723, 8,155,943, 8,155,908, 8,131,401, 8,126,685, 8,036,872, 7,826,990, 7,844,439, 7,840,395, 7,729,808, 7,840,396, 7,844,440, 7,693,608, and US Patent Application Publication Nos. 20070239373, 20080262820, 20080263469, 20090076749, 20090083019, 20090105998, 20090113049, 20100023309, 20100049494, 20100168931, 20100268396, 20110082596, 20110082597, all of which are incorporated herein by reference in their entirety.

Figure 32:
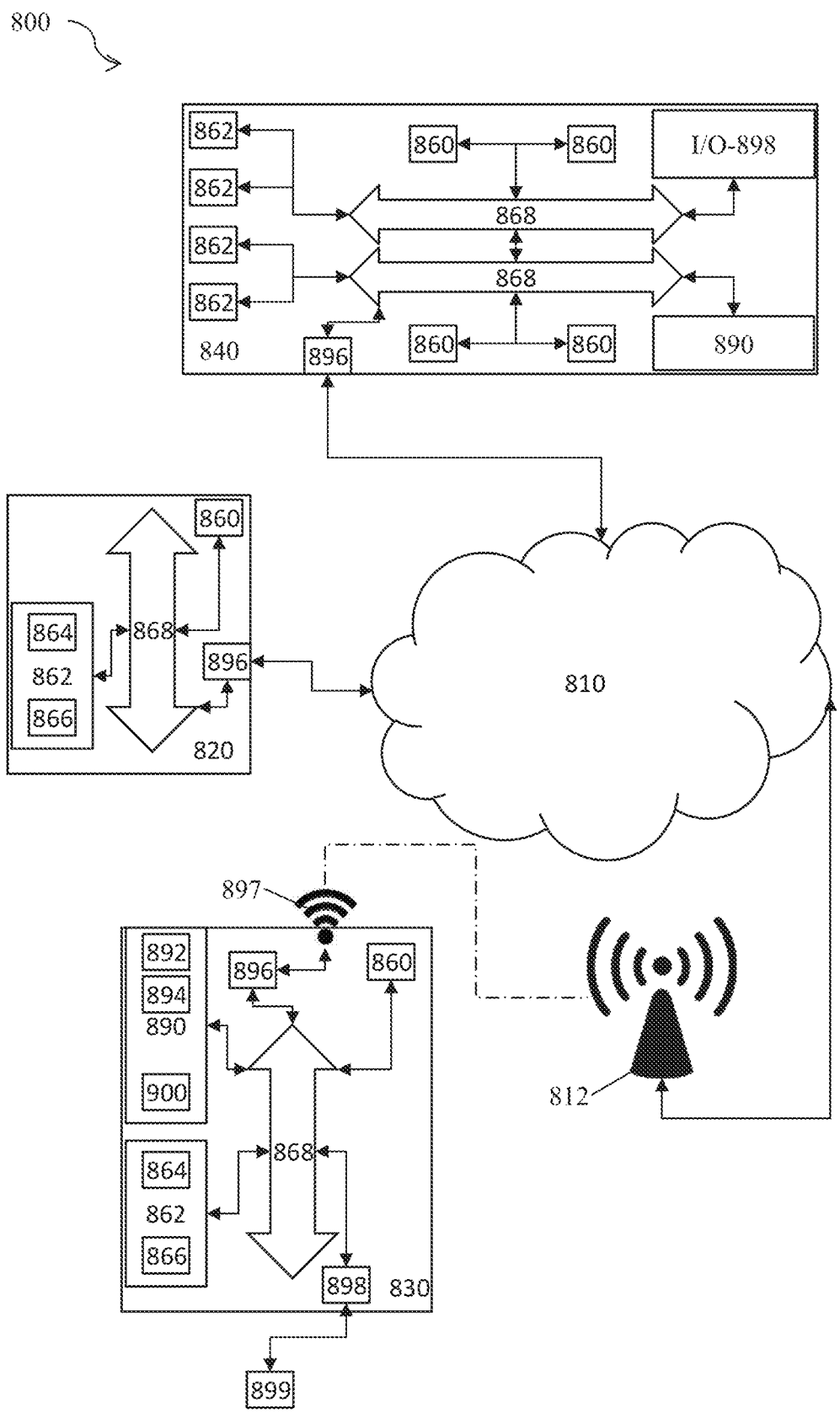
FIG. 32 is a schematic diagram illustrating a virtualized computing network used in one embodiment of the invention for automated systems and methods.

FIG. 32 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 32, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 32, may include other components that are not explicitly shown in FIG. 32, or may utilize an architecture completely different than that shown in FIG. 32. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Also, in this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

By way of definition and description supporting the claimed subject matter, preferably, the present invention includes communication methodologies for messaging via a communication layer. IP-based communications over a network are most preferred. Correspondingly, and consistent with the communication methodologies for messaging according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols may be used, including but not limited to a "1G" wireless protocol such as analog wireless transmission, first generation standards based (IEEE, ITU or other recognized world communications standard), a "2G" standards based protocol such as "EDGE" or "CDMA 2000" also known as "1×RTT", a 3G based standard such as "High Speed Packet Access (HSPA) or Evolution for Data Only (EVDO), any accepted 4G standard such as IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP-based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE and ITU have released improved WiMAX and Long Term Evolution wireless standards that have facilitated the consideration of new technologies to improve the response and control of power load control devices employing smart breaker and smart disconnect switches that include advanced smart meters where IP multimedia gateways are embedded or attach as separate connected printed circuit boards, and submetering technologies that possess sufficient "revenue grade" metrology such that the measurements provided by these devices may be accepted for settlement purposes. The term "revenue grade" is an industry term, as will be appreciated by one of ordinary skill in the art, a percentage of accuracy determined by ANSI, which means that power measurement must be within ½% of the actual value being consumed. Thus, calibration standards are provided accordingly to OEMs of power measuring devices and/or chips. In embodiments of the systems and methods of the present invention, these calibration standards are met via components, including a chipset and related software, and the transmittal of the power measurement information via IP-based communications as set forth hereinabove. Baselining techniques that provide a reference power usage point, sampling techniques that allow for verification of the power "state" and power consumption data for electricity consuming devices (inductive or resistive), reactive power, Power Factor, start-up current, duty cycles, voltage, consumption forecasts and most importantly real-time or near real-time power measurement sampling, etc., are required to derive a Power Supply Value (PSV) that includes an American National Standards Institute (ANSI), ISO, grid operator, governing body revenue measurement, etc., which is preferably aggregated to reach the size of at least a single Power Trade Block (PTB) unit for the purposes of optimally monetizing the active load management from the customer perspective. PTBs are dependent on a grid operator, regional transmission operator, or independent system operator to determine the capacity size (in kW or MW) or energy data in (kWH or MWH) that can be accepted for bidding, trading, settlement by the utility, the end consumer/customer, the market participant, the CSP, demand response aggregator or any entity authorized by the government entity that regulates grid operators such as FERC, NERC etc. Generally due to measurement, verification, transmission and/or distribution modeling (which considers the impact to the grid from the curtailment activities at any geodetic location on the grid, but generally modeled by electrical bus or substation), the minimum acceptable PTB is 100 kW at the time of the present invention. This limitation is not expected to be permanent, given these advancements in measurement/verification, the near real time or real time IP/Ethernet based telemetry capabilities presented by a plurality of various communications methods as discussed in this embodiment and the advancements in service oriented architecture based (SOA) software and hardware subsystems, when combined with an ALD and ALC that can perform at a sublevel such that the minimum PTB can be determined at the device, home, building, service point, commercial, industrial, transformer, feeder, substation, transmission line and any sub-point along the transmission and distribution feeder system of an electrical grid as so long as minimum telemetry, measurement, verifications, validation are met and are capable of being aggregated to a minimum PTB acceptable to the grid operator, ISO, RTO, BA or any other increment of grid topography used now or in the future for settling power block increments by sub-PTB.

Embodiments of the present invention expand upon and enhance prior technologies by, among other things, employing WiMAX, High Speed Packet Access (HSPA), Evolution for Data Only (EVDO), both considered $3^{rd}$ generation wireless standards, Long Term Evolution (LTE), considered at the time of the invention as a "4G" standard and its derivative standards that are most assuredly to be introduced during the life of this invention, IEEE 802.11 (X) also known as "Wi-Fi" and its derivative standards inclusive of "Multiple Input Multiple Output" (MIMO), as set forth in the communication methodologies hereinabove, a plurality of proprietary mesh and point to point communications solutions or any Internet Protocol (IP)-based load control in a system with the ability to monitor and measure, in real time or in sufficient time increments to satisfy the telemetry performance standards as established by the Government or governing bodies (e.g., National Electric Reliability Corporation (NERC), Federal Energy Reliability Commission (FERC)) the amount of power deferred, conserved or removed (or carbon, $SO_2$, or $NO_2$ eliminated), such as, by way of example, the Kyoto or Copenhagen Protocols that set up carbon credits. These improvements allow new options for electric utilities or any market participant to defer or invest in new power generation that is friendlier to the environment.

The present invention provides for mobile devices used for updating the PSV, meters, etc., which are also used by consumers and businesses for real-time review of financial information on their respective accounts, and for making changes to profiles, settings, and preferences.

Pass-through individual coordinators, or linked coordinators, which are connected and feed into one or more databases, preferably consider all attributes for curtailment, supply, profiles, price, etc. and combinations for the grid elements that communicate with the coordinators. TDSP subsystems provides for master SCADA information, market (ISO or vertically integrated) information, which are communicated with the EMS. Preferably, all systems are linked together with SOA, with a communications network for sharing data, information, etc., preferably Ethernet, according to the present invention. The ISO and TDSP produce the information for the market, which is communicated via network to the coordinator(s). The EMS has ICCP associated with the bus; and the ISO provides for grid stability, pricing, etc. The TDSP provides for grid health, losses (reported at the electrical bus). The invention provides for financial settlement generating transactions at any grid element attachment point, as well as, and including the resource settlement nodes. ALD, ASD, and/or coordinator(s) communicate with the grid elements associated with supply or generation for the grid, and are all connected, both in electric power grid transmission and communication network connection, to a resource node. Grid elements may further include (but are not limited to) transmission, transformers, end points, smart meters, attachment points, and combinations. Preferably, all grid elements have geodetic references associated with them. The transaction for financial settlement for grid elements occurs at the supplier and/or consumer points of connection to the grid. Settlement at the grid elements, in any location associated with grid element participation in the grid, is provided by the present invention.

Outside the electrical bus or substation within the electric power grid, the financial transaction subsystem provides information between the subsystems and from the electrical bus to the market. Since the present invention's settlement processor provides for clearing of financial settlement data at or less than 15 minute increments, at 15 minute intervals or increments, with better and more accurate data than with any prior art systems, customers (or owners of the grid elements participating in the electric power grid) clear the market with the best price for power supplied to the grid and also pay less for energy consumed (demand) from the grid supply. This occurs because inefficiencies are factored out or reduced in terms of allocation to those grid elements, control generation, control usage/consumption, make informed decisions about participation, or based upon profiles, automatically participate. All information automatically clears and settles, i.e., the systems and methods of the present invention automatically provide a financial settlement for each active grid element for its participation in the electric power grid, to the grid element owner, with communications through the coordinator and with settlement through the settlement processor as described herein and illustrated in FIG. 31.

Thus the present invention provides solutions for the longstanding, unmet needs of participating grid element owners to supply empirical data relating to their participation that directly evidences the specific losses, if any, that are directly related to their participation.

The present invention further provides for aggregation of transformed data from a multiplicity of grid elements; in particular, transformed data associated with grid elements providing electric power to the grid as supply or curtailed load as supply may be aggregated until at least one power trade block (PTB) unit of energy is represented by the transformed data (for example for settlement grade data content for financial settlement of the grid elements' participation in the electric power grid). Also, aggregation of transformed data including power supply value (PSV) for the participation of the grid elements is provided. Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or sub-meter, building control system, or any active grid element that measures power supplied or consumed within the standard as supplied by the regulatory body(ies) that govern the regulation of the grid. PSV variations may depend on operating tolerances, including operating standards for accuracy of the measurement. The PSV enables transformation of curtailment or reduction in power, power supplied, and/or power consumed at the active grid element level by any system that sends or receives an IP message to be related to or equated to supply as presented to the governing entity that accepts these values and awards supply equivalence (e.g., for example of a power generating entity or an entity allowed to control active grid elements and their participation on the electric power grid such as power consuming devices as permitted by the governing body of the electric power grid, e.g., FERC, NERC, etc.). PSV associated with active grid elements and their participation within the electric power grid may be provided in units of electrical power flow, monetary equivalent, and/or combinations thereof. Thus, the PSV provides an actual value that is confirmed by measurement and/or verification, thereby providing for supply and/or curtailment value(s) as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

According to the present invention, PSV for any of the active grid elements and their participation on or within the electric power grid may be generated by methods including information relating to baselining historical load, also known as the customer baseline (CBL), estimating based upon curves, real-time or near-real-time value, and combinations thereof.

Advantageously, the present invention provides active load and/or supply management metrics for each of the active grid elements, including PSV, much better than merely a statistical estimate for a command as with prior art; PSV also further provides for steps of measurement and settlement, according to the present invention. FERC requires that the settlement credits are provided at point where settlement occurs; settlement information follows the transaction, most preferably, according to the present invention, occurring in real time or near real time, as in financial transactions or other commodity transactions, such as for natural gas supply. Also, preferably, there is a defined interval that is accepted or acceptable by the governing entity for the electric power grid, wherein each transaction is recorded as it occurs. Furthermore, the present invention provides for IP real-time communications that provide for settlement of the curtailment by load-consuming devices at or approximate to the time of the transaction, i.e., the curtailment. Also, preferably, there is participation data for the grid elements that provides supporting evidence attached with the IP real-time communication of the acceptance of the power event, and then automatically recorded in a settlement database and associated with each active grid elements registered within the system through the Coordinator(s), and participation on the electric power grid by the grid elements that are registered with the system. Also, some information related to this transaction and its settlement is transmitted to the energy supplier and/or energy/curtailment purchaser, permitting the seller to be paid according to the PSV and/or PTB related to the power event, e.g., curtailment or supply event(s).

Power Trading Blocks (PTBs) are dependent upon the grid operator or ISO; there must be enough curtailment or supply for the grid operator to accept, settle, and monetize, including individual and/or collective or selectively aggregated data for active grid elements registered with the system and their participation on or within the electric power grid. At this time, the PTB is 100 KW in most electric power grids, including a conventional utility, independent system operator, grid, or microgrid operator. Generally, the power available as operating reserves is traded in larger amounts, PTB size, to be significant enough to beneficially stabilize the grid and its operating reserves. At this time, the regional trading organization or geographic-specific grid and corresponding regulations therefor, determine the PTB size, which typically requires the aggregation of load from a multiplicity of consumers, residential or commercial, to reach a minimum PTB size or PTB unit. The PTB unit, combined with the PSV, and the real-time secure communications used with ALC/ALD function to lower the size of the minimum PTB required to form a PTB unit for grid reception and settlement purposes. The commercial impact determines the minimum PTB size, which corresponds to a PTB unit, due to cost and timing of communication of the information related to the curtailment event(s) and response by the device(s), and how aggregation of load curtailment by the multiplicity of devices is managed to ensure maximum compensation to the customer(s) associated with the device(s) for the curtailment event, with minimum negative physical impact to those consumers and/or devices from the curtailment event.

Energy consumption and/or supply patterns associated with active grid elements and their participation on the electric power grid are subject to analysis that may be used for a variety of different types of activities; this analysis may provide the basis for the automatic transformation of the data associated with the grid elements. Additional transformation may be provided by the receiving grid element, such as the coordinator. For example, based on the energy consumption patterns created from this data, the Coordinator will derive performance curves and/or data matrices for each service point to which the active grid elements are attached and determine the amount of energy reduction that can be realized from each active grid element and its functionality within the electric power grid. The Coordinator(s) create a list of service points associated with the active grid elements and their participation on the electric power grid through which energy consumption can be reduced via demand side management, interruptible load, or spinning/regulation reserves. This information can be manipulated by the Coordinator and/or ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

Generally, the embodiments described encompass a closed loop system and method for creating a profile, calculating and deriving patterns of energy usage and/or supply, and making use of those patterns when implemented through the machinery of a system comprised of active grid elements combined with the physical communications link and when these inputs are manipulated through a computer, processor, memory, routers and other necessary machines as those who are skilled in the art would expect to be utilized.

The present invention has adequately described in great detail how the active grid elements and their participation on the electric power grid are associated with the Coordinator and the employment of computer assisted apparatus that include, but are not limited to processors, ASICS, memory, analytics, communications interfaces and methodologies, databases, both relational, high performance "historian" databases, persistence and cache layers, metadata layers, analytics engines, monitoring and reporting active grid elements, Internet Protocol, Ethernet, carrier grade wired and wireless networks, proprietary networks, TDM wireless and wired networks, analog and digital telemetry subsystems, Coordinators, Active Supply Directors and a plurality of the above both centralized, networked together and distributed. While the previous descriptions have been detailed in the embodiment of a FERC 745 load acting as supply, one skilled in the art will correlate those functions previously described as they apply to the supply side for FERC 750 and 755, including settlement. These highly decentralized networks must be capable of operating directly under the control of an EMS/DMS/GMS or similar control solution, through a Coordinator, and for active grid elements autonomously if they are disconnected from the macro electric grid or have voluntarily opted to disconnect themselves from the electric grid temporarily or permanently. The present invention provides through software, hardware and advanced communications methodologies the capabilities of many small Distributed Electric Resources (DER) associated with the active grid elements to perform and deliver their energy resource directly to the electric grid interconnected as if they were a macro resource with aggregated PSV values that build up to minimum PTB blocks that can be both presented, operated and monetized by a Market Participant, REP, Utility, IPP, a Company acting as their own energy agent or a plurality of all of the above.

It should be noted that many terms and acronyms are used in this description that are well-defined in the telecommunications and/or computer networking industries and are well understood by persons skilled in these arts, and in electric power management arts. Complete descriptions of these terms and acronyms, whether defining a telecommunications standard or protocol, can be found in readily available telecommunications standards and literature and are not described in more detail herein.

It will be appreciated that embodiments or components of the systems described herein may be comprised of one or more conventional processors and unique stored program instructions that control the one or more processors to implement, in conjunction with certain non-processor circuits, some, most, or all of the functions for managing power load and/or supply distribution, and tracking and controlling individual subscriber power consumption and savings, and power supply in one or more power load and/or supply management systems. The non-processor circuits may include, but are not limited to, radio receivers, radio transmitters, antennas, modems, signal drivers, clock circuits, power source circuits, relays, meters, submeters, smart breakers, current sensors, and customer input devices. As such, these functions may be interpreted as steps of a method to distribute information and control signals between devices in a power load and/or supply management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of power from utility companies to subscribing customers using any number of IP-based or other communication methods. Additionally, the functions of specific modules within the server and/or active grid elements may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any active grid elements that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for electric power grid management and communications, comprising:
   at least one grid element constructed and configured for network-based communication with a server via at least one coordinator;
   wherein the at least one grid element is operable to communicate Internet Protocol (IP)-based messages with the server via the at least one coordinator in real time or in less than 15-minute intervals;
   wherein the IP-based messages comprise a message for registration of the at least one grid element;
   wherein the message comprises a unique grid element identifier, an equipment identifier, geodetic information, IP address information, and content information;
   wherein the at least one coordinator is operable to transform the at least one grid element into at least one active grid element after communication of the message with the server via the at least one coordinator;
   wherein the at least one active grid element is operable to participate actively in an electric power grid;
   wherein the IP-based messages further comprise at least one IP packet including a content, a priority, a security, and a transport route;
   wherein the content comprises an amount of power supply available for the electric power grid or an amount of power curtailment available at an attachment point for each of the at least one active grid element based on revenue grade metrology;
   wherein the at least one coordinator is operable to select one or more active grid elements of the at least one active grid element and control participation of the one or more active grid elements in the electric power grid based on capability, capacity, function information, geodetic information, and/or the attachment point of each of the one or more grid elements; and
   wherein the priority of the at least one IP packet is based upon factors associated with the electric power grid, and wherein the factors comprise grid reliability factors, grid stability factors, energy market-based factors, billing determinants, energy settlement factors, financial settlement factors and transmission factors.

2. The system of claim 1, wherein the IP-based messages comprise at least one settlement message for a participation of the at least one active grid element.

3. The system of claim 2, wherein data rate sampling for the participation or settlement is at a less than 10-minute interval.

4. The system of claim 2, wherein data rate sampling for the participation or settlement is at a less than 5-minute interval.

5. The system of claim 1, wherein the at least one coordinator is operable to receive pricing data from a governing entity.

6. The system of claim 5, wherein the pricing data comprises factors and information relating to an impact of commodity pricing.

7. The system of claim 1, wherein the amount of power supply available for the electric power grid or the amount of power curtailment available at the attachment point for each of the at least one active grid element includes a power supply value.

8. The system of claim 7, wherein the power supply value includes consideration for line losses proximal to the at least one active grid element.

9. The system of claim 7, wherein the power supply value is based on measurement and verification.

10. The system of claim 1, wherein power supply values for a multiplicity of active grid elements are aggregated into a power trading block (PTB).

11. The system of claim 1, wherein the transport route of the at least one IP packet is fixed, mutable by a coordinator, or dynamic.

12. A system for electric power grid management and communications, comprising:
   at least one grid element constructed and configured for network-based communication with a server via at least one coordinator;
   wherein the at least one grid element comprises an energy consumption pattern or an energy supply pattern;
   wherein the at least one grid element is operable to communicate Internet Protocol (IP)-based messages with the server via the at least one coordinator in real time or in less than 15-minute intervals;
   wherein the IP-based messages comprise a message for registration of the at least one grid element; and
   wherein the message comprises a unique grid element identifier, geodetic information, IP address information, and content information;
   wherein the at least one coordinator is operable to transform the at least one grid element into at least one active grid element after communication of the message with the server via the at least one coordinator;
   wherein the at least one active grid element is operable to participate actively in an electric power grid;
   wherein the IP-based messages comprise at least one IP packet including a content, a priority, and a transport route;
   wherein the content comprises an amount of power supply available for an electric power grid or an amount of power curtailment available at an attachment point for each of the at least one active grid element based on revenue grade metrology;

wherein the at least one coordinator is operable to select one or more active grid elements of the at least one active grid element and control participation of the one or more active grid elements in the electric power grid based on capability, capacity, function information, geodetic information, and/or the attachment point of each of the one or more grid elements; and wherein the priority of the at least one IP packet is based upon factors associated with the electric power grid, and wherein the factors comprise grid reliability factors, grid stability factors, energy market-based factors, billing determinants, energy settlement factors, financial settlement factors and transmission factors.

13. The system of claim 12, wherein the at least one coordinator is operable to provide priority flags on the IP-based messages.

14. The system of claim 12, wherein the IP-based messages comprise at least one settlement message for a participation of the at least one active grid element.

15. The system of claim 12, wherein the content of the at least one IP packet further comprises energy settlement data.

16. A system for electric power grid management and communications, comprising:

at least one coordinator constructed and configured in network-based communication with at least one grid element and a server;

wherein the at least one grid element comprises an energy consumption pattern or an energy supply pattern;

wherein the at least one grid element is operable to communicate Internet Protocol (IP)-based messages with the server via the at least one coordinator in real time or in less than 15-minute intervals;

wherein the at least one coordinator is operable to transform the at least one grid element into at least one active grid element after communication of one of the IP-based messages with the server via the at least one coordinator;

wherein the at least one active grid element is operable to participate actively in an electric power grid;

wherein the IP-based messages comprise at least one IP packet including a content, a priority, and a transport route;

wherein the at least one coordinator is operable to select one or more active grid elements of the at least one active grid element and control participation of the one or more active grid elements in the electric power grid based on capability, capacity, function information, geodetic information, and/or the attachment point of each of the one or more grid elements; and wherein the priority of the at least one IP packet is based upon factors associated with the electric power grid, and wherein the factors comprise grid reliability factors, grid stability factors, energy market-based factors, billing determinants, energy settlement factors, financial settlement factors and transmission factors.

17. The system of claim 16, wherein the IP-based messages comprise a message for registration of the at least one grid element and wherein the message comprises geodetic information, IP address information, and content information.

18. The system of claim 16, wherein the content comprises an amount of power supply available for an electric power grid or an amount of power curtailment available at an attachment point for each of the at least one active grid element based on revenue grade metrology.

* * * * *